US012616096B2

(12) United States Patent
Chen

(10) Patent No.: US 12,616,096 B2
(45) Date of Patent: May 5, 2026

(54) WHOLE-STALK OR SECTIONING TYPE COMBINED SUGARCANE HARVESTER

(71) Applicant: Yecai Chen, Laibing (CN)

(72) Inventor: Yecai Chen, Laibing (CN)

( * ) Notice: Subject to any disclaimer, the term of this patent is extended or adjusted under 35 U.S.C. 154(b) by 401 days.

(21) Appl. No.: 18/271,473

(22) PCT Filed: Jan. 14, 2022

(86) PCT No.: PCT/CN2022/072081

§ 371 (c)(1),
(2) Date: Jul. 10, 2023

(87) PCT Pub. No.: WO2022/152258

PCT Pub. Date: Jul. 21, 2022

(65) Prior Publication Data

US 2024/0065162 A1 Feb. 29, 2024

(30) Foreign Application Priority Data

Jan. 15, 2021 (CN) .......................... 202110079036.3

(51) Int. Cl.
A01D 45/10 (2006.01)
A01D 43/08 (2006.01)

(52) U.S. Cl.
CPC ........... A01D 45/10 (2013.01); A01D 43/086 (2013.01)

(58) Field of Classification Search
CPC ...... A01D 45/10; A01D 43/086; A01D 43/00; A01D 43/077; A01D 57/00
See application file for complete search history.

(56) References Cited

U.S. PATENT DOCUMENTS 3,673,774 A * 7/1972 Mizzi ..................... A01D 45/10
56/60
3,952,482 A * 4/1976 Quick ................... A01D 45/10
56/249

(Continued)

FOREIGN PATENT DOCUMENTS

CN 101002526 A 7/2007
CN 101151955 A 4/2008

(Continued)

*Primary Examiner* — Arpad Fabian-Kovacs
(74) *Attorney, Agent, or Firm* — Bayramoglu Law Offices, LLC

(57) ABSTRACT

A whole-stalk or sectioning type combined sugarcane harvester, including: a frame, a sugarcane root grinding cutter (48), a plurality of rollers (59) for scraping sugarcane leaves, peeling sugarcane peels and conveying sugarcane stalks by using circular plates arranged at intervals, sugarcane pressing cover plates (82), sugarcane leaf and peel blocking barriers (75), a sugarcane stalk guide plate (78), rollover safety devices, anti-rollover regulators, and a whole-stalk sugarcane bundling and 180-degree left and right steering conveyor, wherein the sugarcane root grinding cutter (48) is mounted at a front end of the frame in a traveling direction; two rear sides of the frame are each provided with one rollover safety device, and the top of the frame is provided with the anti-rollover regulators; the rollers (59) are mounted on the frame; the sugarcane pressing cover plates (82) are mounted on the top surfaces of circular plates of the rollers (59), and the sugarcane leaf and peel blocking barriers (75) and the sugarcane stalk guide plate (78) are mounted behind the rollers (59); and the whole-stalk sugarcane bundling and 180-degree left and right steering conveyor is mounted at a rear end of the frame in the traveling direction.

17 Claims, 22 Drawing Sheets

(56)                    References Cited

U.S. PATENT DOCUMENTS

| | | | | |
|---|---|---|---|---|
| 4,196,569 A * | 4/1980 | Quick | A01D 45/10 | |
| | | | 198/518 | |
| 4,555,896 A * | 12/1985 | Stiff | A01D 45/10 | |
| | | | 56/16.5 | |
| 4,584,824 A * | 4/1986 | Hiyamuta | A01D 45/10 | |
| | | | 56/16.5 | |
| 6,745,550 B1 | 6/2004 | Hinds et al. | | |
| 7,805,916 B2 * | 10/2010 | Hinds | A01D 47/00 | |
| | | | 56/62 | |
| 8,387,998 B2 * | 3/2013 | Hinds | A01D 45/10 | |
| | | | 172/624.5 | |
| 8,438,821 B2 * | 5/2013 | Haffert | A01D 43/087 | |
| | | | 56/13.3 | |
| 2009/0019826 A1 * | 1/2009 | Rigney | A01D 41/00 | |
| | | | 56/53 | |
| 2018/0177129 A1 * | 6/2018 | Almeida | A01D 45/10 | |
| 2018/0177130 A1 * | 6/2018 | Almeida | A01D 45/10 | |
| 2018/0177132 A1 * | 6/2018 | Almeida | A01D 45/10 | |
| 2023/0354748 A1 * | 11/2023 | Dapper | A01D 41/145 | |

FOREIGN PATENT DOCUMENTS

| | | | | |
|---|---|---|---|---|
| CN | 102523832 A | 7/2012 | | |
| CN | 102726165 A | 10/2012 | | |
| CN | 107409617 A | 12/2017 | | |
| CN | 207653006 U | 7/2018 | | |
| CN | 109168598 A | 1/2019 | | |
| CN | 212034898 U | 12/2020 | | |
| CN | 112715149 A | 4/2021 | | |
| WO | WO-2015159464 A1 * | 10/2015 | | A01D 45/10 |

* cited by examiner 48-1

48-2

48-3

48-4

WHOLE-STALK OR SECTIONING TYPE COMBINED SUGARCANE HARVESTER

TECHNICAL FIELD

The present invention relates to the field of harvesting machinery for agricultural production, and more particularly, to a whole-stalk or sectioning type combined sugarcane harvester.

BACKGROUND ART

Operation of an existing combined sugarcane harvester has brought certain economical effects, but most of related operating technologies still have many defectives and deficiencies and cause the occurrence of the following main unfavorable factors.

1. A bottom end of a support frame of a sugarcane tail cutter is arranged on the front of a bridge console, and the warping of the harvester in walking causes an upper end of an inclined plane support frame of the sugarcane tail cutter to rise and fall substantially, so that a sugarcane tail cutting positioning height goes up and down by a large deviation, and the cut sugarcane tail cannot be accurately positioned on a sugarcane row surface.

2. Heads of sugarcane roots have a great tendency to break when the sugarcane roots are cut off. An existing sugarcane root cutter is provided with a plurality of sharp blades for cutting sugarcane roots, while the soil on a sugarcane root surface of a sugarcane row in a sugarcane field is uneven and further contains a lot of coarse sand and stones, so it is common for the blades to cut sugarcane roots 40 mm above the ground and 70 mm below the ground in the field. Once the harvester walks for cutting sugarcane roots while cutting in uneven mud, sand and stones on the sugarcane root surface for 30 meters or less, even the sharp blade may immediately become a blunt blade or a notched blade. Therefore, it is inevitable that heads of many sugarcane roots would be broken if the blunt blade or notched blade is continuously used to cut the sugarcane roots, and at the same time the broken heads may cause substantial yield reduction in a regrowth year of the sugarcane roots. The sharp blade of the existing harvester cannot be implemented as a machete that can be kept sharp for a long time and does not become blunt in cutting the soil containing a lot of coarse sand and stones around the sugarcane roots, while the broken or split heads of cut sugarcane roots are caused by the blunt blade.

3. After the sugarcane roots are cut off, the impurities such as mud, sand and stones are mixed in sugarcane stalks and discharged by the inertia in conveying the sugarcane stalks, and are discharged to a sugarcane outlet at a tail part of the harvester, where the sugarcane stalks are cut into sections with a length of about 130 mm by a sectioning cutter provided at the tail part of the harvester. Since the sectioning cutter may normally cut the sugarcane mixed with mud lumps, sand and stones, its sharp sectioning rolling blade may become a blunt and/or notched blade within a short time. In this case, the sugarcane is cut off by squeezing, and sucrose water inside will be directly lost due to crushing at ends formed by such cutting. The mud lumps and stones with a diameter of larger than 20 mm may not be sucked by a suction fan above the tail part of the harvester due to their heavy weights and will fall into a sugarcane collecting bucket and be discharged into a carriage of a sugarcane transport truck together with sugarcane sections. Impurities removing seams of the sugarcane collecting bucket should not be greater than 20 mm, since if they are too large, many sugarcane stalks with a diameter of less than 20 mm will fall down to the sugarcane field, resulting in a waste. The scraped sugarcane leaves, the peeled sugarcane peels, mud, sand and other impurities are discharged to the sugarcane outlet at the tail part of the harvester, and a strong wind suction fan is provided above the sugarcane outlet to suck the sugarcane leaves, sugarcane peels, powder of mud and sand, and other impurities and discharge them into the sugarcane field by spraying them out of a port of the suction fan, which causes air pollution due to the sugarcane leaves, the powder of mud and sand, and other impurities flying everywhere.

4. The technology of a whole-stalk type harvester for scraping sugarcane leaves and peeling sugarcane peels is immature, such that operations of scraping sugarcane leaves and peeling sugarcane peels cannot be performed cleanly. The operation of stacking sugarcanes in the sugarcane field and the operation of transporting sugarcane stalks to the carriage of the sugarcane transport truck cannot be performed at the same time, resulting in low working efficiency due to the secondary operation.

5. Sugarcane harvesters are prone to rollover when operating in a sugarcane field on a common slope, and are completely not able to operate in a sugarcane field on a higher slope.

SUMMARY OF THE INVENTION

Technical Problem

The present invention will solve the defects and deficiencies in the majority of operating techniques of existing combined sugarcane harvesters, and provide a plurality of whole-stalk or sectioning type combined sugarcane harvesters.

Solution for Problems

Technical Solution

For solving the above-mentioned defects and deficiencies in the majority of operating techniques, the present invention is implemented by the following technical solutions.

A whole-stalk or sectioning type combined sugarcane harvester includes: a frame, a sugarcane root grinding cutter, a plurality of rollers for scraping sugarcane leaves, peeling sugarcane peels and conveying sugarcane stalks by using circular plates arranged at intervals, a plurality of rows of rollers arranged at intervals for scraping sugarcane leaves, peeling sugarcane peels and conveying sugarcane stalks or two layers of rollers arranged vertically, a roller for scraping sugarcane leaves, peeling sugarcane peels and conveying sugarcane stalks by using continuous helical blades, a plurality of rows of rollers for scraping sugarcane leaves, peeling sugarcane peels and conveying sugarcane stalks by using rubber bars arranged at intervals or two layers of rollers arranged vertically, sugarcane pressing cover plates, sugarcane leaf and peel blocking barriers, a sugarcane stalk guide plate, rollover safety devices, anti-rollover regulators, and a whole-stalk sugarcane bundling and 180-degree left and right steering conveyor, wherein the frame is a whole base frame connected to bottom wheels of the whole-stalk or sectioning type combined sugarcane harvester for operating across a single sugarcane row or two sugarcane rows; at least one sugarcane root grinding cutter is provided and mounted at a front end of the frame in a traveling direction; two rear sides of the frame are each provided with one rollover safety device, while a top of the frame is provided with the anti-rollover regulators; the plurality of rollers for scraping the sugarcane leaves, peeling the sugarcane peels and conveying the sugarcane stalks by using the circular plates arranged at intervals, the plurality of rows of rollers arranged at intervals for scraping the sugarcane leaves, peeling the sugarcane peels and conveying the sugarcane stalks or two layers of the rollers arranged vertically, the roller for scraping the sugarcane leaves, peeling the sugarcane peels and conveying the sugarcane stalks by using the continuous helical blades, and the plurality of rows of rollers for scraping the sugarcane leaves, peeling the sugarcane peels and conveying the sugarcane stalks by using the rubber bars arranged at intervals or two layers of the plurality of rows of rollers arranged vertically for scraping the sugarcane leaves, peeling the sugarcane peels and conveying the sugarcane stalks by using the rubber bars arranged at intervals are mounted on the frame, and the sugarcane pressing cover plates are mounted on the rollers; the whole-stalk sugarcane bundling and 180-degree left and right steering conveyor is mounted at a rear end of the frame in the traveling direction; the sugarcane leaf and peel blocking barriers are mounted behind the plurality of rollers for scraping the sugarcane leaves, peeling the sugarcane peels and conveying the sugarcane stalks by using the circular plates arranged at intervals, the plurality of rows of rollers arranged at intervals for scraping the sugarcane leaves, peeling the sugarcane peels and conveying the sugarcane stalks or two layers of the rollers arranged vertically, and the plurality of rows of rollers for scraping the sugarcane leaves, peeling the sugarcane peels and conveying the sugarcane stalks by using the rubber bars arranged at intervals or two layers of the rollers arranged vertically, respectively; and the sugarcane stalk guide plate is mounted behind the sugarcane leaf and peel blocking barriers.

Further, the combined sugarcane harvester includes a frame, and is provided with the sugarcane root grinding cutter for grinding and cutting a single sugarcane row or two sugarcane rows, and a base frame connected to bottom wheels for operating across a single sugarcane row or two sugarcane rows; and the frame on both sides above driving steering wheels of the harvester is provided with bearing sleeve joints for lifting of the front frame.

Further, the bearing sleeve joint includes a transmission shaft, a sprocket wheel, a bearing and a bearing sleeve; two ends of the bearing sleeve are each provided with an outer sleeve; the outer sleeve is provided with a steel plate which is provided with a through hole, and the two steel plates are clamped at a front end of the rear frame and are fixedly connected by a bolt; a square steel is mounted on an outer side surface of the bearing sleeve, and is provided with a through hole, and the square steel and the rear end of the front frame are abutted and are fixedly connected by a bolt; and two sides of a rear end of the rear frame are each provided with one driving wheel, and two sides of a front end of the rear frame are each provided with one driving and steering wheel.

Further, two sides of a front end of the front frame are respectively provided with a liftable, walkable and steerable wheel, and the liftable, walkable and steerable wheels are respectively provided with an upper walking wheel carrier and a lower walking wheel carrier; the upper walking wheel carrier is provided with a walking wheel lifting shaft sleeve, a walking wheel lifting oil cylinder and a walking wheel steering oil cylinder; walking wheel steering sleeve shaft joints are vertically arranged on a rear part of the upper walking wheel carrier on both sides; one surfaces of sleeves at two ends of the sleeve shaft joint are respectively welded to the rear part of the upper walking wheel carrier, and square steel tubes bent at an angle of 90 degrees are each welded to middles of the upper sleeve shaft joint and the lower sleeve shaft joints, and are fixed to two sides of the frame; the lower walking wheel carriers on two sides are provided with a walking wheel and a walking wheel lifting shaft; two sides of a lifting wheel frame are each provided with a soft steel wire rope; the other ends of the soft steel wire ropes are provided with lifting ends of the lifting oil cylinders, and bottom ends of the oil cylinders are arranged on both sides of a console frame.

Sugarcane supporting bars are provided, wherein bottom ends of vertical support bars are arranged on both sides of the frame in front of the left and right sugarcane root grinding cutters, planar bars are arranged on both sides in front of an upper end of the vertical support bar, and the planar bars on both sides are provided with sugarcane supporting bars at intervals that are wide in the front and narrow in the rear. A torsional spring is provided at an inner end of the sugarcane supporting bar, an outer end of the sugarcane supporting bar is provided with a sleeve shaft joint, and the sugarcane supporting bar is reset by a torsion arm of the torsional spring.

A sugarcane tail cutter is provided, wherein two sides of a front surface of the front frame are provided with bottom ends of the vertical lifting oil cylinder for supporting the sugarcane tail cutter, one end of each lifting oil cylinder is fixed to the bottom of a scissor blade rack of the sugarcane tail cutter by a bolt. A row of scissor blades is arranged at intervals at a front end of the scissor blade rack, and rear ends of the row of scissor blades are arranged at intervals on a surface of a linear guide rail; clamping strips are arranged at intervals on an upper surface and a lower surface of the row of scissor blades, and rear ends of the clamping strips are fixed to lower surfaces of the scissor blades. Two ends of the linear guide rail are provided with sliding blocks, one end of the linear guide rail is provided with a hydraulic motor to drive a transmission shaft; the transmission shaft is provided with a sprocket wheel and an eccentric shaft wheel; the eccentric shaft wheel is connected to a reciprocating swinging bar; and the swinging bar is connected to one end of the linear guide rail.

A surface of the scissor blade rack is provided with tail leaf supporting plates arranged at intervals; two sides of the tail leaf supporting plate are provided with transmission shafts, one of which is driven by a hydraulic motor; the transmission shafts on the two sides are provided with sprocket wheels arranged at intervals and left and right steering conveying chains, and each conveying chain is provided with tail leaf pulling bars; a tail leaf pulling blade rotator, a transmission shaft and a tail leaf pulling blade are arranged above a front of the row of scissor blades; one end of the rotator is provided with a sprocket wheel, and a transmission chain is connected to the hydraulic motor on one end of the linear guide rail to drive the sprocket wheel of the transmission shaft; fallen tail leaf sliding plate grooves are formed below the transmission shafts on the two sides of the scissor blade rack; sleeve shaft joints are arranged at upper ends of the fallen tail leaf sliding plate grooves on the two sides, and are fixed to the frame below the transmission shafts on the two sides; back-fall tail leaf baffles are arranged at front ends of outlets of the fallen tail leaf sliding plate grooves on the two sides; and a lifting oil cylinder is arranged on a bottom surface of each of the fallen tail leaf sliding plate grooves on the two sides.

The sugarcane root grinding cutter is a circular disc, and impurity removing seams are formed at intervals on an outer circumference of the disc. A top surface of an outer circumferential notch of the disc is a conical surface, and a bottom surface thereof is a flat surface; an area surface of the outer circumferential notch of the disc is coated with metal sand particles; upper and lower surfaces of the outer circumferential notch of the disc may be configured as sagittate triangles, and the metal sand particles may be arranged on the outer circumferential notch of the disc, the upper and lower corner edge surfaces of the notch triangles, and surfaces on both sides of the impurity removing seams; and the metal sand particles include alloy steel sand particles, emery particles, diamond sand particles or iron sand particles. The metal sand particles are all higher than the upper and lower corner edge surfaces of the sagittate triangles of the notch of the disc, and sugarcane pulling pieces are arranged on one side of the radius of the disc surface and are fixed on the disc surface by bolts.

Transmission shafts are arranged on upper surfaces of central holes in the left and right discs; bearings and bearing seats are arranged at upper and lower ends of each transmission shaft, respectively; the upper and lower bearing seats are both fixed to the frame by bolts; the discs are fixed to lower end tips of the transmission shafts through circular clamping plates, and V-belt pulleys are arranged at upper end tips of the transmission shafts, respectively; the belt pulley drives, by chains at one ends of the transmission shafts of a roller for scraping sugarcane leaves and peeling sugarcane peels at a sugarcane inlet, the transverse transmission shafts arranged above the chains; and then the V-belt pulleys arranged on the transverse transmission shafts alternatively drive the discs to rotate left and right by V-type belts.

A transmission shaft, a bearing, a bearing seat, a bevel gear, a sprocket wheel, and a transverse raising plate for fixing the disc are further arranged on a bottom surface of a central hole of the single disc; a cover plate is arranged on a bottom surface of the transverse raising plate, and is fixed by a bolt; a transmission chain and a transmission shaft are arranged in the raising plate; bevel gears are arranged at two ends of the transmission shaft; two ends of the raising plate are fixed to the two sides of the frame by bolts; the disc is fixed to a surface of the raising plate at an upper end of the transmission shaft by the circular clamping plate; a vertical transmission shaft is arranged at one end of the raising plate; a bevel gear and a sprocket wheel are arranged at a lower end of the transmission shaft; a V-belt pulley is arranged at an upper end of the transmission shaft; and elastic rubber sheet baffle plates are arranged on two sides of a front end of the single disc.

Vertical and transverse raising plates for fixing the disc are arranged on a bottom surface of the disc; cover plates are arranged on bottom surfaces of the vertical and transverse raising plates, respectively, and are fixed by bolts; a rear end tip of the vertical raising plate is welded to a middle of the transverse raising plate; a transmission shaft is arranged in each raising plate; and bevel gears are arranged at two ends of the transmission shaft.

A transmission shaft is arranged on an upper surface of a central hole of a single disc, and raising bars for fixing the transmission shafts are respectively arranged in a vertical direction of a rear surface of the disc at the lower end of the transmission shaft and in a horizontal direction below the rear surface of the disc.

A sugarcane stalk conveyor for hooking upward is arranged, wherein a transmission shaft is arranged in front of the sugarcane stalk conveyor; bearings, bearing seats, sprocket wheels, and conveying chains are arranged at both ends of the transmission shaft; upper and lower surfaces on both sides of the conveying chain are provided with double-sided bending plates at intervals; square steel tubes are arranged at an interval of 70 mm on surfaces of the conveying chains on both sides; two ends of each square steel tube are fixed to the double-sided bending plates on two sides of the surface of the conveying chain by bolts; a square steel tube surface arranged every several square steel tubes is provided with several sets of spaced steel nails; the steel nails are fixed on the surface of each square steel tube by welding; in a space between the square steel tubes; sugarcane supporting plates are provided on bottom surfaces of conveying chains on both sides from above to 40 mm below the square steel tubes and are fixed on surfaces of the double-sided bending plates on both sides by bolts, and a transmission shaft is arranged at the back; both ends of the transmission shaft are provided with bearing sleeve joints; the bearing sleeve joints are respectively provided with a transmission shaft, a sprocket wheel, a bearing, and a bearing sleeve; outer sleeves are arranged at both ends of the bearing sleeve; one surfaces of the outer sleeves at two ends of the bearing sleeve are connected to two steel plates, and the two steel plates are drilled on surfaces thereof and are fixed by bolts to two sides of the front end of the rear frame, respectively; a middle surface of the bearing sleeve is welded with a square steel; the square steel is drilled and is fixed by bolts to two sides of the rear end of the front frame, respectively; and bearing seats arranged on both sides of the front transmission shaft are fixed on both sides of the frame.

A plurality of rollers for scraping sugarcane leaves, peeling sugarcane peels and conveying sugarcane stalks by using the circular plates arranged at intervals are provided. One end of a transmission shaft of the roller is provided with a sprocket wheel and a transmission chain, and a bearing and a bearing seat are provided on the transmission shafts on two ends; surfaces of the rollers are provided with sugarcane stalk conveying channels at intervals; several vertical steel plates facing transversely are welded at intervals on surfaces of the circular plates on two sides of each interval on the roller; one ends of elastic rubber sheets are respectively fixed on surfaces of the vertical steel plates facing transversely by clamping plates and bolts, so that two opposite rubber sheets form lateral baffles for blocking the interval; a torsional spring is arranged outside the clamping plate to increase the elasticity of the rubber sheet for a long time by a torsion arm; and one side of the torsional spring is fixed outside the clamping plate by a nut. one elastic rubber sheet is arranged on the surface of each of the vertical steel plates facing transversely, which are arranged at intervals on surfaces of the circular plates on two sides of each interval on the roller, respectively; surfaces of the rubber sheets, which scrape sugarcane stalks, are provided with raised end objects, respectively; the surfaces of the elastic rubber sheets, which scrape sugarcane stalks, include a front surface, a back surface, a left side surface, and a right side surface of the rubber sheet; the elastic rubber sheets include elastic sheets similar to rubber sheets; the elastic rubber sheets include a rubber sheet in which a rope or a steel wire is provided; the raised end objects provided on the surfaces of the elastic rubber sheets, which scrape sugarcane stalks, include bolt heads, nuts, rivet nail heads, steel nail heads, and metal blocks; the metal blocks are provided with spacer teeth or tooth tips, etc., all of these are examples of the raised end objects; at the same time, several elastic rubber sheets are arranged at intervals on surfaces of the circular plates on two sides of each interval on the roller, and one ends of the rubber sheets are respectively fixed at intervals to surfaces of the circular plates on two sides by bolts; vertical circular tubes are further welded on surfaces of the circular plates on one ends for fixing the rubber sheets, respectively, so that outer ends of the rubber sheets are warped, and outer ends of two opposite rubber sheets cling together while inner ends thereof separate from each other; a torsional spring is arranged at an end of the rubber sheet fixed on the surface of the circular plate to increase the elasticity of the rubber sheet for a long time by a torsion arm; the torsional spring is fixed on the surface of the circular plate by providing a clamping hole; and elastic rubber sheets are respectively arranged at intervals on surfaces of the circular plates on two sides of each interval on the roller surface, and the surfaces of the rubber sheets, which scrape sugarcane stalks, are respectively provided with raised end objects.

Rollers for scraping sugarcane leaves, peeling sugarcane peels and conveying sugarcane stalks are provided in rows at intervals, wherein one end of a transmission shaft of the roller is provided with a sprocket wheel and a transmission chain, and a bearing and a bearing seat are provided on the transmission shafts on two ends; two ends of the rollers are provided with circular end blocking plates; several rows of vertical steel plates facing transversely at intervals are arranged at intervals on surfaces of the rollers; several intervals on the surfaces of the rollers are sugarcane stalk conveying channels; the bottom ends of the vertical steel plates facing transversely arranged on the surface of the roller at intervals are fixed on the surfaces of the rollers by welding; elastic rubber sheets are respectively provided on surfaces and two sides of the vertical steel plates facing transversely and arranged on the roller at intervals, and the middle of the rubber sheet is fixed on the surface of the vertical steel plate through clamping plates and bolts; elastic rubber sheets are respectively provided on surfaces and two sides of the vertical steel plates facing transversely and arranged on the roller at intervals, and surfaces of the rubber sheets, which scrape sugarcane stalks, are respectively provided with raised end objects; several rows of vertical steel plates that are longitudinally spaced apart are further arranged at intervals on surfaces of the rollers; several intervals on the surfaces of the rollers are sugarcane stalk conveying channels; vertical circular tubes are respectively welded on two sides of the surfaces of vertical steel plates arranged longitudinally on the roller, so that outer ends of the fixed rubber sheets are warped, and outer ends of two opposite rubber sheets cling together while inner ends thereof separate from each other; the bottom ends of the vertical steel plates are fixed on the surfaces of the rollers by welding; one ends of elastic rubber sheets are respectively provided at two sides of surfaces of vertical steel plates arranged longitudinally on the roller at intervals, and are fixed on the surfaces of the steel plates on both sides; elastic rubber sheets are respectively provided on two sides of surfaces of the vertical steel plates arranged longitudinally on the roller at intervals; and surfaces of the rubber sheets, which scrape sugarcane stalks, are respectively provided with raised end objects.

Rollers for scraping sugarcane leaves, peeling sugarcane peels and conveying sugarcane stalks by using a plurality of rows of rubber bars arranged at intervals are provided, wherein one end of a transmission shaft of the roller is provided with a sprocket wheel and a transmission chain, and a bearing and a bearing seat are provided on the transmission shafts on two ends; two ends of the rollers are provided with circular end blocking plates; several rows of vertical steel plates facing transversely are arranged at intervals on a surface of the roller, the bottom ends of the steel plates are fixed on the surface of the roller by welding, and surfaces of the several rows of vertical steel plates facing transversely arranged at intervals are respectively drilled at intervals; elastic rubber bars are arranged at intervals adapted to diameters of sugarcane stalks planted in different places; a plurality of intervals on the surfaces of the rollers are sugarcane stalk conveying channels; and bottom ends of vertical elastic rubber bars are fixed on surfaces of the vertical steel plates facing transversely through drilling and by bolts.

Vertical elastic rubber bars are respectively provided at intervals on surfaces of vertical steel plates facing transversely on surfaces of the rollers, and surfaces of the rubber bars, which scrape two sides of sugarcane stalks and upper ends of the rubber bars are respectively provided with raised end objects.

A sugarcane pressing cover plate is provided, which is rectangular and semi-circular, and front and rear edges thereof are wrapped; the sugarcane pressing cover plates are respectively provided to cover surfaces of the circular plates of the rollers for scraping sugarcane leaves and peeling sugarcane peels; two ends of each sugarcane pressing cover plate are fixed to two sides of the frame by bolts, wherein two ends of the roller are provided with bearing sleeve joints, and sleeve shaft joints are arranged at the two ends behind the sugarcane pressing cover plate on the surface of the circular plate of the roller; two front ends of the sugarcane pressing cover plate are provided with tension spring bars and tension springs, and the two sides of the frame are provided with cover supporting bars for preventing the sugarcane pressing cover plate from covering downward, and a top cover bar for supporting and upwards opening the sugarcane pressing cover plate; the sugarcane pressing cover plates are further respectively provided to cover one side surfaces of the rollers for scraping the sugarcane leaves, peeling the sugarcane peels and conveying the sugarcane stalks by using continuous helical blades; and two ends of each sugarcane pressing cover plate are fixed to the frame by bolts.

Sugarcane leaf and peel blocking barriers are respectively arranged behind the rollers for scraping sugarcane leaves and peeling sugarcane peels; and two ends of the square steel are fixed to two sides of the frame by bolts.

A sugarcane stalk guide plate is arranged behind each sugarcane leaf and peel blocking barrier, a sugarcane leaf stop plate is arranged below each sugarcane stalk guide plate to prevent sugarcane leaves rotating by the roller from being conveyed backwards, and two ends of the rectangular steel plate of each sugarcane stalk guide plate are fixed to two sides of the frame by bolts.

A sugarcane sectioning blade device is provided, wherein the blade device includes an outer blade holder and an inner blade holder; two fixed blades are vertically arranged respectively at intervals of blade holder bottom ends on both sides of the rear of the outer blade holder, and edges of the two blade are opposite to each other; upper and lower sugarcane supporting plates are arranged in front of the edges of the upper and lower blades; compression springs are respectively arranged at intervals on a surface of the upper sugarcane supporting plate and both sides of a bottom surface of the lower sugarcane supporting plate; a top end of the outer blade holder is provided with a bottom end of the lifting oil cylinder; one end of the lifting oil cylinder is arranged at a top end of the inner blade holder; a proximity sensor is respectively arranged at the middle and lower end of one side of the outer blade holder; sliding blocks are provided at the middle and lower ends of two sides of the outer blade holder; linear guide rails for the inner blade holder are provided on both sides of the inner blade holder, and the linear guide rails on both sides of the inner blade holder are inserted into the sliding blocks on both sides of the outer blade holder; a sugarcane sectioning blade with two blade edges is arranged at the lower end of the linear guide rails on both sides of the inner blade holder; two ends of the sugarcane sectioning blade are fixed on the linear guide rails on both sides by bolts; bearing shafts, bearings, bearing moving grooves and a torsional spring are provided on both sides of the bottom end of the outer blade holder; the bearing moving grooves on both sides are fixed on both sides of the frame at a sugarcane outlet at the tail part of the harvester by bolts; the inner blade holder of the sectioning blade device is further provided as double inner blade holders; both the double inner blade holders are provided with a sugarcane sectioning blade with two blade edges; and both top ends of the double inner blade holders are provided with lifting ends of the lifting oil cylinders.

The lifting oil cylinder provided in the inner blade holder of the sectioning blade device is controlled by an automatic control unit provided in the harvester to go up and down once to cut sugarcane stalks into sections. The automatic control unit is a closed-loop control system constituted of a power supply part, a control part, a signal acquisition part, a signal processing part and a drive part, and a programmable logic controller (PLC) with control buttons and a touch screen is used to perform automation control of electric oil on functions of each part to achieve automatic control of apparatuses. 1. The power supply part includes an on-board storage battery and a switch; 2. the control part includes an on-board control device controlled by control buttons and a touch screen; 3. the signal acquisition part includes different types of photoelectric sensors, proximity sensors and position-limiting sensors; 4. the signal processing part processes signals collected by respective sensors by PLC centralized processing; and 5. the drive part controls the PLC and drives relay solenoid valves and oil cylinder solenoid valves.

Rollover safety devices 263 are provided, wherein lifting racks for left and right rollover safety devices are arranged below two rows of the harvester; sleeve shaft joints are arranged at inner ends of the lifting racks on the two sides; angle steels are arranged at outer ends of the lifting racks on the two sides; steel wire ropes are arranged at two opposite corners in the lifting racks on the two sides; each steel wire rope is provided with a movable joint at one end of the frame, and one end of the angle steel on the outer side is provided with a bolt to adjust the tightness; one end of the lifting oil cylinder is arranged on the surface of the lifting racks on the two sides, and a bottom end of the oil cylinder is arranged on the frame above the two sides of the harvester.

Anti-rollover regulators 264 are provided, wherein vertically-supported lifting oil cylinders are arranged at the two sides of the harvester; one end of each of the lifting oil cylinders on the two sides is provided with a regulator moving rack, the moving rack is provided with a toothed bar, and two sides of the toothed bar are provided with linear guide rails; two sliding blocks are respectively arranged at intervals on the linear guide rails on the two sides; a plurality of iron plates are fixed onto surfaces of the sliding blocks by bolts; a square notch is formed in a middle of each of the plurality of iron plates, and a hydraulic motor is arranged in the square notch; gear teeth of the transmission shaft of the hydraulic motor roll on a surface of the toothed bar to drive the plurality of iron plates to move, and the hydraulic motor is fixed to the first iron plate on a surface of the sliding block by a bolt; the moving rack is arranged into three sections, namely, a middle section and one section on each of the two sides; hinge joints are arranged on the toothed bar at the middle section and bottom surfaces of two ends of the linear guide rail to connect the toothed bars on the two sides and the linear guide rail; a lifting end of the lifting oil cylinder is arranged on the bottom surface of the toothed bars on the two sides, and the bottom end of the oil cylinder is arranged below the middle section; and ends of the linear guide rails on the two sides are provided with compression springs.

Rollers for scraping the sugarcane leaves, peeling the sugarcane peels and conveying the sugarcane stalks by using continuous helical blades arranged at intervals are provided; two sides of a rear end of the bottom frame of the harvester are provided with driving wheels, two sides of a front end of the rear frame are provided with driving and steering wheels, and two sides of a front end of the front frame are provided with liftable, walkable and steerable wheels; sugarcane supporting devices are arranged on both sides in the front of the liftable, walkable and steerable wheels; transmission shafts are arranged in central holes of the discs; raising bars for fixing the transmission shafts are respectively arranged at intervals on upper ends of the transmission shafts, and the upper ends of the transmission shafts are driven respectively by hydraulic motors; a sugarcane supporting sliding plate is provided behind the disc and runs to the sugarcane outlet at the tail part of the harvester, and sugarcane supporting sliding plate grooves are formed in two sides of a surface of the sugarcane supporting sliding plate at the sugarcane outlet; sleeve shaft joints are arranged at rear ends of both sides of the disc rack; two sides of the front frame are provided with soft steel wire ropes, the other ends of the steel wire ropes are respectively provided with lifting ends of lifting oil cylinders; and bottom ends of the oil cylinders are arranged on two sides of a console frame.

Two rows of vertical sugarcane stalk conveying ledges are arranged at intervals above and behind the disc; a space between the two rows of ledges is configured as a sugarcane stalk conveying channel with a wide inlet in the front and a narrow rear part; surfaces of the two rows of ledges are provided with steel meshes or steel plates at intervals; front ends of the two rows of ledges are provided with sprocket wheel shafts and sprocket wheels; bearings are arranged in the sprocket wheels; vertical transmission shafts are arranged on two sides of middle sections of the two rows of ledges; bearings, bearing seats, sprocket wheels, and conveying chains are arranged at intervals above and below the transmission shafts; sugarcane pulling bars are arranged on the conveying chain; pressing sprocket wheels are arranged inside a middle section of the conveying chain; lower ends of the transmission shafts on two sides of the middle sections of the two rows of ledges are provided with sprocket wheel shafts, sprocket wheels, and transmission chains for driving, by one transmission shaft, the other transmission shaft to rotate in an opposite direction; sprocket wheels are respectively arranged at lower ends of vertical transmission shafts on both sides of the middle section; a ball-cage type constant-velocity universal joint is arranged in the sprocket wheel for connecting independent sugarcane conveying chain discs on two sides above the front disc; a front end of the chain disc is provided with a sprocket wheel, an inner side of the middle of the chain disc is provided with a pressing sprocket wheel and a conveying chain, and the conveying chain is provided with sugarcane pulling bars; sliding plate grooves for fixing the chain disc are formed in both sides in the front of the sugarcane pulling bars; a middle section of the sugarcane stalk conveying channel of the two rows of ledges is provided with a space where sugarcane stalks are conveyed without the conveying chain, such that a sugarcane stalk moves only when being pressed by sugarcane stalks moved by the front conveying chain; a front vertical transmission shaft and a rear vertical sprocket wheel shaft are arranged at intervals behind the two rows of ledges; the front transmission shaft is provided with bearings, bearing seats, sprocket wheels, transmission chains, and conveying chains vertically at intervals, and the conveying chains are provided with sugarcane pulling bars at intervals; the rear sprocket wheel shaft is provided with sprocket wheels vertically at intervals, and the sprocket wheels are provided with bearings; the rear sprocket wheel shaft is fixed on the frame by bolts; the front transmission shaft drives the transmission shaft in the middle section through the transmission chain and drives sprocket wheels spaced apart of the rear sprocket wheel shaft through the conveying chain synchronously; once the sugarcane pulling bars provided at intervals on the conveying chains, which are used by the front transmission shaft to drive the rear sprocket wheel shaft, rotate for one turn on the roller with helical blades, the sugarcane pulling bars provided at intervals on the conveying chains move an interval of sugarcane pulling bar into an inlet of the helical blades of the roller; several rollers overlapping and synchronously rotating counterclockwise for scraping the sugarcane leaves, peeling the sugarcane peels and conveying the sugarcane stalks by using the continuous helical blades are provided behind the rear sprocket wheel shaft; two ends of transmission shafts of the rollers are provided with bearings and bearing seats, and bevel gears are arranged at rear ends of the transmission shafts; bevel gears are arranged at front ends of the transmission shafts of the rollers on top and bottom surfaces; the bevel gears are respectively connected to bevel gears and sprocket wheels provided in the transmission shaft on the front end; and the rollers for scraping the sugarcane leaves, peeling the sugarcane peels and conveying the sugarcane stalks by using helical blades are provided with helical blades.

Vertical steel plates facing transversely are respectively welded at intervals on surfaces of the helical blades on two opposite sides of each interval on the rollers; one ends of elastic rubber sheets are respectively fixed on surfaces of the steel plates by clamping plates and bolts, so that two opposite rubber sheets form lateral baffles for blocking the interval; surfaces of the vertical steel plates facing transversely arranged at intervals on the continuous helical blades of two opposite surfaces of the rollers are respectively provided with elastic rubber sheets, and the surfaces of the rubber sheets, which scrape sugarcane stalks, are provided with raised end objects, respectively; elastic rubber sheets are further arranged respectively at intervals on surfaces of the helical blades of two opposite surfaces of the rollers; one ends of the elastic rubber sheets are fixed on surfaces of the helical blades on two opposite surfaces by bolts; vertical circular tubes are respectively welded to a surface of the helical blade on which one end of the rubber sheet is fixed, so that outer ends of the rubber sheets are warped, and outer ends of two opposite rubber sheets cling together while inner ends thereof separate from each other; surfaces of the helical blades of two opposite surfaces of the rollers are respectively provided with elastic rubber sheets at intervals, and the surfaces of the rubber sheets, which scrape sugarcane stalks, are provided with raised end objects; a serrated edge is provided at a sugarcane stalk inlet end of the helical blades of the roller; sugarcane pressing cover plates are respectively provided on one side surface of the rollers for scraping the sugarcane leaves, peeling the sugarcane peels and conveying the sugarcane stalks by using the continuous helical blades; two ends and two sides of each sugarcane pressing cover plate are fixed on the frame by bolts; a vertical transmission shaft is arranged behind the plurality of rollers; a bevel gear, a bearing, and a bearing seat are arranged at intervals at upper and lower ends of the transmission shaft; sprocket wheels and transmission chains are provided at the upper and lower ends of the transmission shaft, and the transmission chain of the sprocket wheel at the lower end is driven by a motor or by a hydraulic motor; a vertical transmission shaft is further arranged behind the plurality of rollers; bearings and bearing seats are arranged at upper and lower ends and the middle of the transmission shaft; sprocket wheels are provided at the upper end of the transmission shaft, and disc saw blades are provided at intervals at two ends and the middle of the transmission shaft; fences are arranged behind and on both sides of the disc saw blades; sugarcane sliding bars are respectively arranged on both sides of rear upper ends of the rollers; upper ends of the sugarcane sliding bars are respectively provided with sleeve shaft joints; and upper ends of the sliding bars are respectively provided with lifting ends of lifting oil cylinders, and bottom ends of the oil cylinders are provided on the frame.

The front of a connector of the whole-stalk sugarcane conveyor is fixed by bolts on the frame under the tail part of the harvester.

The whole-stalk sugarcane bundling and 180-degree left and right steering conveyor 265 is provided with a bottom frame having walking wheels across a single sugarcane row or two sugarcane rows; the walking wheels are provided on both sides of a middle rear part of the bottom frame; movable racks which are extendable backwards are provided on both sides of the rear end of the bottom frame, and are fixed with the linear guide rail by bolts; sugarcane baffles are provided above both sides of the movable rack; vertical bars are provided at intervals on both sides of the rear end of the steering disc rack, and sugarcane supporting sliding plates are respectively arranged in front of the upper ends of the vertical bars; upper ends of the vertical bars on both sides are respectively connected to a soft steel wire rope, and the other ends of the soft steel wire ropes are respectively arranged on the lifting ends of the lifting oil cylinders, and bottom ends of the oil cylinders are respectively arranged on both sides of the frame above the tail part of the harvester.

A touch electric switch is provided on one side of the front of the bottom frame, and an electric remote-control lock is provided on the other side of the bottom frame; a circular hole is formed in the middle of each of front ends on both sides of the bottom frame, and a gap in the bottom surface of the circular hole is sealed by a steel plate and bolts; movable joints are provided on the left and right sides of a part at 400 mm in front of the center of a steering disc of the bottom frame; the movable joints are respectively connected to a round steel, the other ends of the round steels are respectively connected to a soft steel wire rope, and the other end of the soft steel wire rope is respectively arranged on the lifting ends of the lifting oil cylinders; the bottom ends of the oil cylinders are respectively arranged on both sides of the frame above the tail part of the harvester; the lifting ends of the lifting oil cylinders are respectively further provided on two sides in front of walking wheels of the bottom frame, and the bottom ends of the oil cylinders are respectively arranged under the tail part of the harvester; and a 360- degree left and right rotating disc is provided at the middle rear part of the bottom frame.

An outer circumference of the rotating disc is fixed on the bottom frame; an upper end of the inner disc is provided with a steering disc rack; an outer circumference of the steering disc in a bottom surface of the steering disc rack is provided with steering teeth; the steering teeth are provided on transmission shaft teeth of a hydraulic motor to drive the disc to rotate; the hydraulic motor is provided on the bottom frame; a center of the steering disc is provided with a 360-degree left and right rotating hydraulic-electric transmission connector; vertical bars for supporting the steering disc rack are further provided on the surface of the bottom frame; steel plates are arranged at intervals on a surface of the steering disc rack; two vertical support bars are arranged in the middle of one outer side of the steering disc rack; sleeve shaft joints are provided at the upper and lower ends of the support bars, the sleeve shaft joint at the upper end is arranged on an upper end of a balance bar, and a plurality of iron plates is provided at a lower end of the balance bar; the upper and lower ends of the support bar are provided with lifting oil cylinders; one end of each lifting oil cylinder is arranged on the lower end of the support bar and the upper end of the balance bar; the bottom ends of the oil cylinders are respectively arranged outside the upper and lower ends of the support bar; a transmission shaft is arranged on an outer side of the steering disc rack; bearings, bearing seats, 14-tooth sprocket wheels, and conveying chains are arranged at intervals on the transmission shaft; the conveying chain is provided with sugarcane pulling bars at intervals; and the transmission shaft is driven by a hydraulic motor.

The other outer side of the steering disc rack is provided with upper and lower movable walls of the conveyor; the upper and lower movable walls each have a width of about 2000 mm; surfaces of the upper and lower movable walls are provided with steel meshes or steel plates at intervals; the upper and lower movable walls are provided with upper and lower wall support square steel tubes at intervals; an upper end of the upper wall support square steel tube and upper and lower ends of the lower wall support square steel tube are provided with transmission shafts; the transmission shaft at the upper end of the upper wall is provided with 14-tooth sprocket wheels and conveying chains at intervals; sugarcane supporting hooks are arranged at intervals on the conveying chain; the transmission shaft at the upper end of the lower wall is provided with 28-tooth sprocket wheels and 14-tooth sprocket wheels at intervals; the transmission shaft at the lower end of the lower wall is provided with 14-tooth sprocket wheels and conveying chains at intervals; sugarcane supporting hooks and bearing sleeve movable joints are arranged at intervals on the conveying chain; the bearing sleeve movable joints are respectively provided with a transmission shaft, a sprocket wheel, a bearing, and a bearing sleeve; two ends of the bearing sleeve are provided with outer sleeves; one surfaces of the outer sleeves are respectively connected to two steel plates, and the steel plates are drilled on surfaces thereof and are fixed by bolts to the end of the disc rack square steel tube inside the upper end and the lower end of the lower wall support square steel tube by bolts; a middle surface of the bearing sleeve is respectively welded with a square steel; and the square steel is drilled and is fixed by bolts to the lower end of the upper wall support square steel tube and into a square steel tube at the lower end of the lower wall support square steel tube.

A square steel is welded on a surface in the middle of the bearing sleeve, a rectangular hole is drilled at the other end of the square steel where a compression spring is inserted, and the square steel is fixed by bolts at the lower end of the upper wall supporting square tube and into the square tube at the lower end of the lower wall supporting square steel tube; the bearing sleeves are respectively arranged at the upper end of the upper wall supporting square steel tube; the 14-tooth sprocket wheels of the transmission shaft at one outer side of the steering disc rack and the 14-tooth sprocket wheels of the transmission shaft at the lower end of the lower movable wall are connected by a conveying chain; the 14-tooth sprocket wheels of the transmission shafts at the upper and lower ends of the lower movable wall are connected by a conveying chain; the 14-tooth sprocket wheels of the transmission shaft at the upper end of the upper movable wall and the 28-tooth sprocket wheels of the transmission shaft at the upper end of the lower movable wall are connected by a conveying chain; the conveying chains of the upper and lower movable walls and a drum in the conveying chain of the steering disc rack are all higher than bottom surfaces of chain pieces on both sides; the conveying chains, the sugarcane supporting hooks, and the sugarcane pulling bars are respectively provided with a bottom supporting sliding plate; the lower end of the upper movable wall and the lower end of the lower movable wall are respectively provided at both sides with the lifting ends of the lifting oil cylinders at intervals, and the bottom end of the oil cylinder is arranged outside the upper end of the lower movable wall and the bottom end of the lower movable wall.

Double-sided bending plates for supporting chains or rolling wheels for supporting the drums are arranged respectively behind the 14-tooth sprocket wheel at the upper end of the supporting square steel tube of the lower movable wall; the rolling wheel is provided with two bearings, and a seam for allowing the sugarcane supporting hook of the conveying chain to pass through is provided between the bearings; the top surfaces of the bearings on both sides support the double-sided bending plates or drums at both sides; a sprocket wheel for positioning conveying chains is respectively arranged above the rollers; the 14-tooth sprocket wheels of the transmission shafts at the upper and lower ends of the lower movable wall and the 14-tooth sprocket wheels of the transmission shaft at the upper end of the upper movable wall are connected and driven by a conveying chain; vertical baffle plates are further arranged at a rear end edge and a right edge on the surface of the steering disc rack and at two side edges of the upper and lower movable walls; in another structure, two sides of the surface of the steering disc rack are provided with upper and lower movable walls, ordinary bicycle single-speed flywheels are provided respectively in sprocket wheels arranged on transmission shafts at lower ends of conveying chains of the lower movable walls on both sides, and surfaces of the upper and lower movable walls and the surface of the steering disc rack each have a width of 1000 mm.

Vertical inner and outer frames of a whole-stalk sugarcane bundling machine are provided on the surface of the steering disc rack, and the inner and outer frames on one side are connected to the steering disc rack on a lower side; the inner and outer frames on one side of the upper and lower movable walls are elevated until the lower end of a bottom supporting plate bracket of the bundling machine is overhead; two opposite inclined sugarcane supporting sliding plates are arranged on both inner sides above the frame; sleeve shaft joints are respectively arranged at both ends of the inner frame of the sugarcane supporting sliding plates; steel plates for adjusting the inclination of the sugarcane supporting sliding plates are respectively arranged at both ends of the outer frame of the sugarcane supporting sliding plates; and a seam is provided in the middle of the steel plate which is fixed to the outer frame by bolts through the steel plate seam.

About 4 high-temperature-resistant and non-toxic plastic sheet reels are provided respectively at intervals on two outer sides of the sugarcane supporting sliding plate; sugarcane supporting plates are arranged on both sides of the bottom surface of the sugarcane supporting sliding plate; linear guide rails are arranged at intervals on the sugarcane supporting plates on both sides; the linear guide rails are provided with sliding blocks at intervals, and the bottom surfaces of the sliding blocks are respectively fixed on a surface of a rectangular steel plate; an outer end of the steel plate is respectively provided with sleeve shaft joints which are fixed on the outer frame; a bottom surface of an inner end of the steel plate is respectively provided with top supporting bars; a groove is formed in an inner end of the sugarcane supporting plate on one side; a protruding serrated blade or a cutter edge is provided at the middle of an inner end of the sugarcane supporting plate on the other side; hanging and supporting bars are provided at both inner ends of the sugarcane supporting plates on both sides; a weighing sensor is arranged on the middle of a bottom surface of the sugarcane supporting plate on one side; two proximity sensors are respectively arranged at intervals on bottom surfaces of one ends of the sugarcane supporting plates on both sides; lifting oil cylinders are provided on bottom surfaces of both ends of the sugarcane supporting plates on both sides; one end of the lifting oil cylinder is arranged on an inner side of the sugarcane supporting plate, and the bottom end of the oil cylinder is arranged on the outer frame; compression plastic frames are arranged on both sides of the bottom of the sugarcane supporting plate; two proximity sensors are respectively arranged at intervals on the bottom surface of one end of each of the compression plastic frames on both sides; linear guide rails are provided at intervals on the compression plastic frames on both sides; inner ends of the linear guide rails on both sides are respectively provided with compression plastic sheet assemblies; each assembly is provided with a hollow pressing plate, an electric heating tube, a temperature sensor, a compression spring, and bolts; grooves are formed in a surface of the hollow pressing plate of each of the assemblies on both sides; a serrated blade is provided in the middle of the groove in the surface of the hollow pressing plate of the assembly on one side; the linear guide rails on both sides are provided with sliding blocks at intervals, and bottom surfaces of the sliding blocks are fixed on the frame; lifting oil cylinders are arranged in the middle of bottom surfaces of the compression plastic frames on both sides; one end of the lifting oil cylinder is provided on an inner side of the compression plastic frame, and the bottom end of the oil cylinder is provided on the outer frame; sugarcane pressing frames are arranged on both sides of the bottom surface of the compression plastic frame; two proximity sensors are respectively arranged on bottom surfaces of one ends of the sugarcane pressing frames on both sides; the sugarcane pressing frames on both sides are provided with linear guide rails at intervals; a Y-shaped fork is arranged at an inner end of the linear guide rail, the linear guide rails are provided with sliding blocks at intervals, and the bottom surfaces of the sliding blocks are fixed on the frame; lifting oil cylinders are arranged in the middle of bottom surfaces of the sugarcane pressing frame on both sides, one end of the lifting oil cylinder is provided on an inner side of the sugarcane pressing frame, and the bottom end of the oil cylinder is provided on the outer frame; bottom supporting plates are provided on both sides of the bottom surface of the sugarcane pressing frame; two proximity sensors are respectively arranged on bottom surfaces of one ends of the bottom supporting plates on both sides; the bottom supporting plates on both sides are provided with linear guide rails at intervals, the linear guide rails are provided with sliding blocks at intervals, and the bottom surfaces of the sliding blocks are respectively fixed on the frame; lifting oil cylinders are arranged in the middle of bottom surfaces of the bottom supporting plates on both sides, one end of the lifting oil cylinder is provided on an inner side of the bottom supporting plate, and the bottom end of the oil cylinder is provided on the outer frame. Sugarcane blocking plates extendable backwards are further arranged at rear ends of both sides of the sugarcane supporting sliding plates of the whole-stalk sugarcane bundling machine; linear guide rails of the sugarcane blocking plates extendable backwards are fixed on the frame by bolts; a rectangular bottom frame is further arranged on two outer sides of bottom surfaces of the bottom supporting plates of the whole-stalk sugarcane bundling machine; circular holes are formed in the middle of front ends on both sides of the bottom frame, and a gap in the bottom surface of the circular hole is sealed by a steel plate and bolts; walking wheels are arranged on both sides of a rear end of the bottom frame; a soft steel wire rope are further respectively arranged on both sides of a rear end of a top surface of the whole-stalk sugarcane bundling machine, the other end of each soft steel wire rope is respectively connected to the lifting ends of the lifting oil cylinders, and bottom ends of the oil cylinders are respectively arranged on both sides of the frame above the tail part of the harvester.

Sugarcane stalks slide from the two opposite inclined sugarcane supporting sliding plates above the whole-stalk sugarcane bundling machine to the lower sugarcane supporting plates on both sides; the weighing sensor arranged on the sugarcane supporting plate weighs the sugarcane stalks until a specified weight is reached; the sugarcane supporting plates on both sides are opened so that the sugarcane stalks fall to the bottom supporting plates while the sugarcane supporting plates are closed; plastic sheets in the reels on both sides of the sugarcane supporting sliding plate have been connected to the bottom of the sugarcane supporting plate in advance and are pressed by the falling sugarcane stalks onto a surface and both side walls of the bottom supporting plate; the Y-shaped fork of the sugarcane pressing frames on both sides is closed to press the sugarcane stalks into a circle bundle; the compression plastic sheet assemblies provided on the compression plastic frames on both sides are closed, so that the plastic sheets on both sides are held together and adhered to form an adhered part with a height of 20 mm, and the serrated blade in the groove divides the adhered part in the middle, then the compression plastic frames are opened while the sugarcane pressing frames are opened, and the bottom supporting plates are opened and then closed; such bundled sugarcane stalks fall to the surface of the steering disc rack and are transported to the lower ends of the upper and lower movable walls by the conveying chains on the surface of the steering disc rack; and the bundled sugarcane stalks are then transported by conveying chains of the upper and lower movable walls to a carriage of a sugarcane transporting truck. The sugarcane supporting plates will be opened again when the sugarcane stalks thereon are weighed to reach the specified weight, and this operation is repeated continuously. The whole process is controlled by an automatic control unit provided outside the top surface of the bundling machine. The technical scheme of front and rear four drive wheels of the harvester is configured with reference to the prior art automobiles.

When the harvester is working, a hydraulic oil tank supplies oil to a hydraulic oil pump, and the output pressure oil from the hydraulic oil pump is distributed to a hydraulic oil combination manual switch control system and an electro-hydraulic oil combination control system and is then distributed to each lifting oil cylinder and motor, or supplied to a hydraulic-electric steering connector; the oil then flows to the electro-hydraulic oil combination control system and is then distributed to each lifting oil cylinders and motor for operations. After the operations, the oil pipe returns the oil to a hydraulic oil cooler, and then the oil pipe returns the cooled oil to the hydraulic oil tank. The above parts are controlled by the automatic control unit.

BENEFICIAL EFFECTS OF THE PRESENT INVENTION

Beneficial Effects

Compared with the prior art, the present invention has the following positive effects and advantages.

1. According to the frame of the combined sugarcane harvester provided by the present invention, the combined sugarcane harvester is provided with the sugarcane root grinding cutter used to grind a single sugarcane row or double sugarcane rows, and a base frame connected to a bottom wheel across the single sugarcane row or the double sugarcane rows. The bearing sleeve joints for lifting the front frame are arranged on the frames on two sides above the front of the driving steering wheel of the harvester. After the bearing sleeve joints are arranged behind the front frame, so that the front frame can be lifted, a rear roller transmission shaft can drive the roller transmission shaft on the front frame to rotate. The warpage of the front and rear machine bodies generated when the harvester runs may cause less adverse effects on the sugarcane root cutter arranged on the front frame for cutting the sugarcane root and the sugarcane tail cutter arranged at the front upper frame for cutting the sugarcane tail. The lifting oil cylinders are arranged at both sides of the front frame to lift the front frame, so that the harvester body is shortened, and the U-turn is faster, The rear frame roller transmission shaft drives the roller transmission shaft with bearing sleeve joints, and then drives the front roller transmission shaft to rotate, which does not affect the lifting of the front frame and the rotation of the bearing sleeve joint transmission shaft, so that the front frame roller does not need to be driven by another power. The sugarcane root grinding cutter is arranged at the front end of the frame, and the sugarcane leaf scraping and peel peeling roller of the front frame is connected to the rear frame roller, so that there is enough space inside the walking steering wheel at the front end of the rear frame to arrange the driving steering wheel, and the harvester can realize the driving operation of the four-wheel drive kinetic energy of the front and rear wheels on the mountain farmland.

2. The sugarcane supporting bar of the combined sugarcane harvester of the present invention has a wide front and a narrow back so as to facilitate the scattered sugarcane stalks to enter the sugarcane supporting bar in a more favorable manner, the upper end of the sugarcane stalk is supported by the sugarcane supporting bar, and the sugarcane root will not fall down after it is grinded and cut by the sugarcane root grinding cutter, which makes it easier for the sugarcane stalks to be delivered away by the sugarcane stalk conveyor for hooking upward.

3. According to the sugarcane tail cutter of the combined sugarcane harvester of the present invention, support feet of the sugarcane tail cutter are arranged on the left and right sides in front of the front frame. Compared with the support feet of the existing sugarcane tail cutter that are arranged in front of a driving console, when the harvester is running, the wrappage range of the sugarcane tail cutter is smaller, the positioning of upper and lower altitudes of the cut sugarcane tail is more accurate, and a row of scissor blades is arranged at intervals, which is conducive to the in-situ cutting of sugarcane tails scattered during growth with a width of more than 800 mm and more. Therefore, the cutting is more accurate and cleaner. If the scattered sugarcane tails are narrowed too much and then cut, the effect of which is not optimal, the fallen tail leaf sliding plate grooves are disposed under the transmission shaft on both sides of the scissor blade rack, and the scissor blades are disposed in a row to cut the cut sugarcane tails to be neatly pulled out by the tail leaf rotator to the leaf supporting plate, and then delivered to a position below the tail leaf sliding plate groove by the conveying chain that can be turned left and right. The tail leaf sliding plate groove adjusts the accurately specified distance to which tail leaves are required to slide by means of the lifting oil cylinder, so that the tail leaves can slide down to the designated sugarcane row surface, which is conducive to the centralized recovery of the tail leaves, but the tail leaves are scattered everywhere while being cut by the existing tail leaf cutters.

4. The left and right sugarcane root grinding cutters of the combined sugarcane harvester of the present invention are circular discs that are provided with the impurity removing seams at intervals on the outer circumference of the disc. The upper and lower surfaces of a notch in exterior circle of the disc is provided with notches of arrowed triangle shape on outer circumference of the disc and corner faces above and below the triangle notches, and alloy steel sand particles are arranged on the surfaces on both sides of the impurity removing seams. Transmission structures of the disc include: 1, the transmission shafts are respectively disposed in center holes of the left and right discs, the upper and lower ends of each transmission shaft are respectively equipped with bearings and bearing seats, the bearing seats at the upper and lower ends are respectively fixed to the frame by bolts, the disc is fixed at the lower end of the transmission shaft through a circular clamping plate, the upper end of the transmission shaft is respectively equipped with V-belt pulleys, and the belt pulleys pass through an end of the transmission shaft of a roller at the sugarcane inlet to scrape sugarcane leaves and peel the sugarcane peels, through the transverse transmission shaft above the chain drive part, and then rotate left and right by cross-driving the disc via the V-belt pulley provided on the transverse transmission shaft; 2, transmission shafts, bearings, bearing seats, bevel gears, sprocket wheels, transverse raising plates for fixing discs, and cover plates disposed on the bottom surface of the transverse raising plates are arranged on the bottom surface of a center hole of a single disc, the cover plates are fixed by bolts, transmission chains and transmission shafts are arranged in the raising plates, bevel gears are disposed at two ends of the transmission shaft, two ends of the raising plate are fixed on both sides of the frame by bolts, the disc is fixed on the raising plate surface at the upper end of the transmission shaft through a circular clamping plate, a vertical transmission shaft is provided at one end of the raising plate, bevel gears and sprocket wheels are disposed at the lower end of the transmission shaft respectively, and V-belt pulleys are disposed at the upper end of the transmission shaft; 3, elastic rubber sheet barriers are arranged on both sides of the front end of a single disc; 4, the vertical and transverse raising plates for fixing the disc are respectively disposed on the bottom surface of the disc, cover plates are disposed on the bottom surfaces of the vertical and transverse raising plates, the cover plates are fixed by bolts, the rear end of the vertical raising plate is welded to the middle section of the transverse raising plate, the transmission shafts are respectively disposed in the raising plates, and bevel gears are disposed at two ends of the transmission shaft; 5, the transmission shaft is disposed above the center hole of the single disc, and raising bars for fixing the transmission shaft are disposed behind the disc surface at the lower end of the transmission shaft in a vertical direction and under the bottom surface of the disc in a transverse direction respectively. The single or two discs are driven by the transmission shaft at one end of the roller at the sugarcane inlet to scrape sugarcane leaves and peel the sugarcane peels, so as to avoid the use of an oil motor for transmission, which will save fuel. The alloy steel sand particles have super hardness and sharp corner edge, and may cut hard stone directly and keep the incision not blunt for a long time, and cut the sugarcane roots by grinding instead of using a knife. The disc is provided with impurity removing seams at intervals to help the mud powder under the sugarcane roots enter the incision surface of the disc circumference to absorb the sticky sugar water sticking to the incision surface of the disc circumference when grinding and cutting the sugarcane roots, to reduce the friction force of the upper and lower incisions on the circumference of the disc against the upper and lower sugarcane root surfaces and facilitate the discharge of sugarcane tails, which can reduce the rate of sugarcane root surface breakage. Alloy steel grit disposed on the disc to grind and cut surface of sugarcane root enables continuous operation in the sugarcane field with muddy sediments for more than 3 months while keeping the incision sharp and not blunt, especially the design of single disc cutting will not cause damage to the disc when it encounters a large stone, and can effectively grind the sugarcane root to reduce the rate of sugarcane root surface breakage to close to zero, thereby solving the troublesome technical problem that a large number of broken heads occur when cutting sugarcane roots by sugarcane harvesters. The transmission shaft is installed in the center hole of the disc, and the transmission shaft is equipped with multiple transmission technologies, which meet requirements for a number of types of drives from an inlet roller.

5. With respect to the sugarcane stalk conveyor for hooking upward of the combined sugarcane harvester of the present invention, the square steel tubes arranged at intervals are lower in the front and higher in the rear. The roots of the sugarcane stalks enter the square steel tubes that move upward continuously after the sugarcane roots are grind-cut by the sugarcane grinding cutter while the tails of sugarcane stalks are supported by the sugarcane supporting bar, the sugarcane roots also move upward under the friction force of the square steel tubes. When the sugarcane roots move to a certain height, the friction force becomes smaller, and the sugarcane roots will fall down forcefully due to a space between the square steel tubes. At the same time, under the action of the square steel tubes and steel nails that move upward continuously, the sugarcane stalk is firmly tied into the steel nails on the surface of the square steel tube at a position about 20 mm above the bottom of the sugarcane root. The steel nails in each set are disposed against the entrance of a sugarcane groove in the roller, so that the sugarcane stalks will be accurately hooked into the sugarcane groove of the roller, and the steel nails imbedded into the sugarcane stalks on the square steel tube surface are automatically pulled out after the circular sprocket wheel of the conveying chain changes a direction. In this way, after the sugarcane root is cut off, the sugarcane root is directly hooked and pulled up into the roller higher from the ground, so that the sugarcane stalks do not need to be bent and then enter the roller.

6. The combined sugarcane harvester of the present invention is provided with a plurality of rollers for scraping sugarcane leaves, peeling sugarcane peels and conveying sugarcane stalks by using circular plates arranged at intervals, a plurality of rows of rollers arranged at intervals for scraping sugarcane leaves, peeling sugarcane peels and conveying sugarcane stalks, and two layers of rollers arranged vertically for scraping sugarcane leaves, peeling sugarcane peels and conveying sugarcane stalks. Single-layer, single-row or multi-row rollers are arranged on both sides of the frame behind the sugarcane root grinding cutter. The rollers have the functions of peeling sugarcane peels, scraping sugarcane leaves and conveying sugarcane stalks. The surface of the circular plate of the roller is provided with an elastic rubber sheet, which can closely cling to the surface of the sugarcane stalk like a human palm, the head of an outer hexagonal bolt can be inserted into the sugarcane peels to peel off the sugarcane peels, and the space that the bolt head is away from the rubber sheet may also be set through a gasket to position the depth of the edge of the bolt head inserted into the sugarcane peel to ensure that the sugarcane peel will not be damaged by peeling the sugarcane peel. The sugarcane pressing cover plate is disposed on the surface of the plurality of rollers for scraping sugarcane leaves, peeling sugarcane peels and conveying sugarcane stalks by using circular plates arranged at intervals, and the sugarcane leaf and peel blocking barriers and the sugarcane stalk guide plates disposed on the back are connected to form several independent channels for scraping sugarcane leaves, peeling sugarcane peels and conveying sugarcane stalks. The channels are provided with elastic rubber sheet, and there will be no sugarcane stalks forcibly entering at the entrance of the channel. The sugarcane entrance of each channel may only allow 1 to 2 sugarcane stalks to enter at the same time. Several rollers are installed continuously and rotate clockwise at about 500 revolutions per minute. The rubber sheet on the roller surface and bolt heads appear on each sugarcane section repeatedly to scrape sugarcane leaves and peel sugarcane peels, which can quickly and effectively scrape sugarcane leaves, peel off sugarcane peels, cut off the bottoms and clean up, and scrape off debris such as weeds, soil, sand and stones directly to the sugarcane row surface under the roller; if each channel is configured to allow 3 to 4 sugarcane stalks to enter at the same time, it is necessary to install about 10 rollers in a row and the diameter of the circular plate on the roller surface is increased to scrape the sugarcane leaves and peel the peels clean. The single-layer roller makes the frame shorter, the body lighter, more fuel-efficient, and the effective mass higher. Continuous installation of several rollers and the bearing seats at both ends of the transmission shaft that are fixed on the downward-facing bottom face of the frame on both sides by bolts are convenient for the removal of the rollers and maintenance.

7. The combined sugarcane harvester of the present invention includes a plurality of rows of rollers for scraping sugarcane leaves, peeling sugarcane peels and conveying sugarcane stalks by using rubber bars arranged at intervals. A single layer, a single row or two to four rows, two layers, single row or two to four rows of rollers are disposed on two sides of the frame behind the left and right sugarcane root grinding cutter. In the plurality of rows of rollers for scraping sugarcane leaves, peeling sugarcane peels and conveying sugarcane stalks by using rubber bars arranged at intervals, the sugarcane stalk channel from a sugarcane inlet roller to a sugarcane outlet roller at the tail of the harvester has a width of 639 mm and is open, and allows 11 to 33 sugarcane stalks to enter at a time for the roller to scrape sugarcane leaves, peel sugarcane peels and convey sugarcane stalks at the same time. Seven rollers are installed continuously at the same time and rotate about 500 times clockwise per minute, and the outer hexagonal bolt heads and nuts arranged at intervals on both sides of the rubber bar on the surface of the roller appear on each sugarcane section repeatedly to scrape the sugarcane leaves and peel the sugarcane peels, which can quickly and effectively scrape sugarcane leaves, peel off sugarcane peels, cut off the bottoms and clean up, and scrape off debris such as weeds, soil, sand and stones directly to the sugarcane row surface under the roller. It is faster to harvest sugarcane, scrape sugarcane leaves and peel the peels with better quality.

8. The sugarcane pressing cover plate of the combined sugarcane harvester of the present invention is a rectangular semicircle, wherein the edges of the front and rear sides are warped and the sugarcane pressing cover plate is respectively arranged to cover the circular plate surface of the roller for scraping sugarcane leaves and peeling sugarcane peels. The edges of both sides of the sugarcane pressing cover plate cover the edges of both sides of the roller circular plate that is more than 30 mm downward from the highest top surface of the roller circular plate. Both ends of sugarcane pressing cover plate are fixed at two sides of the frame by bolts. Bearing sleeve joints are disposed at two ends of the roller, and sleeve shaft joints are provided at the two ends behind the sugarcane pressing cover plate on the surface of the circular plate of the roller. The sugarcane pressing cover plate is disposed to cover a side of the roller for scraping sugarcane leaves, peeling sugarcane peels and conveying sugarcane stalks by using continuous helical blades. The upper and lower edges of the sugarcane pressing cover plate cover the edges at the two sides of the helical blade inwards more than 30 mm from the widest surface on the outer side of the helical blade. The sugarcane pressing cover plates are fixed on two sides of the frame with bolts at two ends and on both sides. The sugarcane pressing cover plate plays a key role in making the single-layer roller to scrape the sugarcane leaves and peel the sugarcane peels cleanly. The sugarcane pressing cover plate can realize the single-layer design of the roller and make the sugarcane be transported through a single channel and is beneficial to the scraping of sugarcane leaves and peeling of sugarcane peels by the roller. The sugarcane pressing cover plate prevents the sugarcane leaves and sugarcane peels from flying up and falling to the sugarcane row surface at the bottom of the roller. The sugarcane pressing cover plate can realize the multiple overlapping synchronous rotation design of a single continuous helical blade roller, so that the sugarcane stalks can be conveyed through the same channel and help the roller scrape the sugarcane leaves and peel the sugarcane peels more cleanly, and the sugarcane leaves, sugarcane peels, weeds and the like will fall down to the sugarcane row surface under one side of the rollers.

9. The sugarcane leaf and peel blocking barriers of the combined sugarcane harvester of the present invention can effectively block debris such as the sugarcane peels, sugarcane leaves, and weeds that have been stripped from falling down to sugarcane row surface under the roller under the rotation of the roller. Without the sugarcane leaf and peel blocking barriers, the inertia from delivering the sugarcane stalks will bring debris such as the sugarcane peels, sugarcane leaves and weeds that have been stripped off the stalks to stop the sugarcane stalks to the whole-stalk sugarcane conveyor or the sectioning type sugarcane conveyor outside the sugarcane outlet of the last roller at the tail end of the harvester, resulting in a large increase in debris.

10. The sugarcane stalk guide plate of the combined sugarcane harvester of the present invention is disposed to be narrow in the front and wide in the rear, which can effectively guide the sugarcane stalks to be conveyed in the independent sugarcane stalk conveying channel without passing through another sugarcane stalk conveying channel which will otherwise cause the sugarcane stalks to be broken and jam the roller. Two ends of the rectangular steel plate of the sugarcane stalk guide plate are fixed on both sides of the frame by bolts, and a sugarcane leaf blocking plate is respectively installed under the sugarcane stalk guide plate to prevent the roller from rotating and causing the sugarcane leaves to travel in the opposite direction.

11. A lifting oil cylinder provided on an inner cutter frame of the sugarcane-segment cutter of the combined sugarcane harvester of the present invention is controlled by an automatic control unit provided in the harvester to rise or fall once every 1 second, 2 seconds, 3 seconds or 6 seconds so as to achieve the purpose of cutting sugarcane stalks into segments. In the automatic control unit, a closed-loop control system constituted by a power supply part, a control part, a signal acquisition part, a signal processing part, and a drive part carries out electrical and oil automatic control of the functions of each part via the control buttons and the touch screen PLC to achieve the purpose of automatically controlling the devices. The touch-screen operation control panel can adjust the length and size of the desired sugarcane segments at any time as required, such as the length of each sugarcane segment is 600, 800, 1000 mm or more.

12. The left and right rollover safety device of the combined sugarcane harvester of the present invention can effectively prevent the left and right rollover of the harvester, and the lifting frames arranged on both sides are mainly used for lowering angle steel of the lifting outer frame on the side below the slope mountain ground to be close to the ground when it is working on the slope mountain ground. If the harvester rolls over in an accident, the lifting outer frame is lowered to the ground. At this time, the harvester can only be tilted within 80 mm when it rolls over, and it will be jacked by the angle steel on outer side of the lifting outer frame that is firmly inserted into the ground, so that it is safe for both the man and the machine as the harvester rolls over, and the driver can boldly drive the harvester to work in the slope sugarcane field after eliminating the fear of the rollover machine destroying people and death.

13. In an anti-left-and-right-rollover regulator of the combined sugarcane harvester of the present invention, the ends of the linear guide rails on both sides are provided with compression springs. The spring moves the oil motor teeth to the end of the rack and can no longer move forward. After the movement of the oil motor is stopped by the manual switch, the compression spring can bounce the oil motor teeth back to the rack position to facilitate the rotation of the oil motor teeth engaged with rack surface. Setting the manual switch to control the oil motor to move the iron plate left and right is beneficial for the iron plate to stop and move at any position. When working in slopes and mountains, the hydraulic motor is utilized to move several iron plates to the outer end of a mobile frame on a side above the slope and mountain ground beyond the edge of the upper side of the harvester to increase the weight pressure, so that the center of gravity of the harvester is above the slope and mountain ground. In this way, the harvester cannot tilt to the bottom of the slope and mountain ground when working on the slope and mountain ground and then fall sideways, eliminating the fear of the driver that the machine turns over and destroys people so the driver dares to drive the harvester to work on slopes and mountains. When the harvester travels without working, the iron plate moves to the middle section of the mobile frame through the hydraulic motor, and the outer ends of the left and right two sections of the mobile frame are lowered to the lowest position by the lifting oil cylinder to avoid excessive width of the harvester body, and the mobile frame of the regulator is adjusted to the lowest position by the lifting oil cylinder to avoid excessive height.

14. The continuous helical blades of the combined sugarcane harvester of the present invention are disposed spaced apart from the rollers for scraping sugarcane leaves, peeling sugarcane peels and simultaneously conveying the sugarcane stalks. The sugarcane stalks with length of 3 m in which the sugarcane tail is not accounted for and sugarcane root is cut by sugarcane root grinding cutter are directly transported as a whole to the extrusion space by sugarcane pulling bars of a plurality of upper and lower conveying chains on two sides of two rows of vertical ledge sugarcane stalk conveying channels. The oblique sugarcane stalks are stuck by the sugarcane pulling bars of the plurality of upper and lower conveying chains since the sugarcanes in the field are not completely vertical, so that the sugarcane root or the sugarcane tail first arrives at the extrusion space in the oblique sugarcane stalk transportation, leading to ending of quick movement of sugarcanes. At this point, the tail is delivered to the entrance of the extrusion space by the conveying chain quickly, and the originally oblique sugarcane stalks will become vertical sugarcane stalks due to the extrusion and movement of the subsequently conveyed sugarcane stalks; and then the vertical sugarcane stalk is delivered into a plurality of overlapping roller entrances by the sugarcane pulling bar of the rear conveying chain. If there are bent sugarcane stalks at this time, the serrated blades disposed at the entrance of the sugarcane stalk roller blades will directly cut off the sugarcane stalks to prevent the rollers from being stuck. If the continuous helical blade rollers are set to a length of 2271 mm, each space is 100 mm wide, and a vertical line between the overlapping blades has 17 helical blades with a width of 100 mm spaced apart to scrape sugarcane leaves, peel sugarcane peels and convey sugarcane stalks. The helical blades are set at each interval and allow only 1 to 2 vertical sugarcane stalks to enter to scrape the sugarcane leaves and peel the sugarcane peels up and down at the same time, and this process is repeated 17 times for each section of sugarcane stalk from the entrance of the roller to the exit of the roller to allow grass and other sundries to fall to the sugarcane row surface under one side of the roller. If the helical blades are set at intervals to allow 3 to 4 vertical sugarcane stalks to enter at the same time to scrape the sugarcane leaves and peels at the same time, a continuous helical blade roller has to be set to be longer and has larger diameter of the helical blade to scrape the sugarcane leaves and peel cleanly, and at the same time convey the sugarcane stalks to the bulk and whole-stalk sugarcane conveyor installed behind the sugarcane outlet at the tail of the harvester. If a circular saw blade is installed at the sugarcane outlet and a sugarcane-segment conveyor behind it, the harvester is in fact dual-purpose for whole-stalk sugarcane and sectioning type sugarcane as long as the conveyor behind the tail of the harvester is changed to obtain two types of results. Compared with the existing harvester in which the sugarcane stalk is bent and delivered to roller straightforward after the sugarcane root is cut, the effective quality of scraping sugarcane leaves and peeling sugarcane peels is higher and the harvesting speed of sugarcane is increased several times.

15. The whole-stalk sugarcane conveyor connector of the combined sugarcane harvester of the present invention can effectively and quickly connect the circular holes formed in both sides of the front end of various types of sugarcane stalk conveyors, as well as a rectangular lower pallet and a rectangular upper cover plate, and the triangular steel plate is installed on the whole-stalk sugarcane conveyor, which is conducive to steering and stable lifting. When working in slopes and mountains, an electromagnet is disposed at the lower pallet to attract the triangular steel plate to prevent displacement.

16. As for the whole-stalk sugarcane bundling and 180-degree left and right steering conveyor of the present invention, the sugarcane stalks of the sugarcane supporting sliding plates on the two opposite slopes above the whole-stalk sugarcane bundling machine slide down to the sugarcane supporting plates on both sides below, and the weighing sensor disposed in the sugarcane supporting plates weigh the sugarcane stalks, and when the weight reaches a specified weight, the sugarcane supporting plates on both sides open and the sugarcane stalk falls to the bottom support plate, and the sugarcane supporting plates are closed at the same time. Plastic sheets inside the rollers on two sides of the sugarcane supporting sliding plate are connected to the bottom of the sugarcane supporting plate in advance and are pressed on the surface and both sides of the bottom support plate by the fallen sugarcane stalks. The Y-shaped forks of the sugarcane pressing frames on both sides are closed to press the sugarcane stalks into a circle. The plastic pressing sheet assemblies provided in the plastic pressing frame on both sides are closed to enable plastic sheets on two sides to be glued together and the height is about 20 mm. At the same time, the serrated edge in a groove is divided in the middle. After the plastic frame is opened, the sugarcane pressing frame is opened at the same time. A bottom support plate is opened and closed simultaneously. The bundled sugarcane stalks fall to the turning disc frame, are transported to the lower ends of upper and lower movable walls by means of the conveying chain on the surface of the disc frame, and then are conveyed to a carriage of a sugarcane transport truck parallel to one side of the harvester by means of the conveying chains of the upper and lower movable wall; the sugarcane stalks of the sugarcane supporting plate are weighed to the specified weight and then opened again. This process is continuously repeated, and the whole process is controlled by the automatic control unit set on the top and outside of the bundling machine. In the automatic control unit, a power supply part, the control part, the signal acquisition part, the signal processing part, and the drive part constitute a closed-loop control system, and the functions of each part are implemented by electrical and oil automatic control via the control buttons and the touch screen PLC to achieve the purpose of automatic control of the devices.

If the walking wheels of the whole-stalk sugarcane bundling and 180-degree left and right steering conveyor are set to walk across the double sugarcane rows, and the whole-stalk sugarcane bundling machine is disposed on the surface of a steering disc frame, the two opposite slope sugarcane supporting sliding plates above the whole-stalk sugarcane bundling machine are disposed to interface with sugarcane stalks from two rows of sugarcane outlets at the tail of the harvester, so that this setting becomes a whole-stalk sugarcane bundling and 180-degree left and right steering conveyor that walks across the double sugarcane rows.

If bundling machine accessories under two opposite slope sugarcane supporting sliding plates above the frame of the whole-stalk sugarcane bundling machine provided on the surface of the steering disc frame in the whole-stalk sugarcane bundling and 180-degree left and right steering conveyor are removed, two opposite slope sugarcane supporting sliding plates enable sugarcane stalks conveyed from outlets at the tail of the harvester to slide to the sugarcane blocking plate at the rear accurately. The sugarcane root and sugarcane tails fall to the bottom of the steering disc frame at the same time without stopping, and are directly transported by the conveying chain on the surface of the steering disc frame to the lower ends of the upper and lower movable walls. The sugarcane stalks are transported by the conveying chains of the upper and lower movable walls to the compartment of the sugarcane transport truck parallel to the side of the harvester, which can reduce the weight of conveying frames and the conveying wall and is conducive to safety, fuel saving, and reduction of costs such as tying ropes and reduction of the sundries contained in the sugar-pressing bundle rope, so that this setting becomes a whole-stalk sugarcane bundling and 180-degree left and right steering conveyor, and the disc frame is disposed to convey sugarcane stalks by changing direction left and right at about 180 degrees, which is beneficial for the harvester to turn around and operate.

If the sugarcane blocking plate that is extendable backwards is further disposed at rear ends on two sides of the sugarcane supporting sliding plate of the whole-stalk sugarcane bundling machine disposed on the surface of the steering disc frame of the whole-stalk sugarcane bundling and 180-degree left and right steering conveyor. The linear guide rail of the sugarcane blocking plate that is extendable backwards is fixed on the frame by bolts, and a rectangular bottom frame is further disposed on both sides of the bottom surface of the bottom support plate of the whole-stalk sugarcane bundling machine. Circular holes are formed in the middle on two sides of the end in front of the bottom frame, and notches in the bottom surface of the circular holes are sealed by steel plates and bolts. A soft steel wire rope is arranged on both sides of the top and rear end of the whole-stalk sugarcane bundling machine, and the other end of the soft steel wire rope is respectively connected to a lifting end of the lifting oil cylinder. The bottom end of the oil cylinder is respectively arranged on both sides of the frame above the harvester tail, and walking wheels are disposed at two sides of the end at the back of the bottom frame, so that it becomes an independent whole-stalk sugarcane bundling machine.

If vertical baffles are further arranged at rear edges and right edges on the surface of the steering disc frame of the whole-stalk sugarcane bundling and 180-degree left and right steering conveyor and at both sides edges of the upper and lower movable walls, a conveying chain is disposed at a spacing of about 200 mm apart from surface of vertically-movable wall for the surface of the steering disc frame, and the movable wall surface is provided with a width of about 1000 mm for the disc frame surface, so that this setting becomes a sectioning type sugarcane stalk horizontal transport and 180-degree left and right steering conveyor.

In the case of the whole-stalk sugarcane bundling and 180-degree left and right steering conveyor, the vertical bars supporting the steering disc frame are further arranged on the bottom frame surface, the vertical bars are arranged at intervals on both sides of the rear end of the steering disc frame, and the one opposite-facing sugarcane supporting sliding plate is disposed in the front face of the upper end of the vertical bar respectively to interface with two sugarcane outlets at the tail of the harvester. The vertically-movable walls are arranged on both sides of the steering disc frame surface, and single-speed flywheels of ordinary bicycles are respectively arranged in the sprocket wheels set at the lower end of the transmission shaft of the conveying chain on the lower movable walls on both sides, which makes the transmission shaft at the lower end of the lower movable wall on both sides rotate clockwise. Then, the inner flywheel that is disposed at transmission shaft at lower ends of the lower movable wall on the right side drives the outer sprocket to rotate, and the inner flywheel that is disposed at transmission shaft at lower ends of the lower movable wall on the left side stops driving the outer sprocket wheel to rotate. In other words, the inner flywheel on the right side stops driving the outer sprocket wheel to rotate as transmission shafts on both sides rotate counterclockwise, and the inner flywheel on the left side drives the outer sprocket wheel to rotate. In this way, this setting becomes horizontal left and right transportation of bulk and whole-stalk sugarcane in which more than four sugarcane outlets at the tail of harvesters can be interfaced at the same time. The sectioning type cutting blades are installed at the sugarcane outlet at the tail of the harvester. A conveying chain is disposed in a space between the surface of the upper and lower movable walls and the surface of the steering disc frame that is 1000 mm wide and between the surface of the upper and lower movable wall and the surface of the steering disc frame that is 200 mm wide. Vertical baffles are respectively arranged at two side edges of the upper and lower movable walls on two sides and on the rear edge of the steering disc frame surface, so that this setting becomes the sectioning type sugarcane horizontal left and right fixed conveying mode, wherein the front ends of the conveyors on the left and right sides of the cut sugarcane are further fixed to the bottom of the sugarcane outlet at the tail of the harvester by bolts.

BRIEF DESCRIPTION OF THE DRAWINGS

The present invention will be further described with reference to the accompanying drawings.

DETAILED DESCRIPTION

Figure 1:
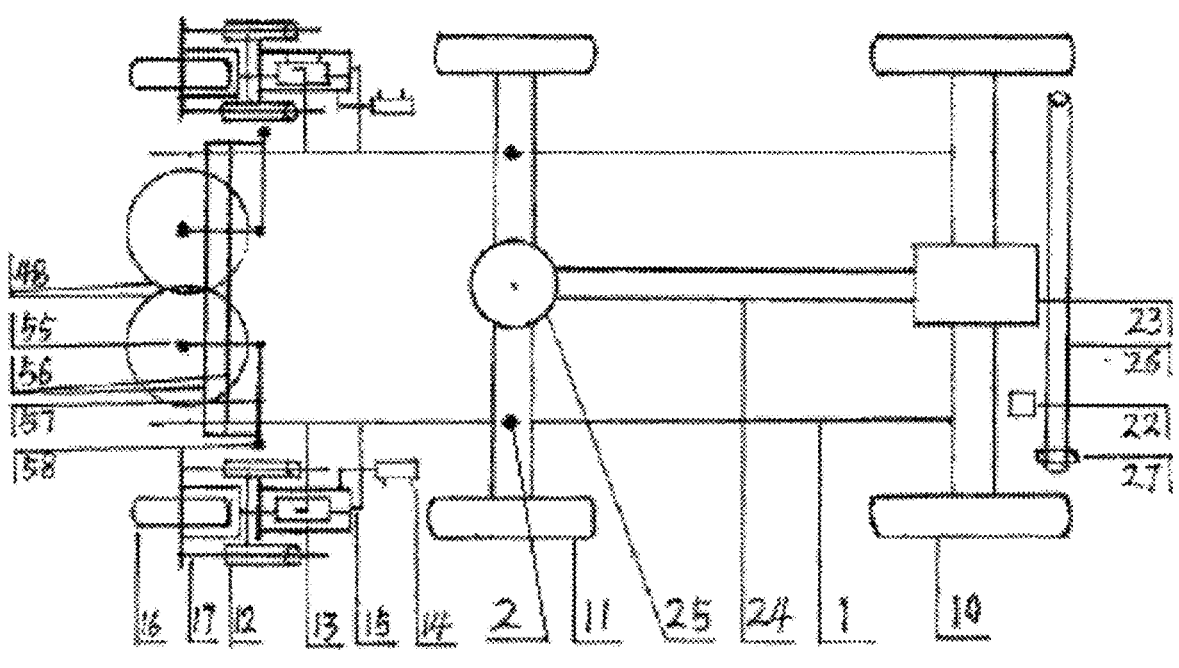
FIG. 1 is a top view of a bottom frame of a whole-stalk or sectioning type one-row combined sugarcane harvester according to the present invention, in which a bottom wheel walks across a single sugarcane row, and components such as a sugarcane tail cutter and rollers for scraping sugarcane leaves and peeling sugarcane peels, are removed.
Figure 2:
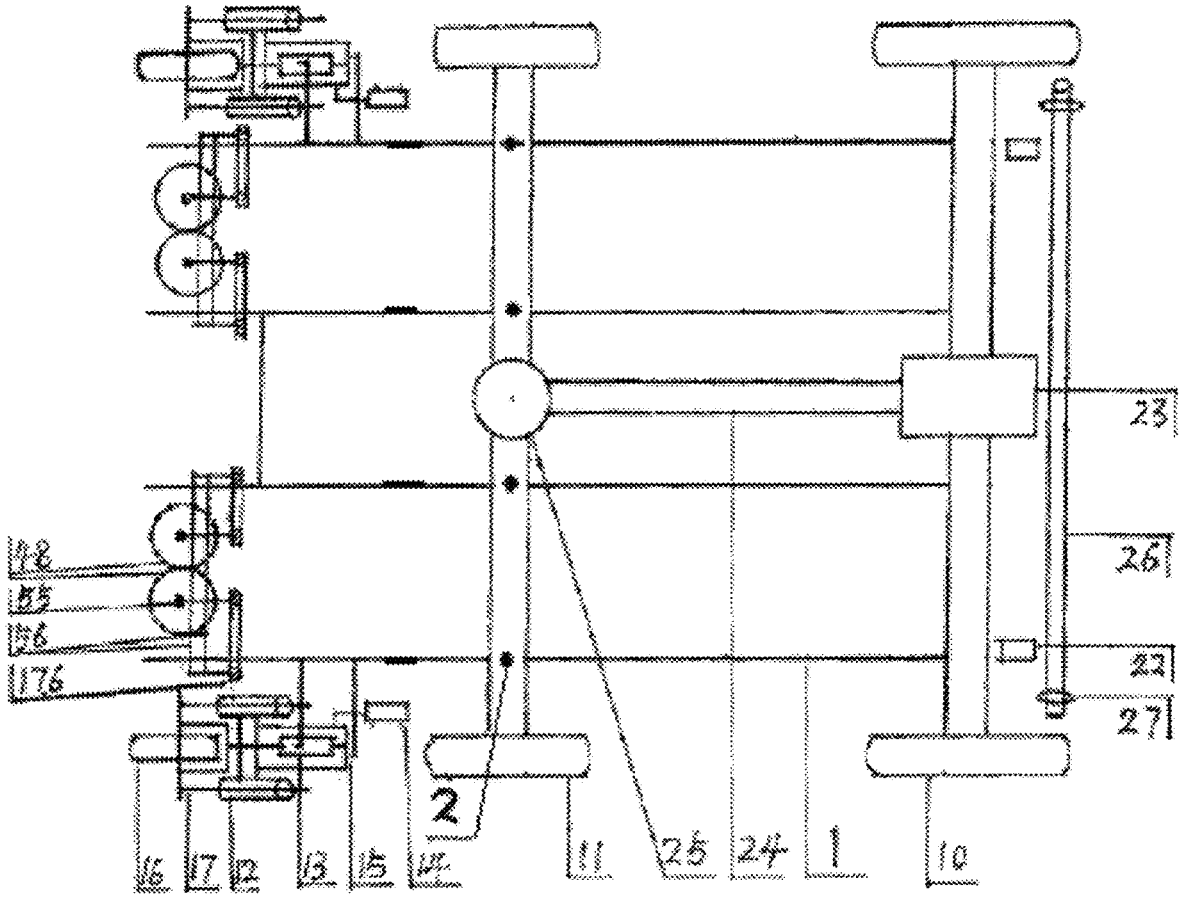
FIG. 2 is a top view of a bottom frame of a whole-stalk or sectioning type two-row combined sugarcane harvester according to the present invention, in which a bottom wheel walks across double sugarcane rows, and components such as a sugarcane tail cutter and rollers for scraping sugarcane leaves and peeling sugarcane peels, are removed.
Figure 3:
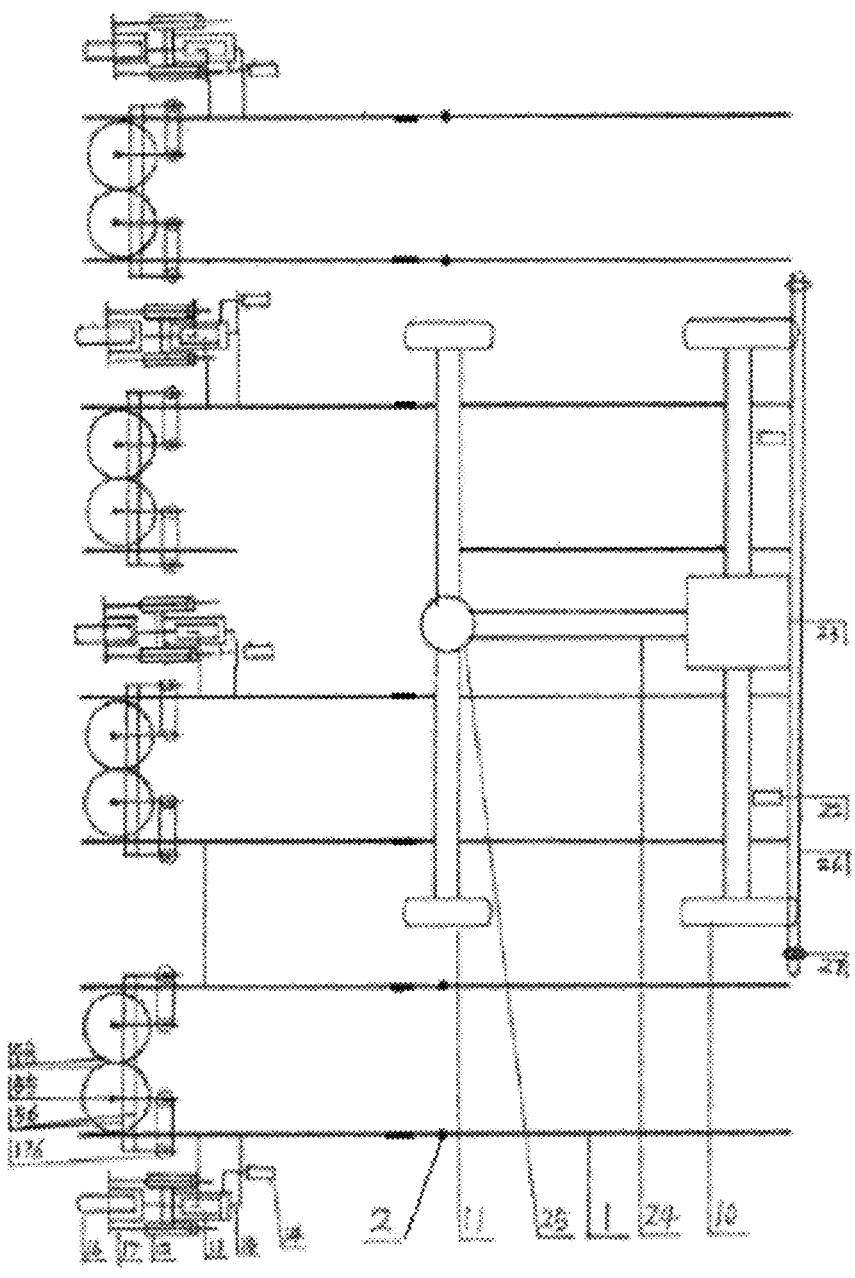
FIG. 3 is a top view of a bottom frame of a whole-stalk or sectioning type four-row combined sugarcane harvester according to the present invention, in which a bottom wheel walks across double sugarcane rows, and components such as a sugarcane tail cutter and rollers for scraping sugarcane leaves and peeling sugarcane peels, are removed.
Figure 4:
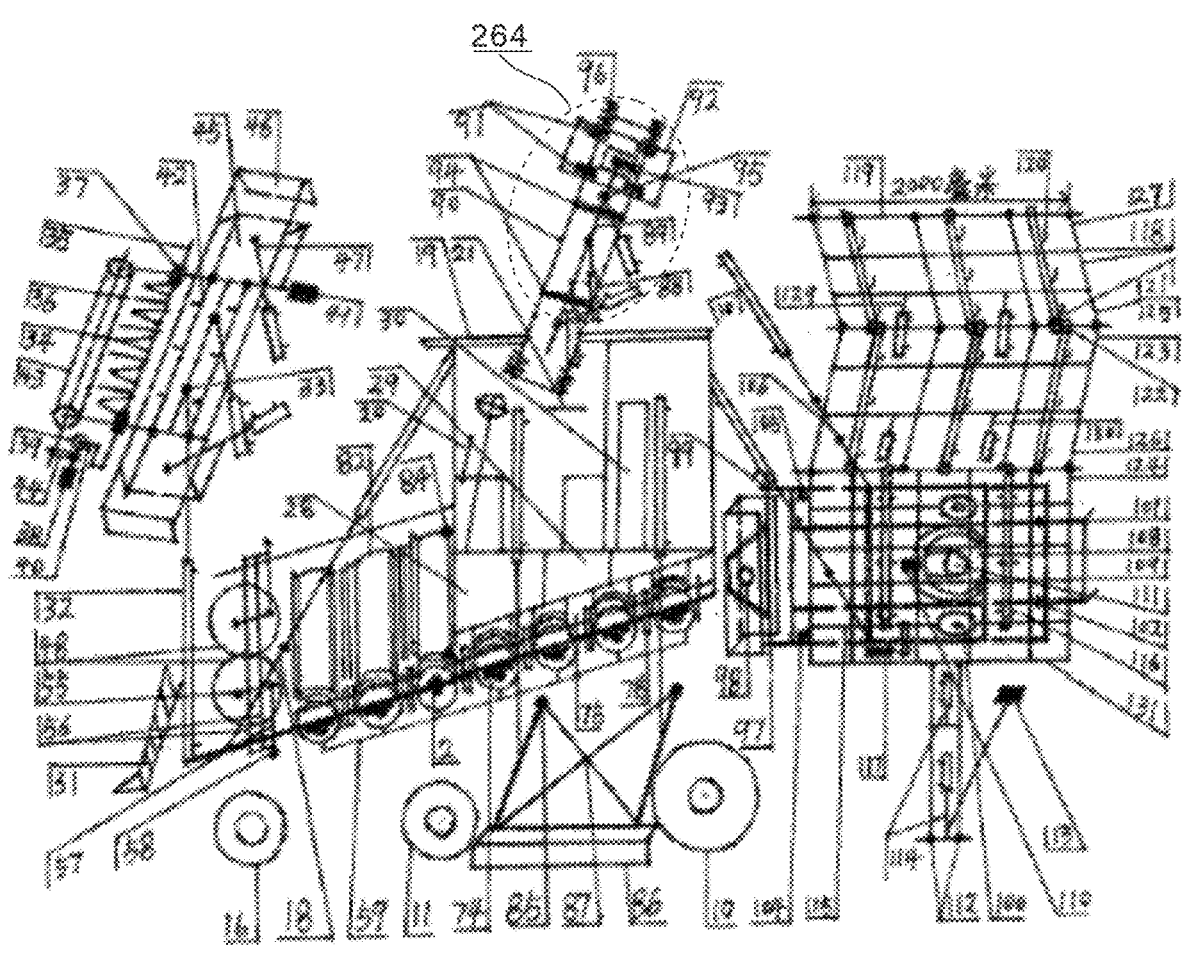
FIG. 4 is a schematic diagram 1 of a whole-stalk type one-row combined sugarcane harvester according to the present invention.
Figure 5:
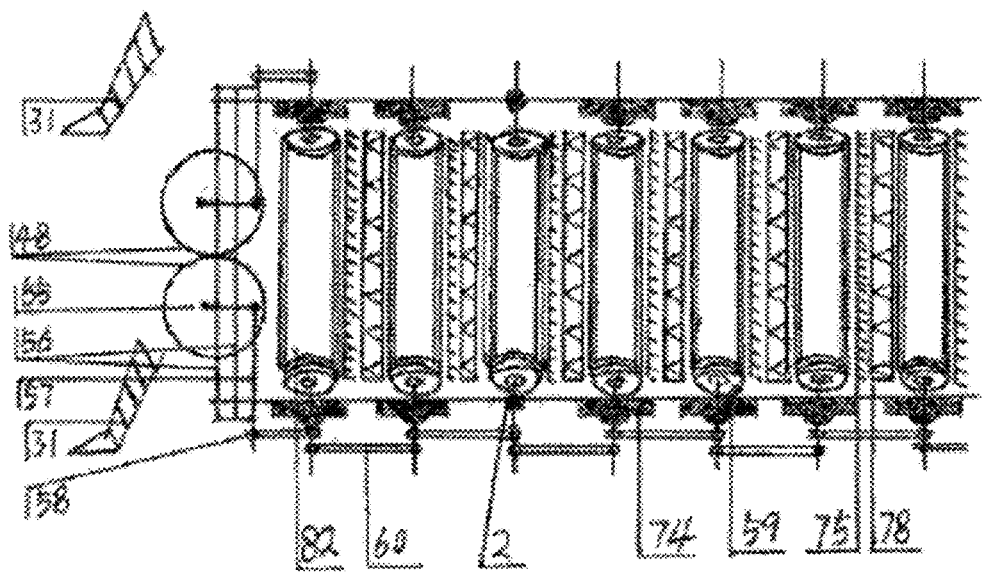
FIG. 5 is a top view of the whole-stalk type one-row combined sugarcane harvester according to FIG. 4 of the present invention, in which components, such as a sugarcane tail cutter, a driving wheel, a driving steering wheel and a liftable, walkable and steerable wheel, are removed.
Figure 6:
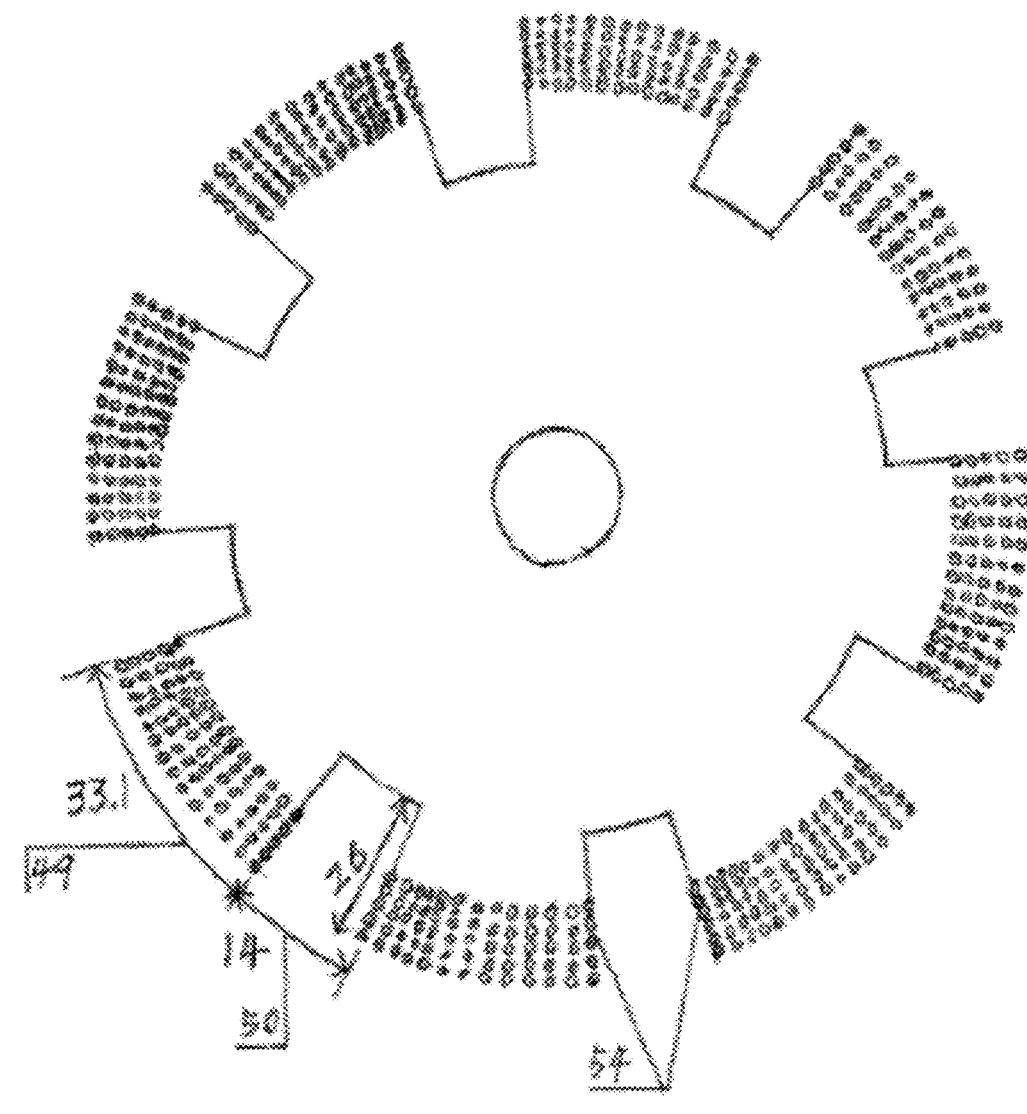
FIG. 6 is a top view of a disc of a left sugarcane root grinding cutter and a right sugarcane root grinding cutter of the whole-stalk or sectioning type combined sugarcane harvester according to the present invention.
Figure 7:
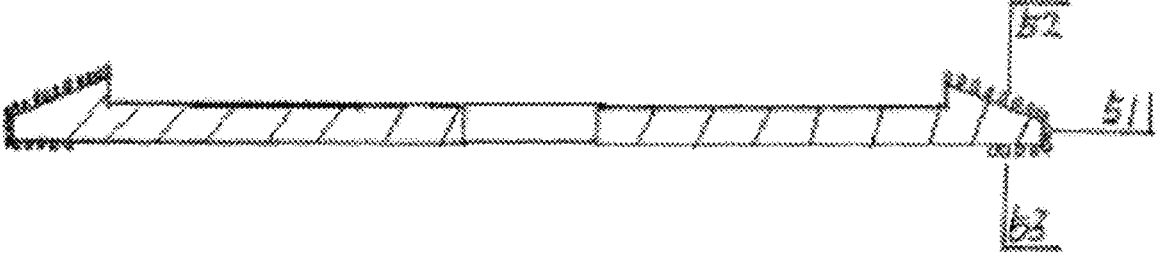
FIG. 7 is a sectional view of a disc of a left sugarcane root grinding cutter and a right sugarcane root grinding cutter of the whole-stalk or sectioning type combined sugarcane harvester according to the present invention.
Figure 8:
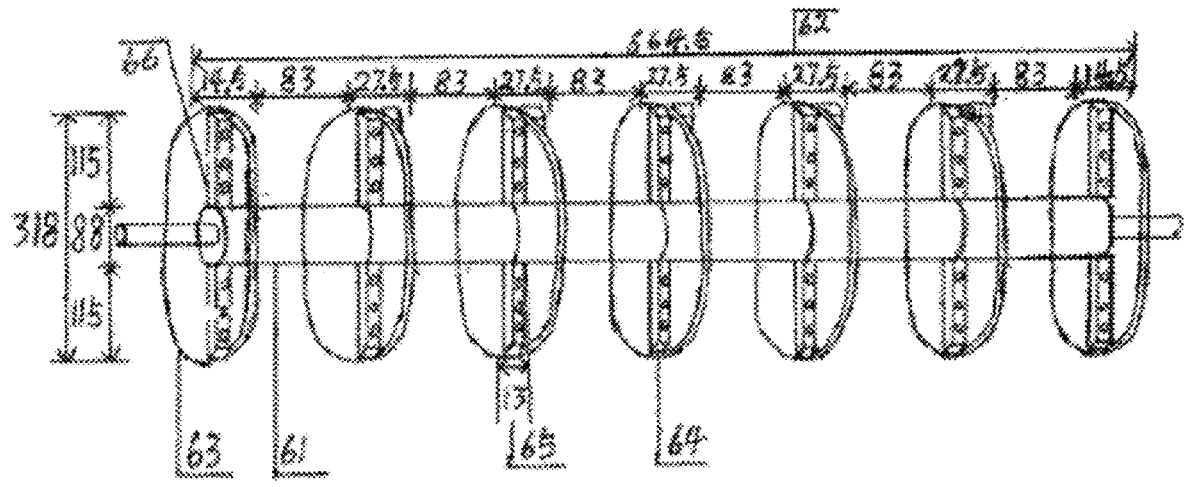
FIGS. 8, 9, 10 and 11 are schematic structural diagrams of a plurality of rollers for scraping sugarcane leaves, peeling sugarcane peels and conveying sugarcane stalks by using circular plates arranged at intervals of the whole-stalk or sectioning type combined sugarcane harvester according to the present invention, from which components, such as a bearing seat and a sprocket wheel are removed.
Figure 9:
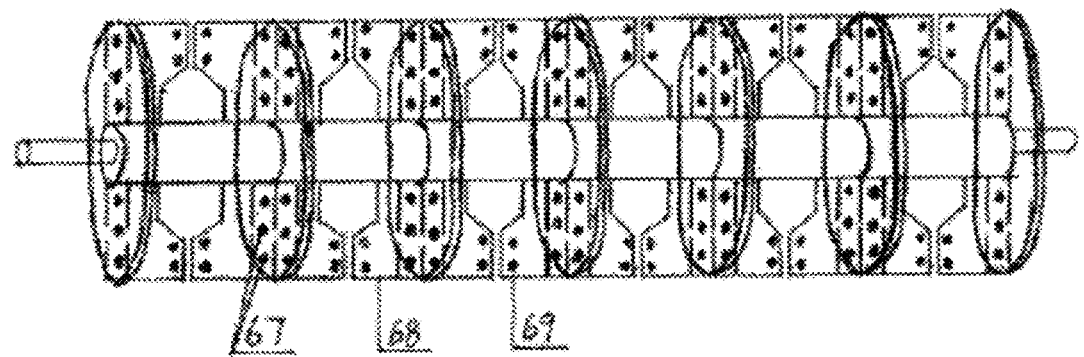
Figure 10:
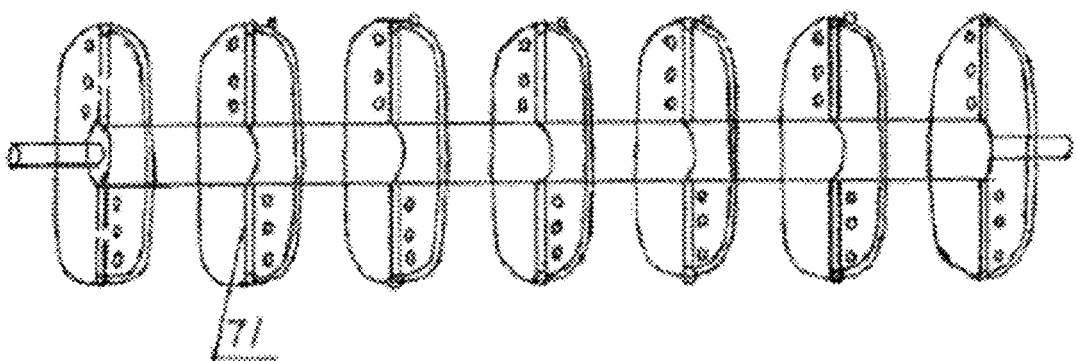
Figure 11:
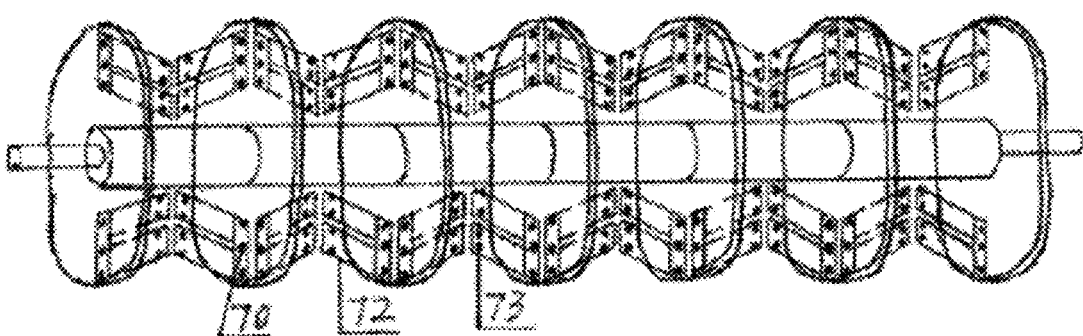
Figure 12:
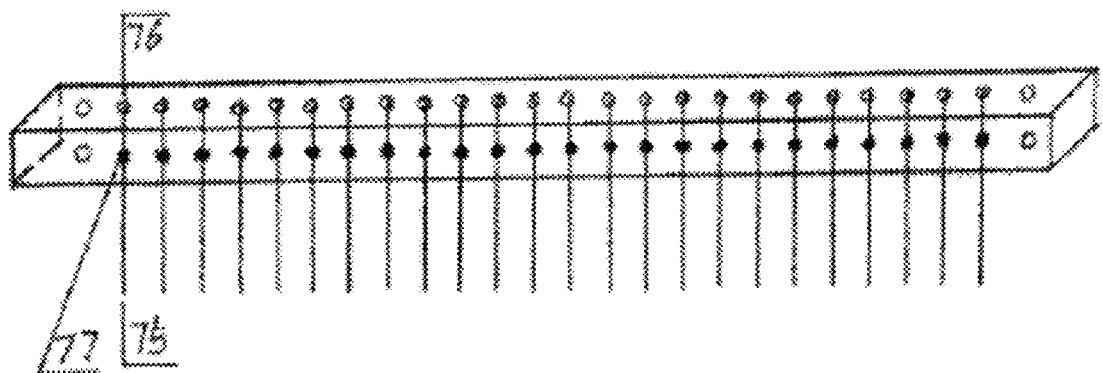
FIG. 12 is a schematic structural diagram of a sugarcane leaf and peel blocking barrier of the whole-stalk or sectioning type combined sugarcane harvester according to the present invention.
Figure 13:
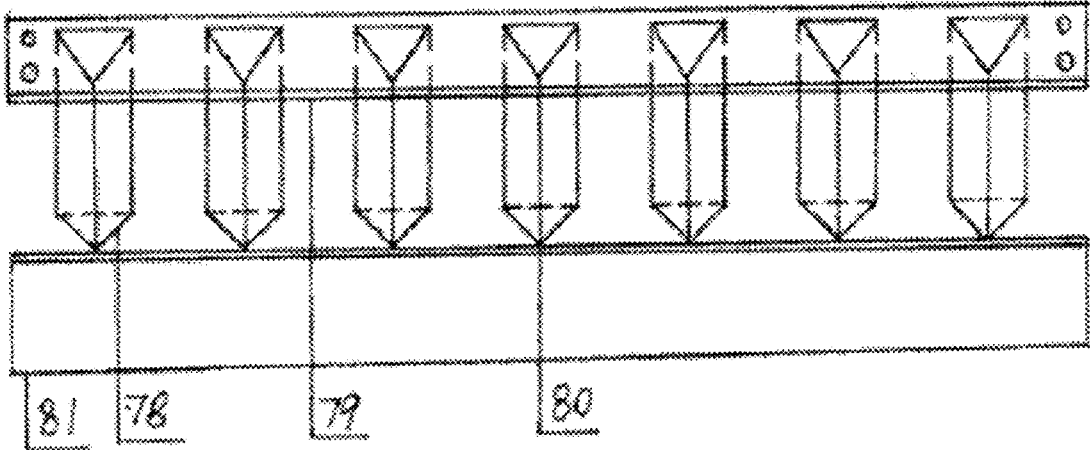
FIG. 13 is a schematic structural diagram of a sugarcane stalk guide plate of the whole-stalk or sectioning type combined sugarcane harvester according to the present invention.
Figure 14:
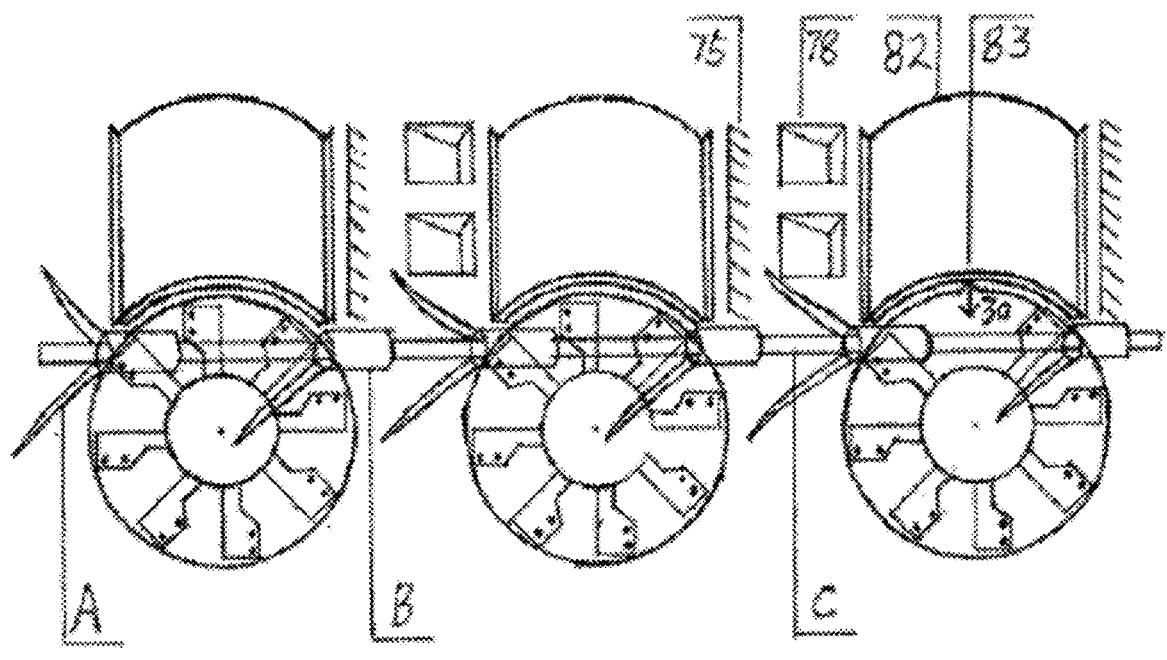
FIG. 14 is a schematic structural diagram of a sugarcane-pressing cover plate of the whole-stalk or sectioning type combined sugarcane harvester according to the present invention, which demonstrates scraping of sugarcane leaves, peeling of sugarcane peels, sugarcane leaves A, sugarcane peels B and sugarcane stalks C on a circular-plate face of the roller.
Figure 15:
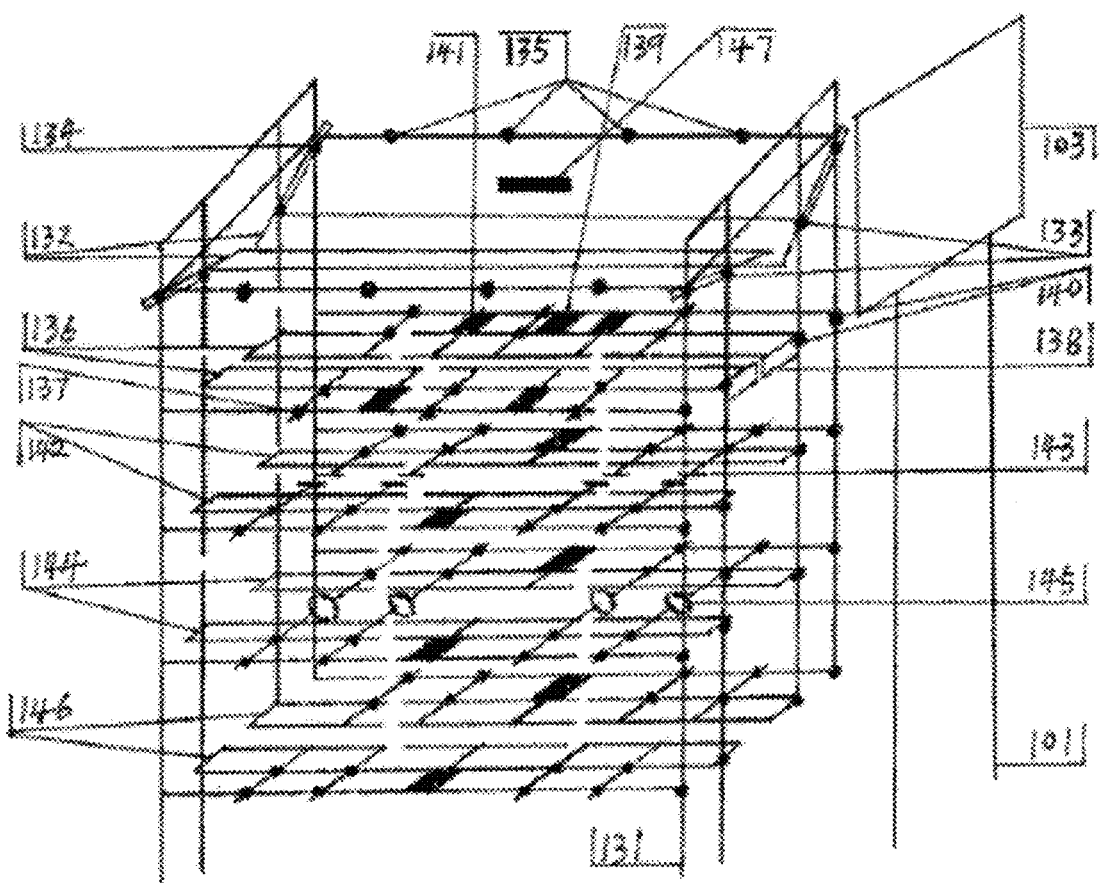
FIG. 15 is a schematic diagram of a binding machine on the side of a steering disc frame of a whole-stalk sugarcane bundling and 180-degree left and right steering conveyor arranged at the tail of the whole-stalk type one-row combined sugarcane harvester according to FIG. 4 of the present invention.
Figure 16:
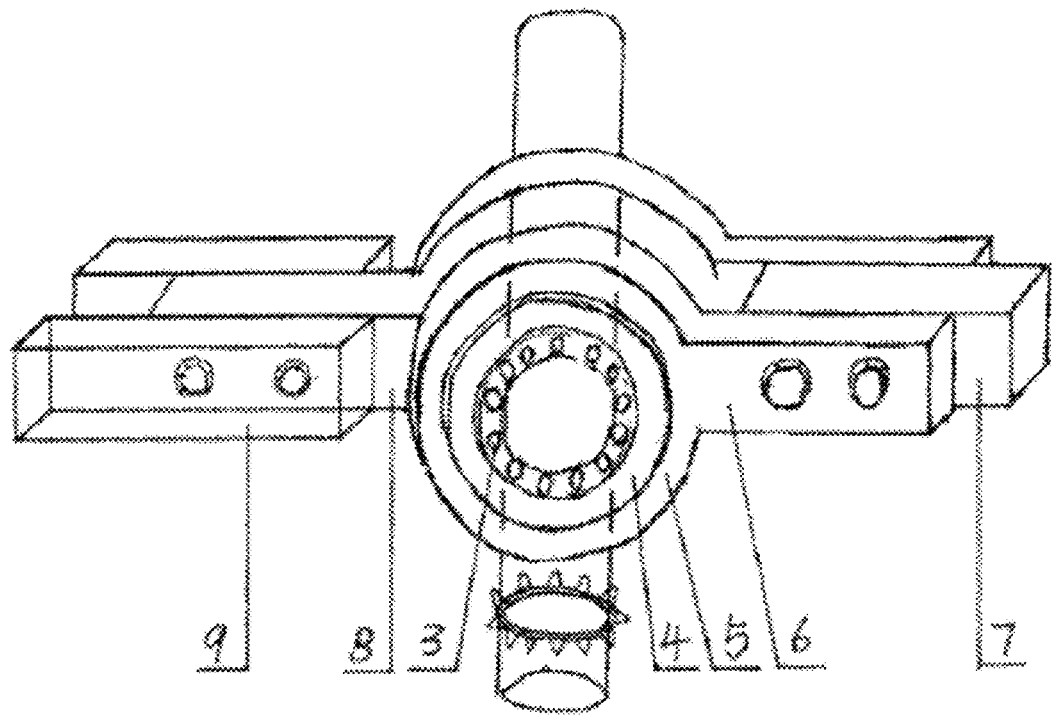
FIG. 16 is a schematic structural diagram of bearing sleeve joints arranged on an upper movable wall and a lower movable wall of a whole-stalk sugarcane bundling and 180-degree left and right steering conveyor arranged on the bottom frame of the whole-stalk or sectioning type combined sugarcane harvester according to the present invention.
Figure 17:
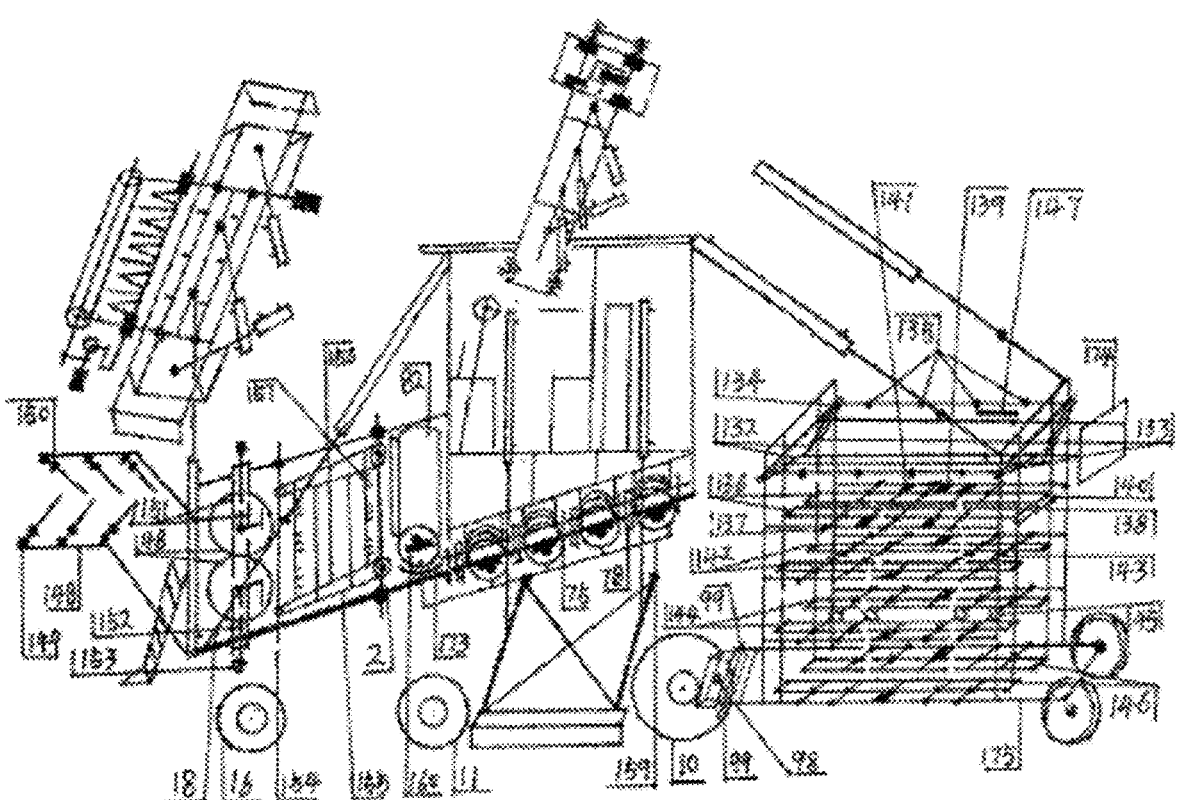
FIG. 17 is a schematic diagram of a whole-stalk type one-row combined sugarcane harvester according to FIG. 2 of the present invention.
Figure 18:
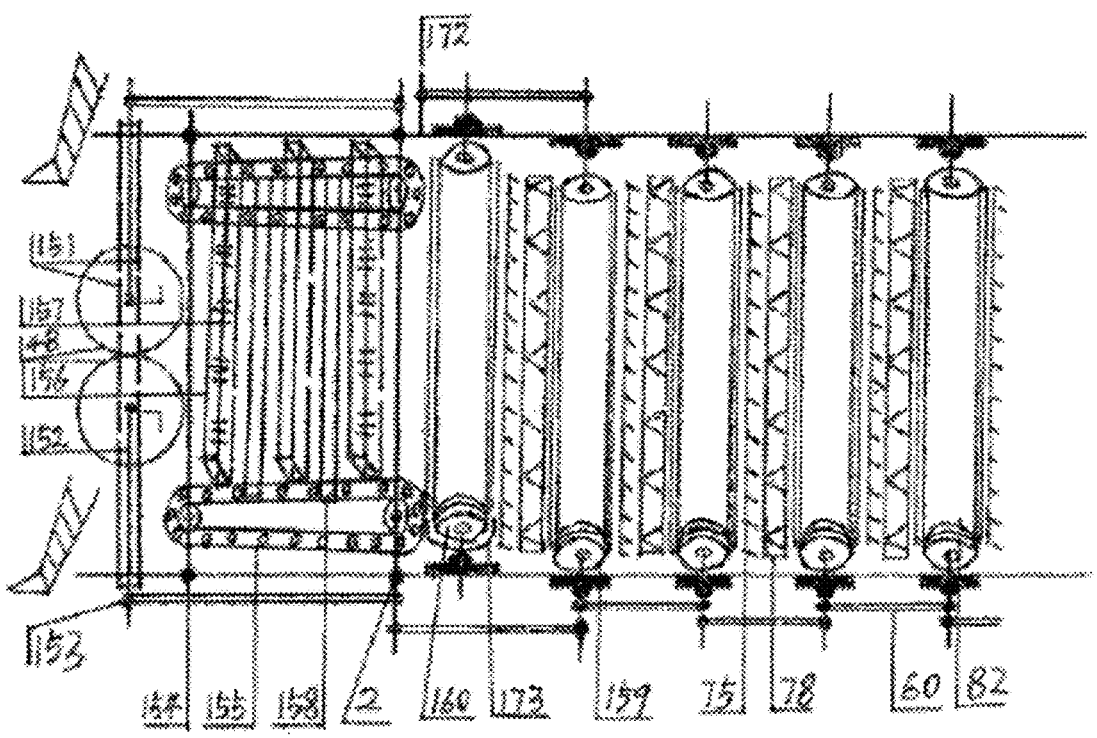
FIG. 18 is a top view of the whole-stalk type one-row combined sugarcane harvester according to FIG. 17 of the present invention, in which components, such as a sugarcane tail cutter, a driving wheel, a driving steering wheel and a liftable, walkable and steerable wheel, are removed.
Figure 19:
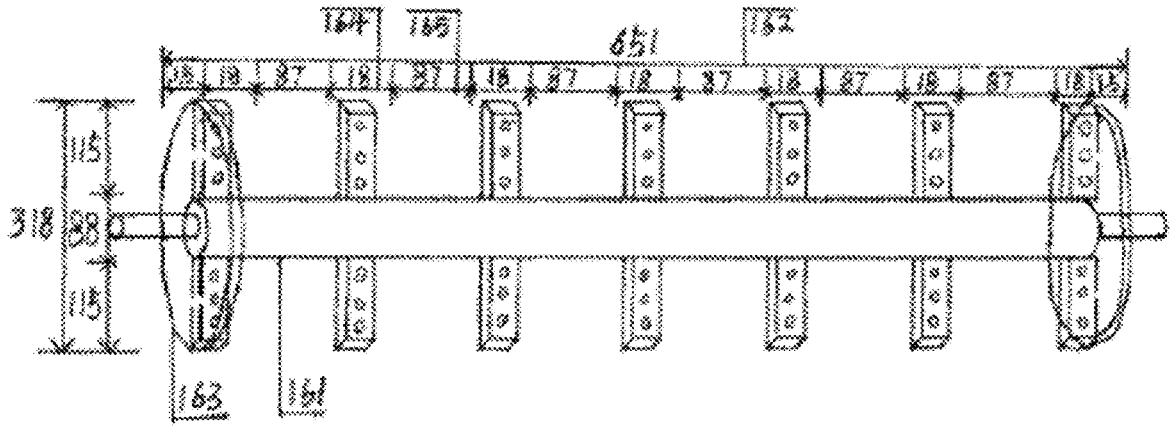
FIGS. 19, 20, 21 and 22 are schematic structural diagrams of a plurality of rows of rollers arranged at intervals for scraping sugarcane leaves, peeling sugarcane peels and conveying sugarcane stalks of the whole-stalk or sectioning type combined sugarcane harvester according to the present invention.
Figure 20:
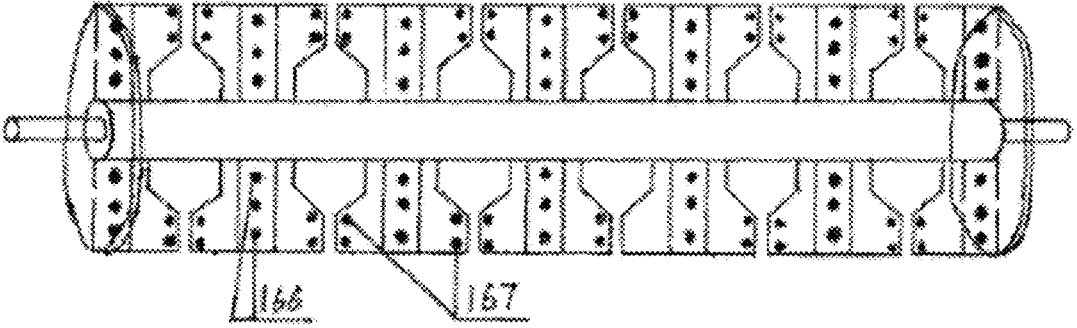
Figure 21:
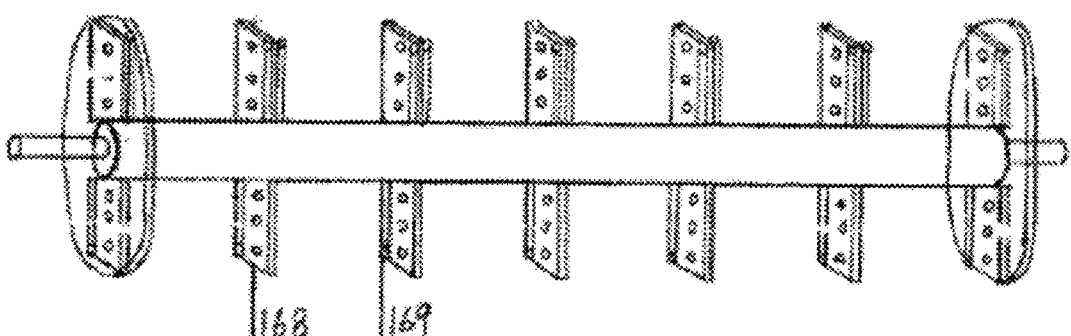
Figure 22:
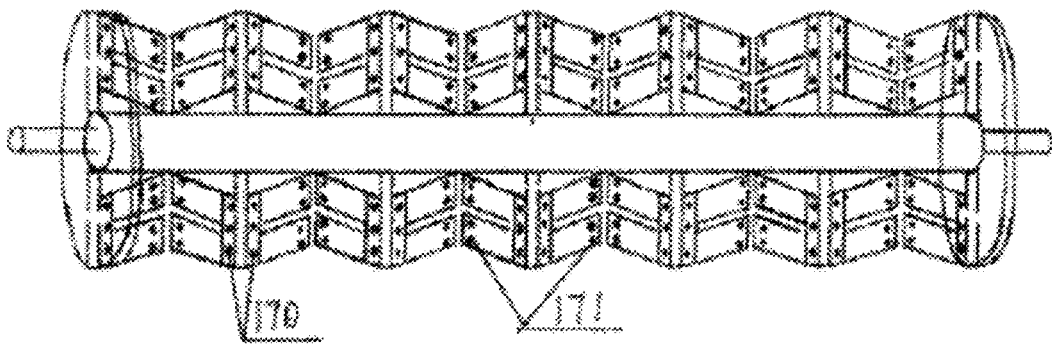
Figure 23:
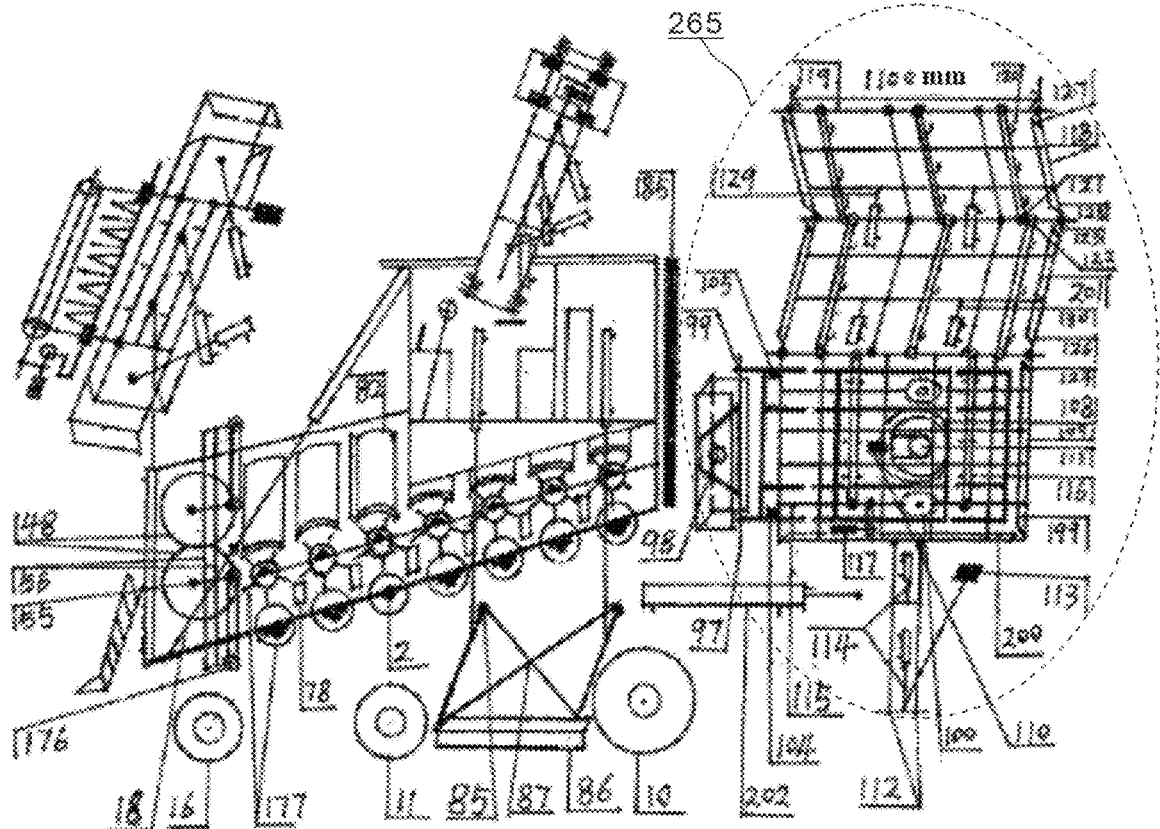
FIG. 23 is a schematic diagram of a sectioning type one-row combined sugarcane harvester with two layers of rollers arranged vertically according to the present invention.
Figure 24:
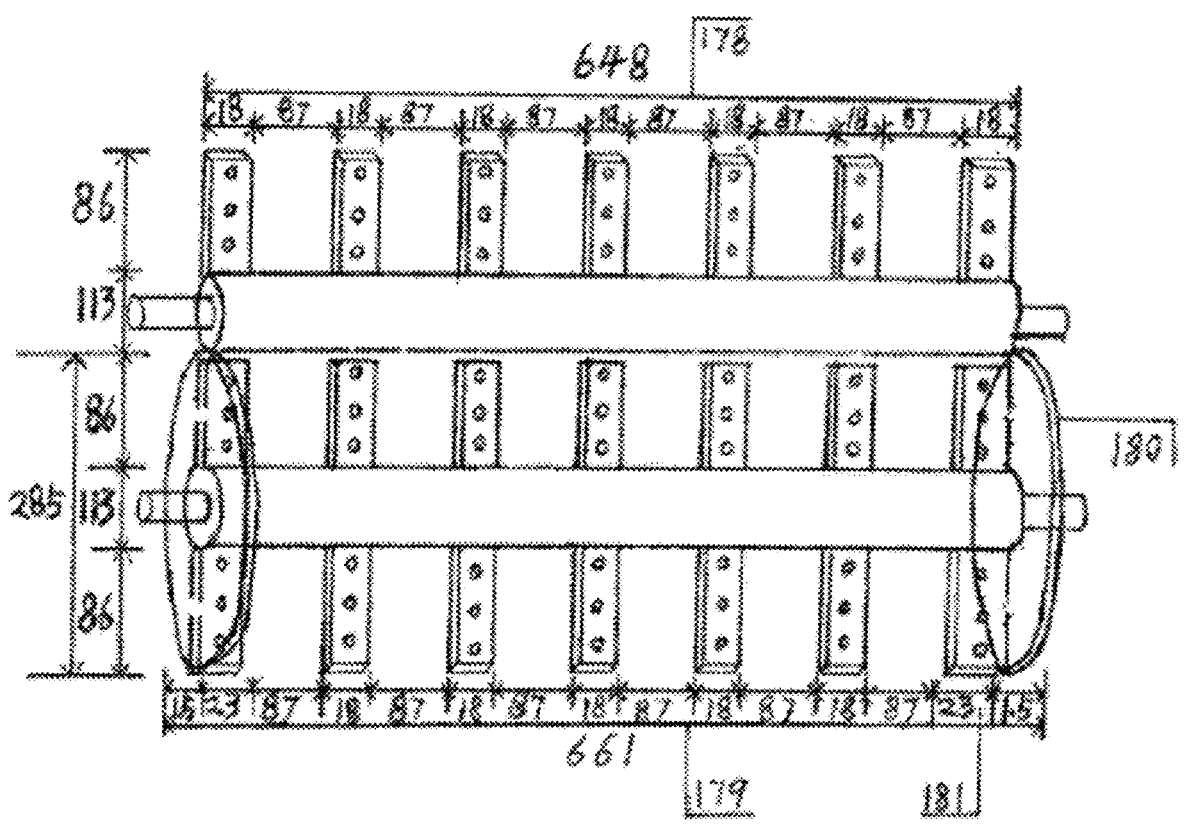
FIGS. 24 and 25 are schematic structural diagrams of a plurality of rows of rollers arranged at intervals or two layers of rollers arranged vertically for scraping sugarcane leaves, peeling sugarcane peels and conveying sugarcane stalks of the whole-stalk or sectioning type combined sugarcane harvester according to the present invention.
Figure 25:
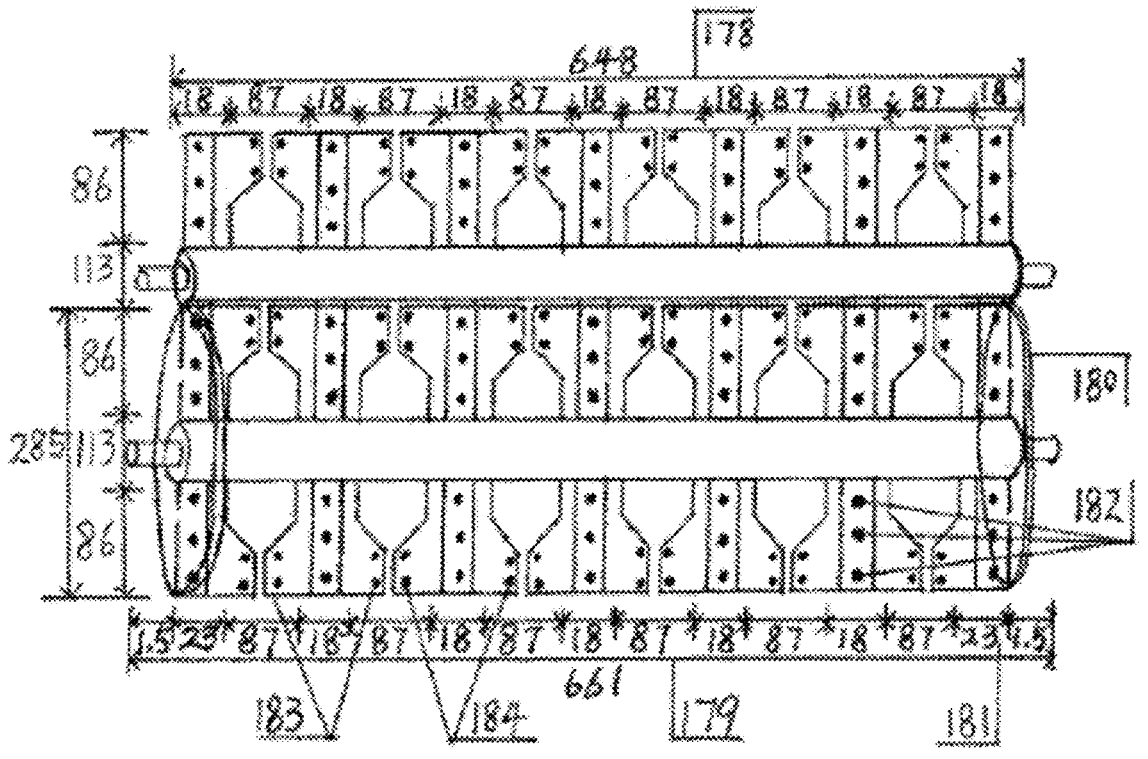
Figures 26, 27:
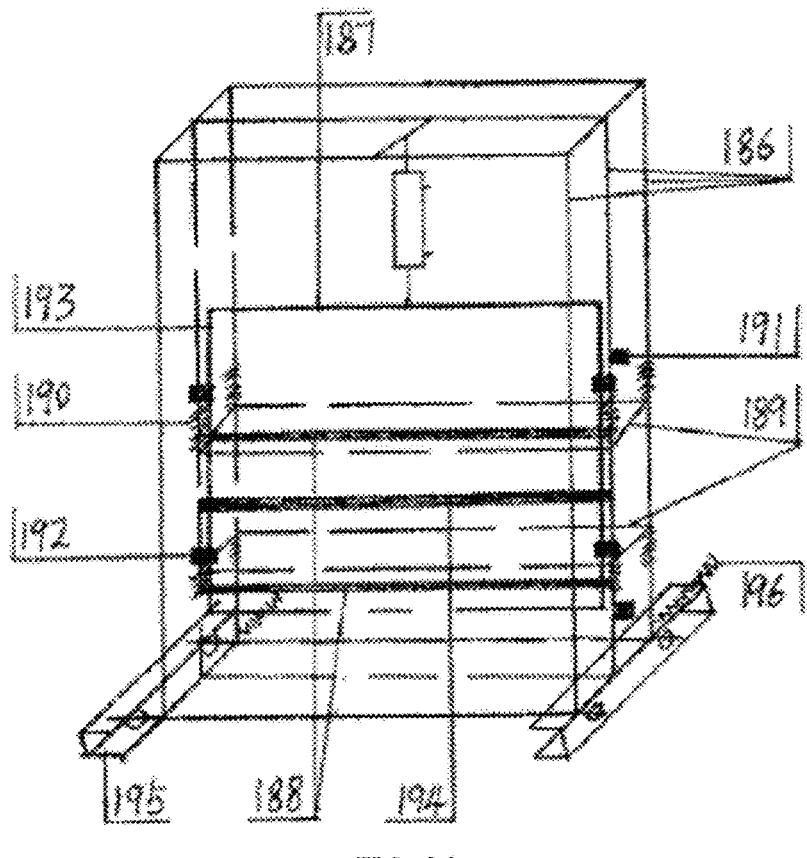
FIGS. 26 and 27 are schematic structural diagram of a sectioning slicer of the whole-stalk or sectioning type combined sugarcane harvester according to the present invention.
Figure 28:
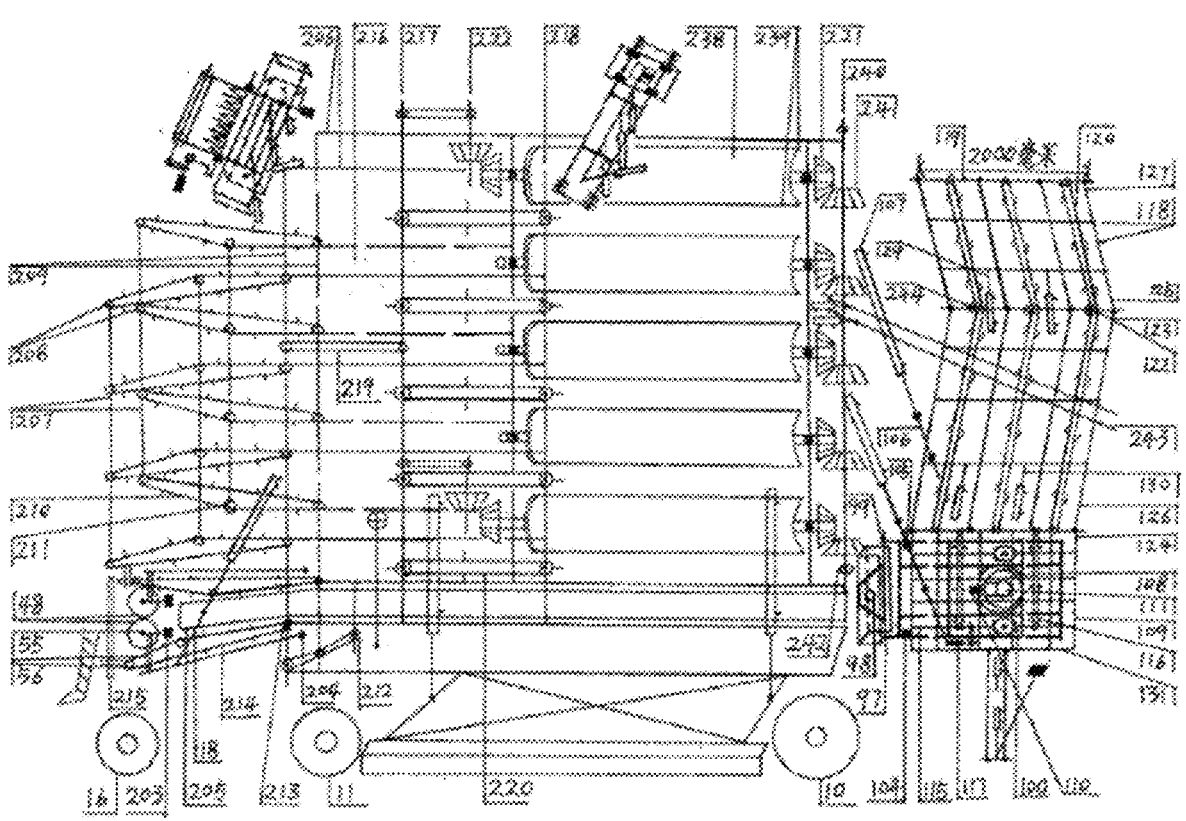
FIG. 28 is a schematic diagram 3 of the whole-stalk type one-row combined sugarcane harvester according to FIG. 3 of the present invention.
Figure 29:
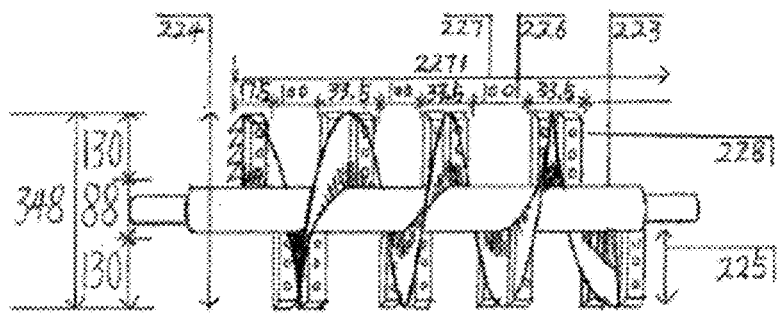
FIGS. 29, 30, 31 and 32 are schematic structural diagrams of a roller for scraping sugarcane leaves, peeling sugarcane peels and conveying sugarcane stalks by using continuous helical blades of the whole-stalk or sectioning type combined sugarcane harvester according to the present invention.
Figure 30:
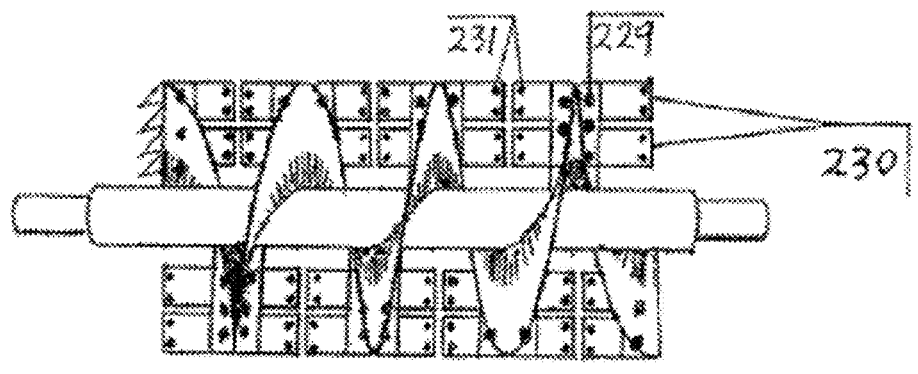
Figure 31:
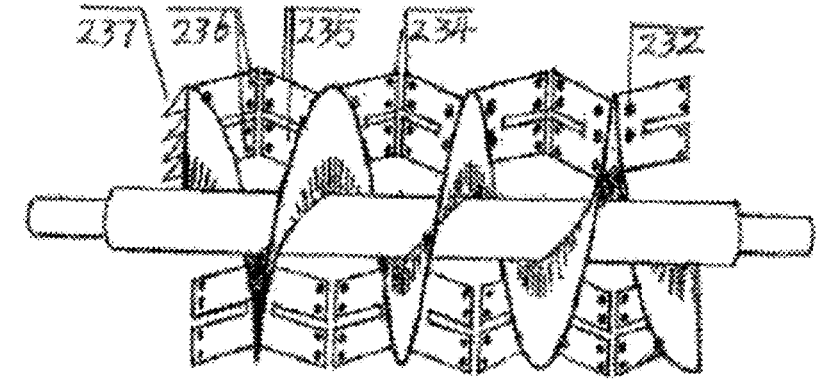
Figure 32:
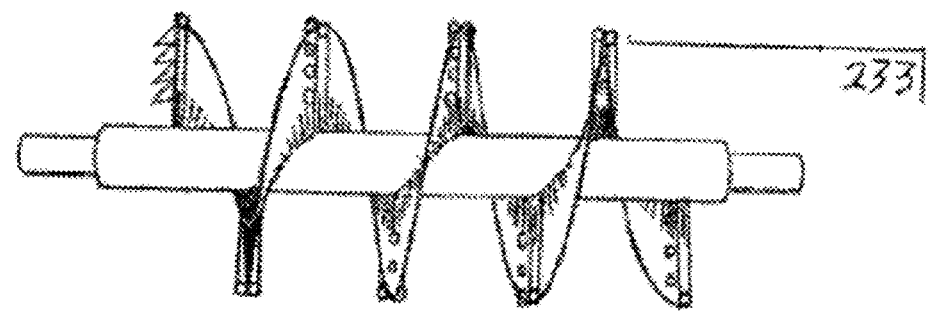
Figure 33:
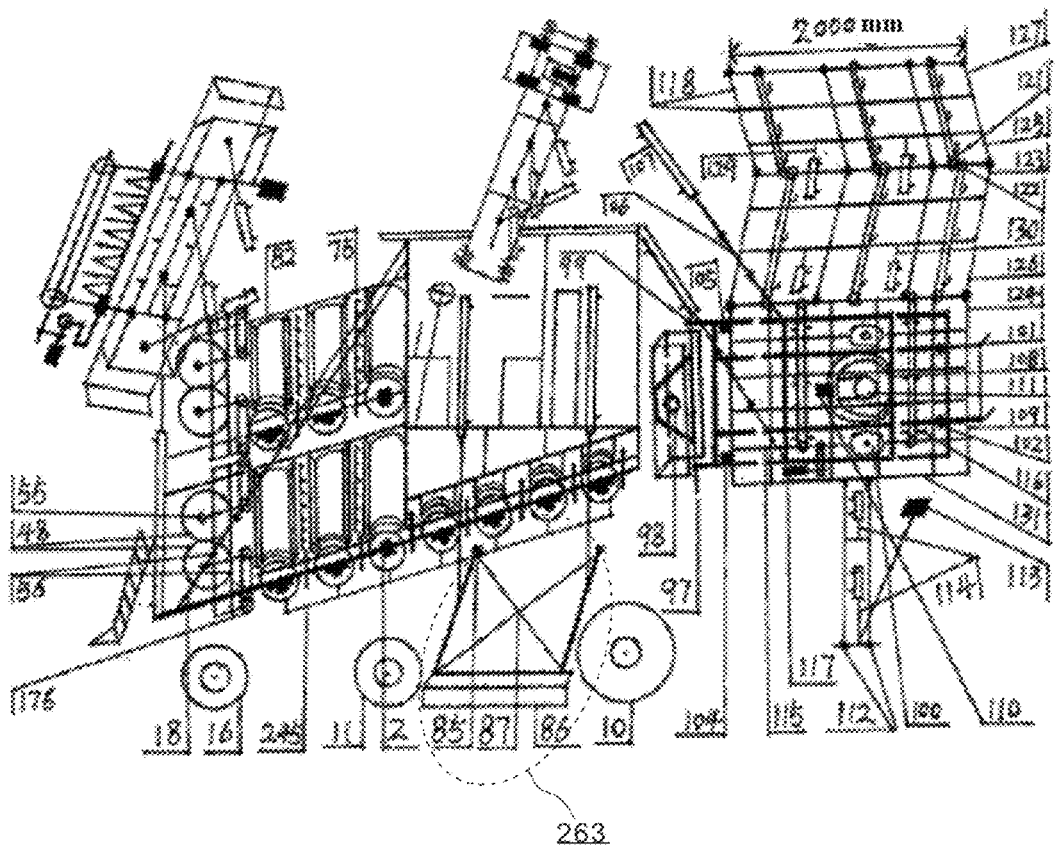
FIG. 33 is a schematic diagram of a whole-stalk type two-row combined sugarcane harvester according to the present invention.
Figure 34:
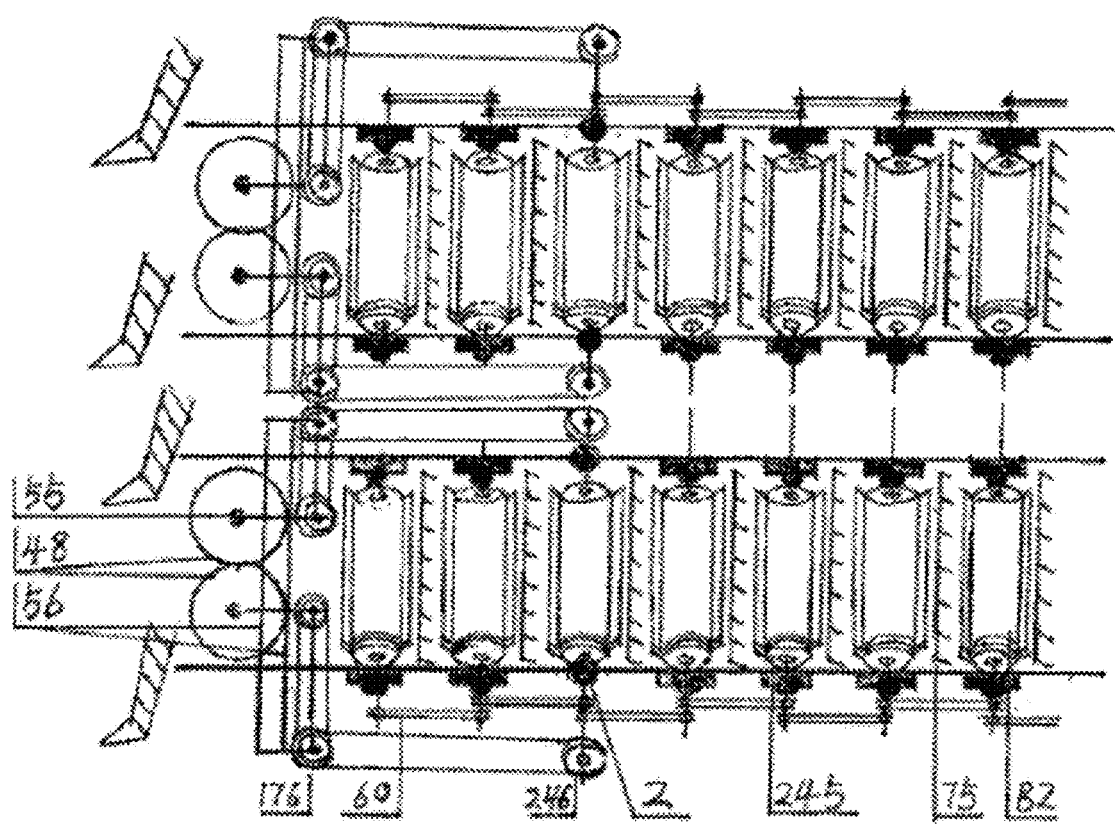
FIG. 34 is a top view of the whole-stalk type two-row combined sugarcane harvester according to FIG. 33 of the present invention, in which components, such as a sugarcane tail cutter, a driving wheel, a driving steering wheel and a liftable, walkable and steerable wheel, are removed.
Figure 35:
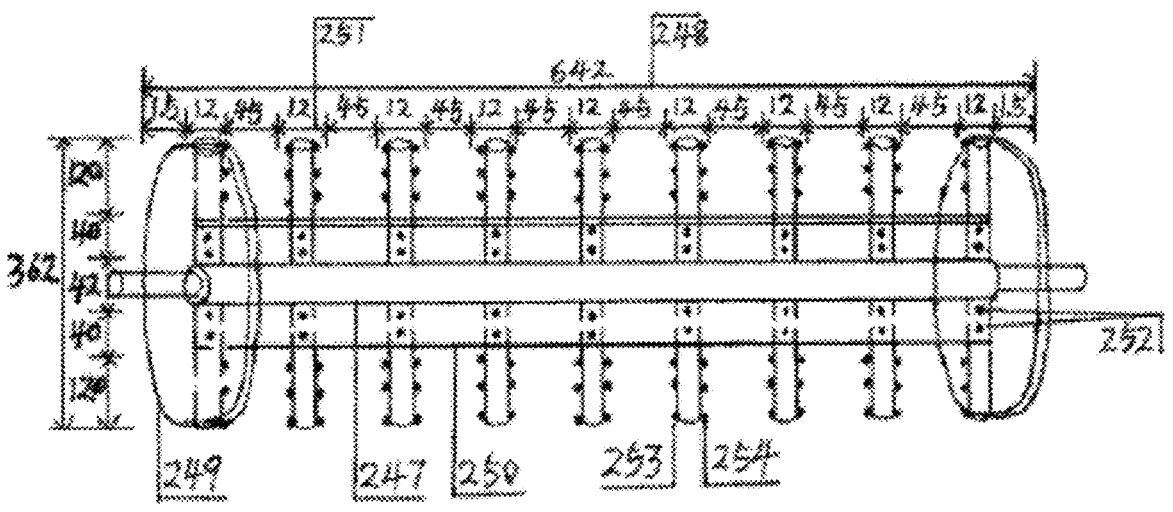
FIG. 35 is a schematic structural diagram of a plurality of rows of rollers for scraping sugarcane leaves, peeling sugarcane peels and conveying sugarcane stalks by using rubber bars arranged at intervals of the whole-stalk or sectioning type combined sugarcane harvester according to the present invention.
Figure 36:
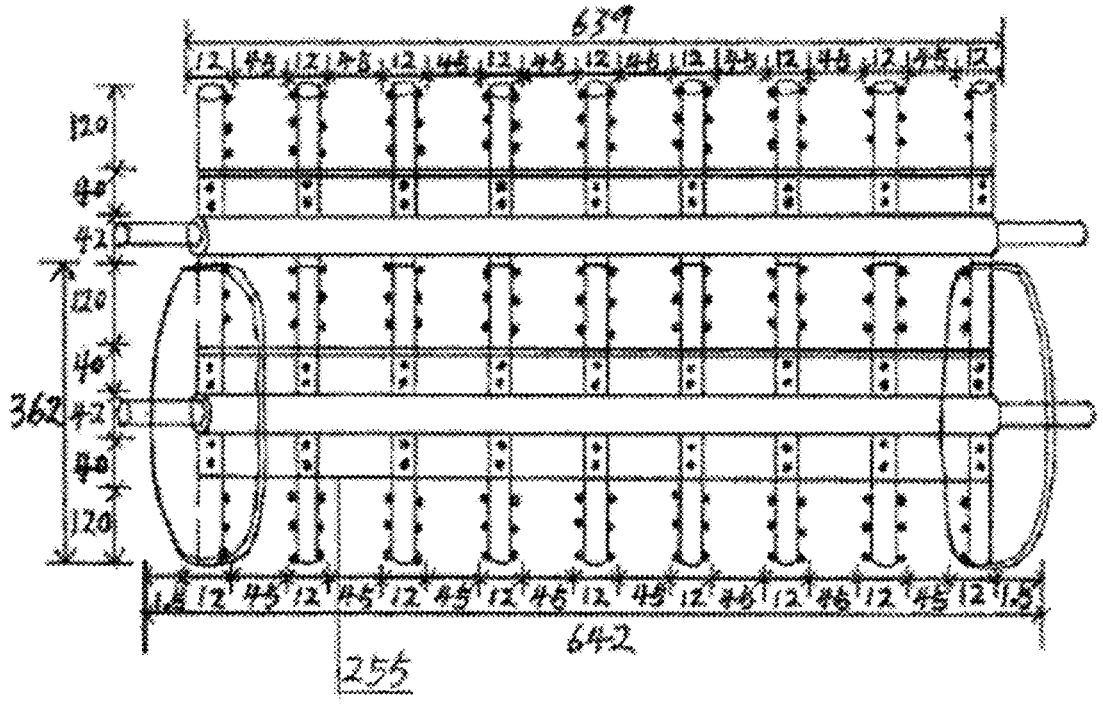
FIG. 36 is a schematic structural diagram of a plurality of rows of rollers or two layers of rollers arranged vertically for scraping sugarcane leaves, peeling sugarcane peels and conveying sugarcane stalks by using rubber bars arranged at intervals of the whole-stalk or sectioning type combined sugarcane harvester according to the present invention.
Figure 37:
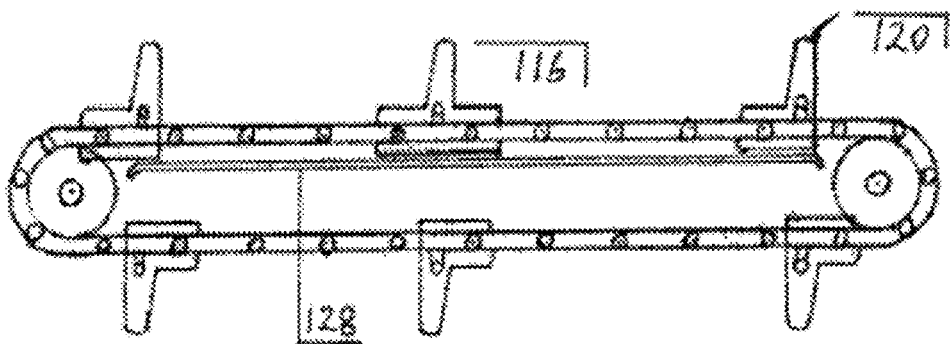
FIG. 37 is a schematic structural diagram of a transmission chain of the whole-stalk or sectioning type combined sugarcane harvester according to the present invention.
Figure 38:
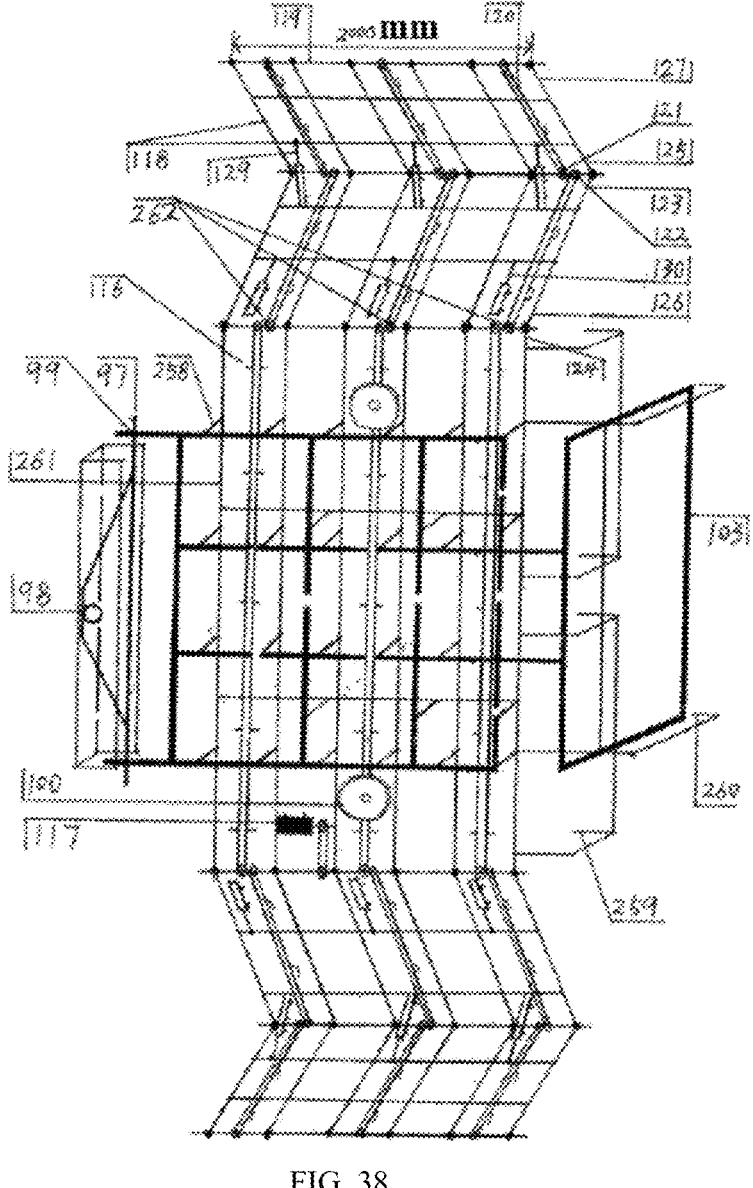
FIG. 38 is a schematic diagram of loose and whole stalk sugarcane left, right, upper and lower movable wall conveyors arranged at the tail of the whole-stalk type four-row combined sugarcane harvester, in which a bottom wheel walks across double sugarcane rows, according to the present invention.
Figure 39:
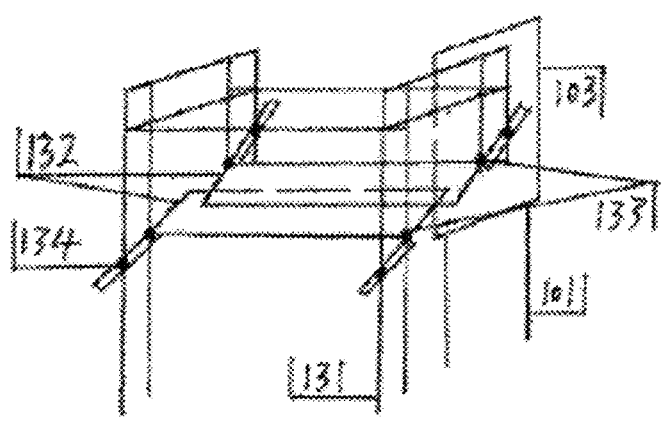
FIG. 39 is a schematic diagram of a loose and whole stalk sugarcane 180-degree left and right steering conveyor, a frame of the binding machine on the side of the steering disc frame and two opposite sugarcane supporting sliding plates, which are arranged at the tail of the whole-stalk type two-row combined sugarcane harvester according to FIG. 33 of the present invention.
Figure 40:
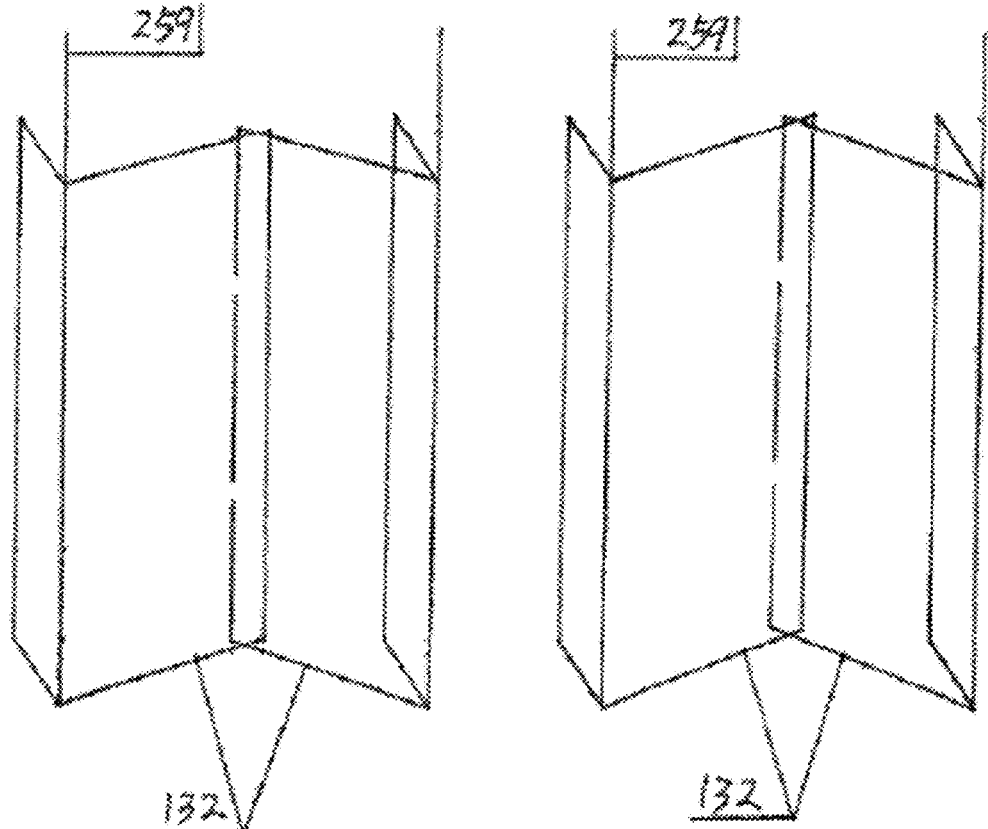
FIG. 40 is a schematic structural diagram of two opposite sugarcane supporting sliding plates on the sides of left and right transmission racks of loose and whole stalk sugarcane left, right, upper and lower movable wall conveyors arranged at the tail of the harvester according to FIG. 38 of the present invention.
Figure 41:
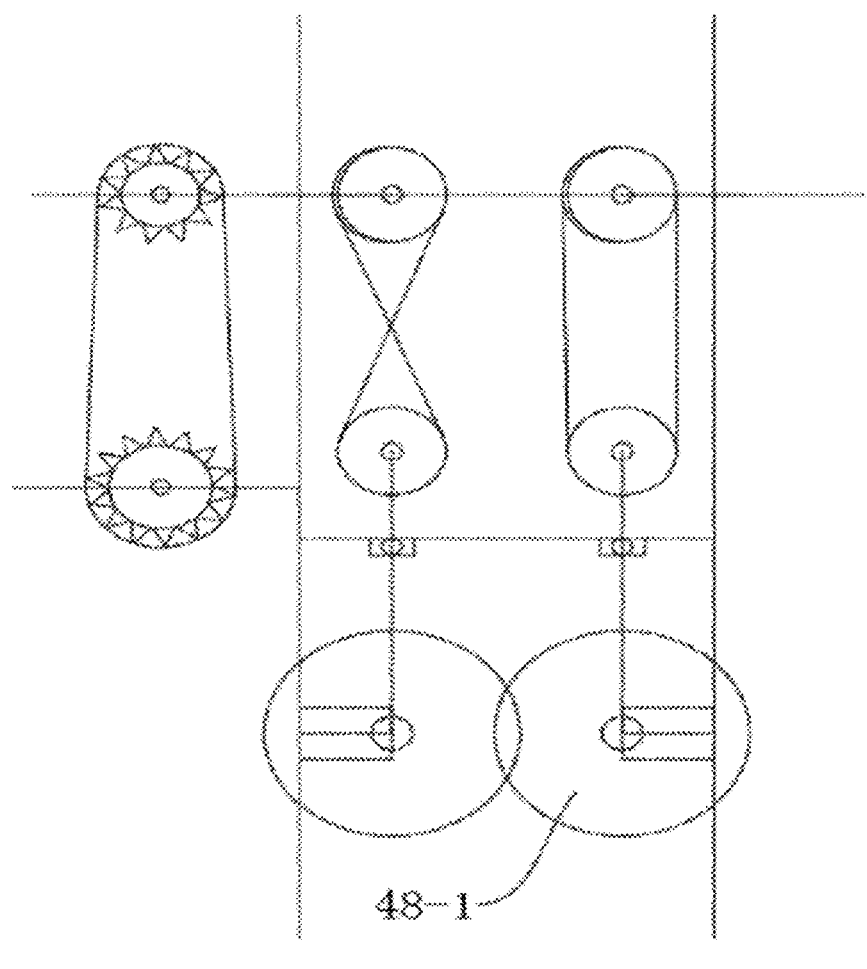
FIG. 41 is a structural schematic diagram of a transmission connection structure for double-disc grinding, in which center holes of the left and right discs are respectively provided with transmission shafts, the upper and lower ends of the transmission shafts are respectively provided with bearings and bearing seats, and the bearing seats at the upper and lower ends are respectively fixed to the frame by bolts, the discs are fixed to the lower ends of the transmission shafts by means of circular clamping plates, the upper ends of the transmission shafts are respectively provided with V-belt pulleys, the belt pulley drives the transverse transmission shaft above by a chain at one end of the transmission shaft of a roller for scraping sugarcane leaves and peeling sugarcane peels at a sugarcane inlet, and the V-belt pulley of the transverse transmission shaft cross-drives the disc to rotate left and right by a triangle belt.
Figure 42:
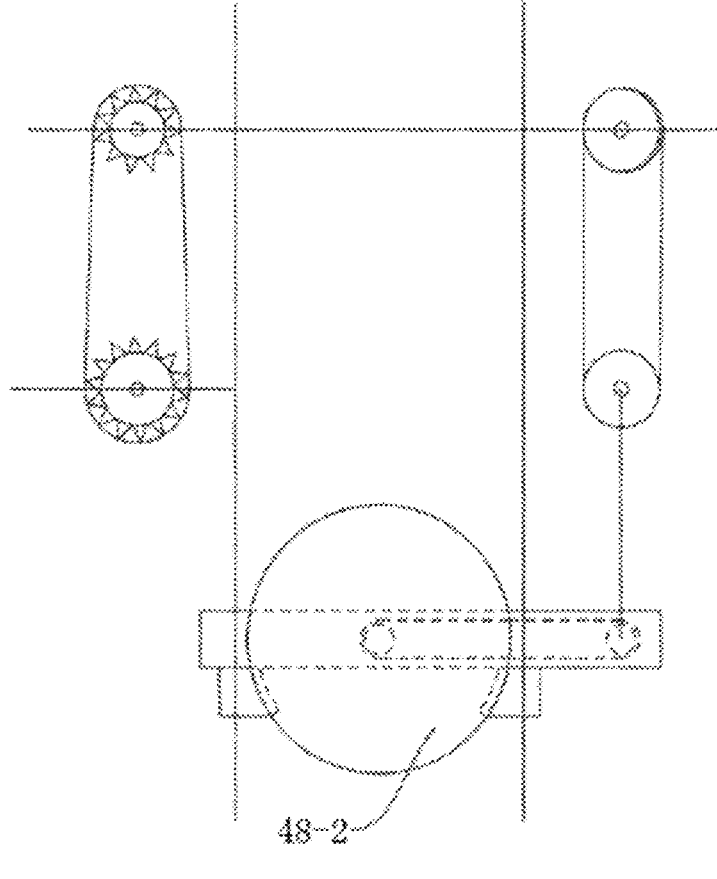
FIG. 42 is a schematic structural diagram of a transmission structure for single-disc grinding, in which the bottom surface of the center hole of a single disc is provided with a transmission shaft, a bearing, a bearing seat, a bevel gear, a sprocket wheel and a transverse raising plate for fixing the disc, a cover plate is arranged at the bottom of the transverse raising plate, the cover plate is fixed by means of bolts, a transmission chain and a transmission shaft are arranged in the raising plate, bevel gears are arranged at both ends of the transmission shaft, two ends of the raising plate are fixed on two sides of the frame by means of bolts, the disc is fixed to the surface of the raising plate at the upper end of the transmission shaft by means of a circular clamping plate, an upright transmission shaft is arranged at one end of the raising plate, a bevel gear and a sprocket wheel are arranged at the lower end of the transmission shaft, a V-belt pulley is arranged at the upper end of the transmission shaft, and elastic rubber sheet baffle plates are arranged on two sides of the front end of a single disc.
Figure 43:
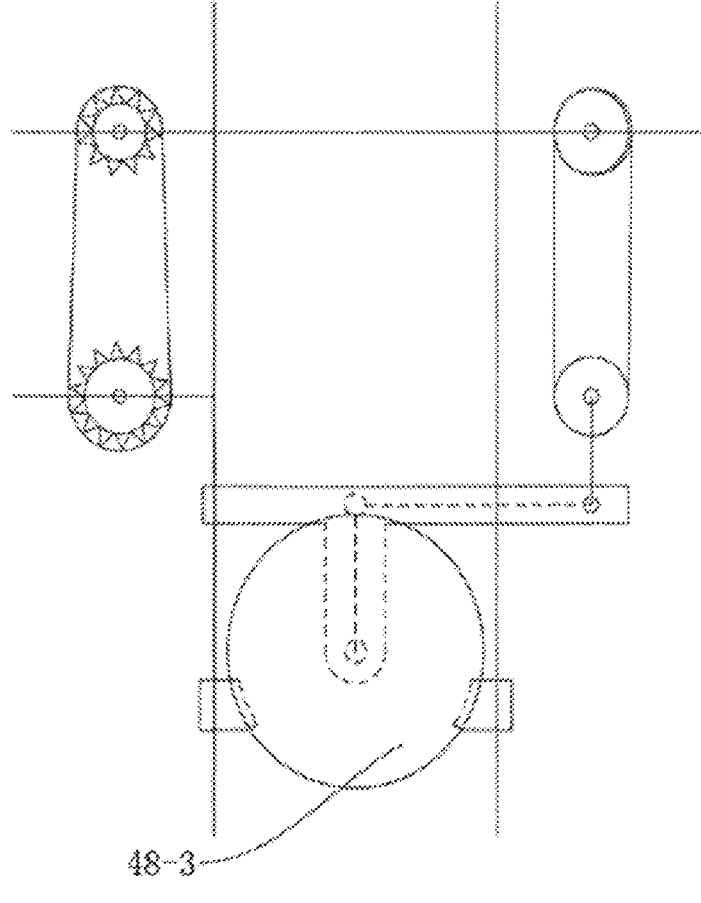
FIG. 43 is a schematic structural diagram of another transmission structure for single-disc grinding, in which the bottom surface of the disc is provided with a vertical raising plate and a transverse raising plate for fixing the disc, the bottom surfaces of the vertical raising plate and the transverse raising plate are respectively provided with cover plates, the cover plates are fixed by bolts, the rear end of the vertical raising plate is welded in the middle section of the transverse raising plate, transmission shafts are arranged in the raising plates, and bevel gears are arranged at both ends of the transmission shaft.
Figure 44:
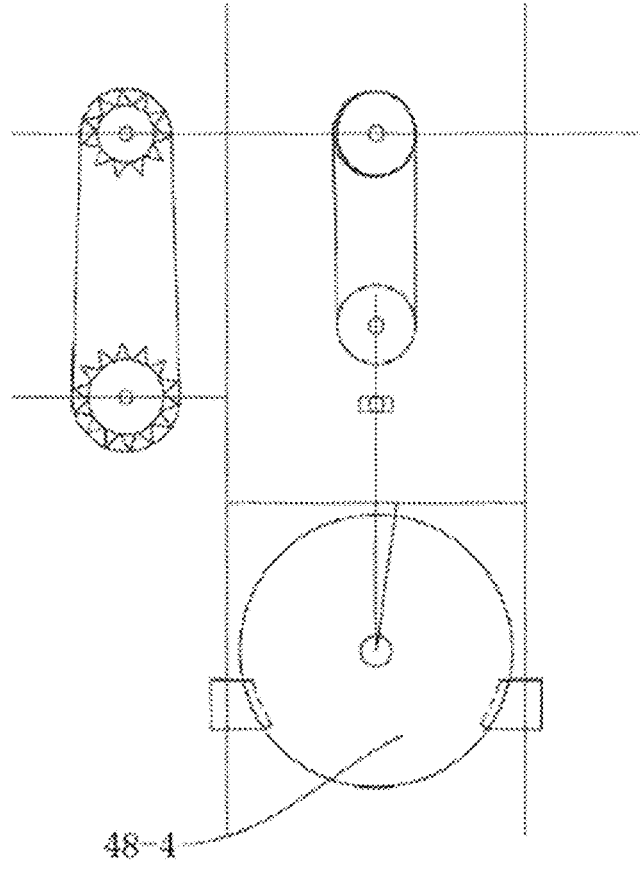
FIG. 44 is a schematic structural diagram of yet another transmission structure for single-disc grinding, in which the center hole of a single disc is provided with a transmission shaft, and lifting bars for fixing the transmission shaft are vertically and transversely arranged behind the disc at the lower end of the transmission shaft.

The present invention will be further explained in detail with reference to the drawings and specific embodiments below.

Embodiment 1

The whole-stalk one-row combined sugarcane harvester is provided with a base frame 1 with a bottom wheel walking across a single sugarcane row. Bearing sleeve joints 2 for lifting a front frame are arranged on both sides of the frame above a driving steering wheel. The bearing sleeve joint is provided with a transmission shaft, a sprocket wheel, a bearing 3 and a bearing sleeve 4. Two ends of the bearing sleeve are provided with outer sleeves 5. One surface of the outer sleeves at the two ends is connected to a steel plate 6. The two steel plates are drilled to be fixed to a front end 7 of a rear frame by means of a bolt. Square steel 8 is welded to one surface in the middle of the bearing sleeve and drilled to be fixed to a rear end 9 of the front frame by means of a bolt. Driving wheels 10 are arranged on two sides of the rear end of the rear frame. Liftable, walkable and steerable wheels 11 are arranged on two sides of the front end of the front frame. The liftable, walkable and steerable wheel is provided with an upper wheel carrier and a lower wheel carrier. The upper wheel carrier is provided with a wheel lifting shaft sleeve 12, a wheel lifting oil cylinder 13 and a wheel steering oil cylinder 14. Vertical wheel steering sleeve shaft joints are arranged vertically behind the upper wheel carrier on two sides. One surface of the sleeve at each of the two ends of the sleeve shaft joint is welded behind the upper wheel carrier. The upper and lower sleeve shaft joints are respectively welded with a square steel tube 15, which is bent at 90 degrees and fixed on two sides of the frame. The lower wheel carriers on two sides are provided with a wheel 16 and a wheel lifting shaft 17. Two sides of the lifting wheel frame are provided with two soft steel wire ropes 18 respectively. The other ends of the soft steel wire ropes are provided with lifting ends of the lifting oil cylinders. Bottom ends of the oil cylinders are arranged on two sides of a console frame. A console 19, a manual and hydraulic oil combined control system 20, an electric and hydraulic oil combined control system 21, a hydraulic oil pump 22, an engine and gearbox assembly 23, a transmission half shaft 24, a gearbox assembly 25, a transmission shaft 26 and a clutch assembly 27 drive the sprocket wheel of the roller 59 above, an engine oil tank 28, a hydraulic oil tank 29 and a hydraulic oil cooler 30 by means of chains. Sugarcane supporting rollers are arranged on two sides in front of the front frame. The transmission shafts at the upper ends of the sugarcane supporting rollers on two sides are driven by hydraulic motors. The surfaces of the sugarcane supporting rollers are respectively provided with sugarcane supporting bar lifting helical bars 31. The lower ends of the rollers are respectively provided with triangular shovel heads. The two sides of a front surface of the front frame are provided with vertical lifting oil cylinder bottom ends 32 for supporting a sugarcane tail cutter. One end of each lifting oil cylinder is fixed to a bottom 33 of a scissor blade rack of the sugarcane tail cutter by a bolt. A row of scissor blades 34 are arranged at intervals at a front end of the scissor blade rack. Rear ends of the row of scissor blades are arranged at intervals on a surface of a linear guide rail 35. Clamping strips 36 are arranged at intervals on an upper lower and a lower surface of the row of scissor blades. Rear ends of the clamping strips are fixed to lower uppers of the scissor blades. Two ends of the linear guide rail are provided with sliding blocks 37. One end of the linear guide rail is provided with a hydraulic motor 38 to drive a transmission shaft. The transmission shaft is provided with a sprocket wheel and an eccentric shaft wheel 39. The eccentric shaft wheel is connected to a reciprocating swinging bar 40. The swinging bar is connected to one end of that linear guide rail. A surface of the scissor blade rack is provided with tail leaf supporting plates arranged at intervals. Two sides of the tail supporting blade plate are provided with transmission shafts, one of which is driven by a hydraulic motor 41. The transmission shafts on the two sides are provided with sprocket wheels arranged at intervals, and a left and right steering conveying chain 42 is provided with a tail leaf pulling bar. A tail leaf pulling blade rotator, a transmission shaft and a tail leaf pulling blade 43 are arranged above the front of the row of scissor blades. The transmission shaft at one end of the rotator is provided with a sprocket wheel. A transmission chain 44 is connected to the hydraulic motor to drive the sprocket wheel of the transmission shaft. Fallen tail leaf sliding plate grooves 45 are arranged below the transmission shafts on the two sides of the scissor blade rack. Sleeve shaft joints are arranged at upper ends of the fallen tail leaf sliding plate grooves on the two sides, and are fixed to the frame below the transmission shafts on the two sides. Back-fall tail leaf baffles 46 are arranged at front ends of outlets of the fallen tail leaf sliding plate grooves on the two sides. A lifting end 47 of the lifting oil cylinder is arranged on a bottom surface of each of the fallen tail leaf sliding plate grooves on the two sides. Left and right sugarcane root grinding cutters 48 are arranged on two sides in front of the front frame. The sugarcane root grinding cutters are circular discs. An impurity removal seam with a width of 8 mm 50 and a depth of 26 mm is arranged on the periphery of the disc at an interval of 33 mm 49. The upper and lower surfaces of a notch at the periphery of the disc are set like an arrow triangle. The notches 51 at the periphery of the disc, an upper corner edge 52 and a lower corner edge 53 of the triangular notch, and the surfaces 54 on both sides of the impurity removal seam are all provided with alloy steel sand particles. The alloy steel sand particles are all higher than the upper and lower corner edges of the triangular notch of the circular disc. A transmission shaft 55 is arranged in the center holes of the left and right circular discs. The upper ends of the transmission shafts are provided with lifting bars 56 for fixing the transmission shafts at intervals. The upper ends of the transmission shafts are provided with bevel gears. The left and right circular discs are provided with transmission shafts 57. One end of the transmission shaft is provided with a bevel gear, and sprocket wheels 58 are arranged on two outer sides. A single sugarcane root grinding cutter 48 is further arranged in the middle of the front of the front frame. Elastic rubber baffle plates are arranged on two sides of the front end of the single sugarcane root grinding cutter 48. A sugarcane pulling sheet is arranged on one side of the radius of the disc face and fixed on the disc surface by a bolt. The transmission shafts are arranged in the center holes of the left and right discs respectively, the upper and lower ends of the transmission shafts are respectively provided with bearings and bearing seats, and the bearing seats at the upper and lower ends are respectively fixed to the frame by bolts, the discs are fixed to the lower ends of the transmission shafts by means of circular clamping plates, the upper ends of the transmission shafts are respectively provided with V-belt pulleys, the belt pulley drives the transverse transmission shaft above by a chain at one end of the transmission shaft of a roller for scraping sugarcane leaves and peeling sugarcane peels at a sugarcane inlet, and the V-belt pulley of the transverse transmission shaft cross-drives the disc to rotate left and right by a triangle belt. Vertical sugarcane blocking plates are disposed from the rear end of the bottom of the sugarcane supporting rollers on both sides to the both sides of the sugarcane root grinding cutter 48, and a plurality of rollers 59 for scraping sugarcane leaves, peeling sugarcane peels and conveying sugarcane stalks by using circular plates arranged at intervals, which are arranged sequentially at intervals in a single layer and a single row and rotate clockwise about 500 revolutions per minute and is 7 in number, for example, are disposed at two sides of the frame behind the left and right sugarcane root grinding cutter, and the back of the circular plates of the rollers are respectively spaced 85 mm wide. A sprocket wheel and a transmission chain 60 are disposed at one end of the transmission shaft where 7 rollers are installed sequentially, and bearings and bearing seats are disposed at two ends of the transmission shaft. In particular, sprocket wheels and transmission chains are arranged at two ends of the transmission shaft of the first roller at the sugarcane inlet, and bearing sleeve joints 2 are disposed at two ends of the transmission shaft of the third roller. As for a plurality of rollers for scraping sugarcane leaves, peeling sugarcane peels and conveying sugarcane stalks by using circular plates arranged at intervals, the diameter of the roller is 88 mm 61, the length is 661.5 mm 62, and 7 circular plates 63 of 318 mm in diameter and 1.5 mm in thickness are disposed on the roller surface at intervals. There are 6 intervals on the roller surface, where each interval is 83 mm wide, and 6 intervals act as 6 sugarcane stalk conveying channels. 10 vertical and horizontal steel plates 64 are welded at intervals on each side of the circular plate surface on both sides of each interval of the roller. The width of the steel plate is 13 mm 65, the height is 115 mm 66, and one end of an elastic rubber sheet a 4.5 mm thick is respectively fixed to the vertical and horizontal steel plates on both sides by clamping plates and bolts 67, so that the rubber sheets on the two opposite sides form a horizontally blocking gap. A torsional spring is arranged outside of the clamping plate to increase the elasticity of the rubber sheet for a long time through the torsion arm. One side of the torsional spring is fixed on the outside of the clamping plate by nuts, and one elastic rubber sheet 68 is respectively arranged on the steel plate surface of the vertical and horizontal surfaces that are disposed in the space between the circular plate surfaces on two sides for each interval of the roller surface. The rubber sheet is drilled on the surface scraped to the sugarcane stalk, and nuts are respectively used to fix the outer hexagonal bolt head 69 with a diameter of 5 mm. The lower ends of protruding flat-headed round steel, square steel, steel nails, steel blocks, tooth tips, etc. are also fixed by cast rubber sheets in the surface scraped to the sugarcane stalk, and 10 pieces of elastic rubber sheets with thickness of 6 mm are arranged on the surface of circular plates on each side of the roller at intervals. One end of the rubber sheet is fixed on the circular plate surface on both sides at intervals respectively with bolts 70. A circular pipe 71 with a vertical diameter of 12 mm is welded respectively onto the circular plate surface at one end of the fixed rubber sheet to make an outer end of the rubber sheet tilt up, so that the inner wide and outer ends of the two opposite rubber sheets are close together. A torsional spring is disposed at the fixed end of the rubber sheet on the circular plate surface to increase the elasticity of the rubber sheet for a long time through the torsion arm. The torsional spring is fixed by setting a card hole on the surface of the circular plate, and one piece of elastic rubber sheet 72 is arranged at intervals on the circular plate surface on both sides of the roller. The rubber sheet is drilled on the surface scraped to the sugarcane stalk, and outer hexagonal bolt head 73 of diameter 5 mm are fixed by the bolts and nuts respectively. 7 rollers are mounted behind the left and right sugarcane root grinding cutter in single-row single-layer continuous manner, and bearing seats at two ends of the transmission shaft are fixed on the bottom surface 74 that faces downward on both sides of the frame by adopting bolts. There are 6 disc saw blades that can be lifted vertically at intervals above the front of the sugarcane inlet roller. Vertical linear guide rails are provided on both sides of the front of the roller, sliders are disposed on the linear guide rails on both sides, and disc saw blades are disposed on the sliders on both sides. Bearing seats at both ends of transmission shaft and the transmission shaft of the disc saw blade are raised and lowered by setting a lifting oil cylinder, and the transmission shaft is driven by a hydraulic motor. Sugarcane leaf and peel blocking barriers 75 are respectively disposed behind the rollers, and circular communication hole 76 are drilled at intervals on the surface above and below of a square steel of the sugarcane leaf and peel blocking barriers. The upper and lower communication holes are respectively disposed at the upper end of a steel wire rope, and communication holes are drilled at intervals in a side surface of the square steel to connect the upper and lower surfaces. The connected communication holes are used to fix an end of a steel wire rope by a bolt 77 respectively, and square steels are fixed at two ends to two sides of the frame. A sugarcane stalk guide plate 78 is arranged respectively at the back of the sugarcane leaf and peel blocking barrier, and the sugarcane stalk guide plate is a triangular shape with narrow front and wide rear. Several triangles are welded at intervals on a bottom surface 79 of a rectangular steel plate, narrow side 80 of the triangular shape sugarcane stalk guide plate is arranged in front of the harvester, and a sugarcane leaf blocking plate 81 is respectively arranged below the sugarcane stalk guide plate to prevent the roller from rotating and causing the sugarcane leaves to go in the opposite direction. Two ends of the rectangular steel plate of sugarcane stalk guide plate are fixed on two sides of the frame by bolts. Sugarcane pressing cover plates 82 are respectively arranged on the top surface of the circular plate of the roller 59. The sugarcane pressing cover plates are rectangular and semicircular, the front and rear side edges are raised, and the edges on both sides of the sugarcane pressing cover plates cover more than 30 mm 83 below the highest position of top surface of the roller circular plates. The two ends of the sugarcane pressing cover plate are fixed on both sides of the frame with bolts. The two ends of the roller 59 are provided with bearing sleeve joint 2, and sleeve shaft joints 84 are disposed at two rear ends of sugarcane pressing cover plate on the circular plate surface of the roller. Tension spring bars and tension springs are arranged at the two front ends, and cover support bar that supports the sugarcane pressing cover plate to cover down and top cover bar that is opened upwards are arranged on both sides of the frame. The lifting frame of the left and right rollover safety devices is disposed under the two sides of the harvester. The sleeve shaft joint 85 is disposed at the inner end of the lifting frame on both sides. The angle steel 86 is disposed at the outer end of the lifting frame on both sides. Steel wire ropes 87 are disposed on the two opposite corners of the lifting frame on both sides. Steel wire rope are provided with movable joint at one end of the frame, bolts are arranged at one end of the angle steel to adjust the tightness, the lifting frame surface of both sides is provided with one lifting end of lifting oil cylinder, and the bottom end of the oil cylinder is arranged on the frame above the both sides of the harvester. The upright support lifting oil cylinder 88 of anti-left-and-right-rollover regulator is arranged above both sides of the harvester, and one end of lifting oil cylinder on both sides is arranged on regulator moving frame. The moving frame is provided with rack 89, linear guide rail 90 is disposed at both sides of the rack, and two sliders 91 are respectively arranged at intervals of the linear guide rails on both sides. Several iron plates 92 are fixed on the surface of the sliders with bolts. A gap is arranged in the middle of several iron plates, and a hydraulic motor 93 is arranged in the gap. Teeth of gears of the hydraulic motor transmission shaft are engaged in the teeth on the rack surface to drive several iron plates to move. The hydraulic motor is fixed on the first iron plate on the slider surface with bolts. The moving frame is provided in the form of three segments including a middle segment and segments at both sides. Hinge joints 94 are provided in the rack in the middle segment and the bottom surface of both ends of the linear guide rail to connect the racks on both sides and the linear guide rails, and the bottom surface of the racks on both sides is provided with a lifting end 95 of the lifting oil cylinder. Bottom end of the oil cylinder is arranged below the middle segment. Compression spring 96 is disposed at the ends of the linear guide rails on both sides. The connecting head of the whole-stalk sugarcane conveyor are fixed to the frame under the tail of the harvester via bolts. The connecting head of the whole-stalk sugarcane conveyor is provided with a rectangular lower supporting plate, a triangular steel plate is arranged on the surface of the lower supporting plate, and joint round shafts 97 are arranged on both sides behind the triangular steel plate. A rectangular cover plate is arranged on the surface of the triangular steel plate, and a steering circular shaft hole 98 is arranged in the middle of the front of the lower supporting plate, the triangular steel plate and the rectangular cover plate. The circular shaft hole 98 is fastened by means of circular pins, and an electromagnet is disposed at the lower supporting plate behind the steering circular shaft hole. The whole-stalk sugarcane bundling and 180-degree left and right steering conveyor is equipped with a bottom frame with bottom wheels to walk across a single sugarcane row. A circular hole 99 is formed in the middle of the front ends on both sides of the bottom frame, and a gap is set on the bottom of the circular hole and covered by steel plates and bolts. The joint round shaft 97 provided at the connecting head of the whole-stalk sugarcane conveyor is connected through the circular hole. Walking wheels 100 are disposed on both rear sides in the middle of the bottom frame, and the movable frame 101 that can be extended backwards is disposed on both sides of the rear end of the bottom frame. The linear guide rail of the movable frame is fixed by bolts 102, the sugarcane blocking plates 103 are arranged above the two sides of the movable frame, a touch electric switch 104 is arranged on one side of the front of the bottom frame, and an electric remote control lock 105 is arranged on the other side. Moveable joints are arranged about 400 mm in front of center of the steering disc of the bottom frame on the two sides, the movable joints are respectively connected to a round steel, the other end of the round steel is respectively connected to a soft steel wire rope 106, and the other ends of the soft steel wire rope is provided at the lifting end of the lifting oil cylinder. Bottom end of the oil cylinder is arranged on both sides 107 of the frame above the harvester tail. A 360-degree left and right rotating disc 108 is disposed slightly backwards in the middle of the bottom frame. The outer circumference of the rotating disc is fixed on the bottom frame, and the upper end of an inner disc is provided with a steering disc frame 109. The outer circumference of an steering disc in the bottom surface of the steering disc frame is provided with steering teeth, and the steering teeth are engaged with teeth of hydraulic motor transmission shaft to drive the disc to rotate. The hydraulic motor is arranged on the bottom frame 110, and the center of the steering disc is provided with a 360-degree rotating hydraulic and electric transmission joint 111. Steel plates are arranged at intervals on the surface of the steering disc frame. Two vertical support bars are arranged in the middle of an outer side of the steering disc frame. The sleeve shat joints 112 are disposed at upper and lower ends of the supporting bar. The sleeve shat joint 112 at the upper end is provided with upper end of a balancing bar, and several iron plates 113 are disposed at lower end of the balancing bar. The lifting oil cylinders are disposed at upper and lower ends of the support bar, and one end of the lifting oil cylinder is respectively arranged at the lower end of the supporting bar and the upper end 114 of the balancing bar. The bottom end of the oil cylinder is arranged at the outside of upper and lower ends of the supporting bar. Transmission shaft 115 is arranged on the outside of the steering disc frame, transmission shaft is provided with bearing, and bearing seat at intervals, and a 14-tooth sprocket wheel and conveying chain are disposed at interval of 400 millimeters. Conveying chain is provided with sugarcane drawing lever 116 at intervals. Transmission shaft is provided with hydraulic motor drive 117. The upper and lower movable walls of the conveyor are arranged on the other outer side of the steering disc frame. The upper and lower movable walls are provided with a width of 2000 mm, steel mesh or steel plates are arranged at intervals between the upper and lower movable walls, and the upper and lower movable walls are provided with upper and lower movable wall support square steel tube 118 at intervals. The transmission shafts 119 are disposed at upper end of the upper movable wall support square steel tube and at the upper and lower ends of the lower movable wall support square steel tube. 14-tooth sprocket wheel and conveying chain are disposed 400 mm apart at the transmission shaft at upper end of the upper movable wall. A sugarcane hook 120 may be disposed on the conveying chain at intervals. A 28-tooth sprocket wheel 121 and a 14-tooth sprocket wheel 122 are disposed 400 mm apart at the transmission shaft at upper end of the lower movable wall. A 14-tooth sprocket wheel and a conveying chain are disposed 400 mm apart at the transmission shaft at lower end of the lower movable wall. Sugarcane hooks and bearing sleeve joints 2 are disposed at the conveying chain at intervals, and bearing sleeve joints 2 is respectively equipped with a transmission shaft, a bearing 3, and a bearing sleeve 4. An outer sleeve 5 is arranged at both ends of the bearing sleeve. One surface of the outer sleeve is respectively connected to two steel plates 6, and holes are drilled on the steel plate surface and fixed to the upper end 123 of the lower movable wall support square steel tube and the end 124 of the square steel tube of the inner disc frame at the lower end. A surface in the middle of the bearing sleeve is respectively welded to square steel 8 and is respectively fixed at lower end 125 of the upper movable wall support square steel tube and square steel tube 126 at lower end of the lower movable wall support square steel tube by bolts. Upper end of the upper movable wall support square steel tube is provided with bearing sleeves 3, 4, 8, 127 respectively. The 14-tooth sprocket wheel of outer transmission shaft of the steering disc frame is connected to 14-tooth sprocket wheel of transmission shaft at lower end of the lower movable wall via conveying chains. The 14-tooth sprocket wheels of the transmission shaft at the upper and lower ends of the lower movable wall are connected by a conveying chain. The 14-tooth sprocket wheel of the transmission shaft at the upper end of the lower movable wall is connected to the 28-tooth sprocket wheel of the transmission shaft at the upper end of the lower movable wall by a conveying chain. The conveying chains of the upper and lower movable walls and the rollers in the steering disc frame conveying chain are all higher than the bottom surfaces of the chain sheets on both sides. The conveying chain, the sugarcane hook 120, and the sugarcane drawing bar 116 are respectively provided with a bottom support slide 128. The lower end 129 of the upper movable wall and the lower end 130 of the lower movable wall are respectively provided with lifting ends of a lifting oil cylinder at intervals, and the bottom end of the oil cylinder is arranged at the upper end of the lower movable wall and the bottom outside of the lower movable wall. The vertical inner and outer frames of the whole-stalk sugarcane bundling machine are disposed on the surface of the steering disc frame. Inner and outer frames on one side is connected to the lower side of the steering disc frame 131, and the inner and outer frames on one side of the upper and lower movable walls are connected overhead at lower end of the bottom pallet of the bundling machine. Two inclined opposing-faced sugarcane supporting sliding plates 132 are arranged on the two sides of the top of the frame. The sleeve shaft joints 133 are respectively arranged at the two ends of the inner frame of the sugarcane supporting sliding plates, and steel plates are respectively arranged at the two ends of the outer frame of the sugarcane supporting slide to adjust the inclination of the sugarcane supporting sliding plate. A steel plate slit is arranged in the middle of the steel plate, and the steel plate slit is fixed on the outer frame 134 by bolts. 4 high-temperature-resistant and non-toxic plastic sheet reels 135 are respectively arranged at the two outer sides of the sugarcane supporting sliding plate, and the sugarcane supporting plates 136 are arranged on two sides below the bottom of the sugarcane supporting sliding plate. Linear guide rails are arranged at intervals between the sugarcane supporting plates on both sides, and sliders 137 are arranged at intervals on the linear guide rails. Bottom surfaces of the sliding plates are fixed to the surface of a rectangular steel plate. Sleeve shaft joints are respectively disposed at outer ends of the steel plate. The sleeve shaft joint is fixed at the outer frame, and a support bar is disposed at the bottom surface at an inner end of the steel plate. A groove is provided at the inner end of the sugarcane supporting plate on one side, and a protruding serrated edge or blade is provided at the middle of the inner end of the sugarcane supporting plate on the other side. Snap support bars 138 are arranged at two inner ends of the sugarcane supporting plate on two sides, weighing sensor 139 is provided at the middle bottom surface of sugarcane supporting plate on one side, and two proximity sensors 140 are respectively arranged on the bottom surface of one end of the sugarcane supporting plate on both sides. Lifting oil cylinders 141 are disposed at the bottom surface of two ends of the sugarcane supporting plate on both sides. One end of the lifting oil cylinder is set on the inner side of the sugarcane supporting plate, and the bottom end of the oil cylinder is set on the outer frame. The compression plastic frame 142 is disposed on both sides below the bottom of the sugarcane supporting plate, and the bottom surface of one end of the compression plastic frame on both sides is provided with two proximity sensors at intervals. Linear guide rails are disposed at intervals on both sides of the compression plastic frame. Plastic sheet assemblies 143 are respectively disposed at the inner ends of the linear guide rails on both sides, and the assembly is equipped with a hollow pressure plate, an electric heating tube, a temperature sensor, a compression spring, and bolts. Grooves are formed on the surface of the hollow pressure plate of the assembly on two sides. Sawtooth blades are disposed in the middle of the groove on the surface of hollow pressure plate of the assembly on two sides. Sliders are disposed at intervals on the linear guide rails on both sides, the bottom surface of the sliders is fixed on the frame, and the lifting oil cylinder is disposed in the middle of bottom surface of the compression plastic frame on both sides. One end of the oil cylinder and is set on the inner side of the compression plastic frame, and the bottom end of the oil cylinder is set on the outer frame. The sugarcane pressing frame 144 is arranged on both sides of the bottom surface of the compression plastic frame, and two proximity sensors are respectively arranged on the bottom surface of one end of the sugarcane pressing frame on both sides. The sugarcane pressing frames are provided with linear guide rails at intervals, the inner ends of the linear guide rails are provided with Y-shaped forks 145, the linear guide rails are provided with sliders at intervals, and the bottom surface of the sliders is fixed onto the frame. The lifting oil cylinder is disposed in the middle of bottom surface of the sugarcane pressing frame on both sides. One end of the lifting oil cylinder is disposed on the inner side of the sugarcane pressing frame. The bottom end of the oil cylinder is arranged onto the outer frame. Bottom support plates 146 are disposed below the bottom of the sugarcane pressing frame on both sides. Two proximity sensors are each mounted onto the bottom surface of one end of the bottom support plates on both sides, and linear guide rails are arranged at intervals onto the bottom support plates on both sides. The linear guide rails are provided with sliders at intervals, and the bottom surfaces of the sliders are respectively fixed onto the frame. The lifting oil cylinder is arranged in the middle of the bottom surface of the bottom supporting plates on both sides. One end of the lifting oil cylinder is disposed at inner sides of the bottom supporting plates, and bottom end of the oil cylinder is arranged onto the outer frame. The sugarcane stalks of the sugarcane supporting sliding plates 132 with two opposite inclined surfaces above the above-mentioned whole-stalk sugarcane bundling machine slide down to the sugarcane supporting plates 136 on both sides below. The weighing sensors 139 installed on the sugarcane supporting plates weigh the sugarcane stalks, and when the specified weight is reached, the sugarcane supporting plates on two sides are open and the sugarcane stalks fall to the bottom support plate 146, and the sugarcane supporting plate is closed at the same time. The plastic sheet in the reel 135 on both sides of the sugarcane supporting slide has been connected to the bottom of the sugarcane supporting plate 136 in advance and is pressed at the surface and two sides of bottom support plate 146 by the fallen sugarcane stalks. The Y-shaped forks 145 of sugarcane pressing frame 144 on both sides are closed to press the sugarcane stalk into a round shape. The compression plastic sheet assemblies 143 that are provided in the compression plastic frame 142 on both sides are closed to make the plastic pieces glued together with a height of 20 mm. At the same time, after the sawtooth edge of the groove is divided in the middle, the compression plastic frame 142 is opened, and the sugarcane pressing frame 144 is opened at the same time. The bottom support plate 146 is opened and then closed at the same time, and the bundled sugarcane stalks fall to the steering disc frame surface 109. The bundled sugarcane stalks are transported to the lower end of the upper and lower movable walls by the conveying chain on the disc frame surface, and then the bundled sugarcane stalks are transported to the compartment of the sugarcane transport truck parallel to one side the harvester by the conveying chains on the upper and lower movable walls. The sugarcane stalks in the sugarcane supporting plate are weighed to the specified weight and then opened again. This process is continuously repeated. The whole process is controlled by the automatic control unit 147 set on the top and outside of the bundling machine, and the automatic control unit 147 includes a power supply, control, signal acquisition, signal processing, and driving which constitute a closed-loop control system. The functions of each part are implemented by automatic electrical and oil controls via the control button and touch screen PLC to achieve the purpose of automatic control of the devices. First, the power supply part consists of on-board battery, inverter, switch and transformer. Second, control part is implemented such that the on-board control equipment is controlled by control buttons and an operation touch screen. Third, signal collection is carried out by different types of photoelectric sensors, proximity sensors, limit sensors, temperature sensors, weighing sensors and A-C conversion. Fourth, signal processing is completed in a way that the signals collected by each sensor are processed by PLC centralized processing. Fifth, drive control is implemented such that the relay solenoid valve and oil cylinder solenoid valve are controlled and driven by the PLC.

Embodiment 2

The difference from Embodiment 1 is: the bottom ends of upright support bars are also arranged on both sides of the front frame of left and right sugarcane root grinders. Plane bars 148 are arranged on both front sides of upper ends of the upright support bars, sugarcane supporting bars with wide front and narrow back are arranged at the plane bars on both sides at intervals, torsional springs 149 are arranged at inner ends of the sugarcane supporting bars, and sleeve shaft joints 150 are arranged at outer ends of the sugarcane supporting bars to reset the sugarcane supporting bars through torsional arms of the torsional springs. Sugarcane pulling bars are arranged at the upper ends of transmission shafts of left and right side disc central holes, bevel gears and disc bottom left and right side fixed raising plates 151 are respectively arranged at the bottoms, transmission shafts 152 are arranged in the fixed raising plates on both sides, certain ends of the transmission shaft discs are respectively provided with bevel gears, and sprocket wheels 153 are respectively arranged on left and right outer sides. The central hole bottom surface of one single disc 48 is also provided with a transmission shaft, a bearing, a bearing seat, a sprocket wheel and a disc fixing transverse raising plate, a cover plate is arranged at the bottom surface of the raising plate, the cover plate is fixed by bolts, a driving chain is arranged in the raising plate, both ends of the raising plate are fixed on both sides of the frame by bolts, the disc 48 is fixed on the raising plate surface at the upper end of the transmission shaft through a circular clamping plate, an upright transmission shaft is arranged at one end of the raising plate, the sprocket wheel is arranged at the lower end of the transmission shaft and a triangular pulley is arranged at the upper end of the transmission shaft. The pulley drives the disc to rotate left and right by crossing of triangular belts through the triangular pulley arranged at one end of the transmission shaft arranged behind a sugarcane stalk upward pulling conveyor. The bottom surface transmission shaft of the central hole of the disc 48 is also provided with a bevel gear, a transmission shaft is arranged in the raising plate, bevel gears are arranged at both ends of the transmission shaft, and bevel gears are arranged below the transmission shaft at one end of the raising plate. Elastic rubber sheet barrier plates are arranged on front end both sides of one single disc 48. Behind the left and right sugarcane root grinders, the sugarcane stalk upward pulling conveyor is arranged. One transmission shaft 154 is arranged at the front, bearings, bearing seats, sprocket wheels and a conveying chain 155 are arranged at both ends of the transmission shaft, double-sided bent plates are arranged on upper and lower surfaces of two sides of the conveying chain at intervals, a square steel tube 156 is arranged on the conveying chain surface on both sides at an interval of 70 mm wide, both ends of the square steel tube are fixed to the double-sided bent plates on both sides of the conveying chain surface by bolts, and a plurality of groups of spaced steel nails 157 are mounted on one square steel tube surface at intervals of a plurality of square steel tubes. The steel nails are fixed on square steel tube surface by welding. In the space between the square steel tubes, sugarcane supporting plates 158 are arranged on bottom surfaces of the conveying chain on both sides with a depth of 40 mm below the upper surface of the square steel tube and fixed on the double-sided bent plate surfaces on both sides by bolts. One transmission shaft is arranged at the back, bearing sleeve joints 2 are arranged at both ends of the transmission shaft, a triangular pulley is arranged at one end of the transmission shaft, and bearing seats arranged on both sides of the front transmission shaft are fixed on both sides of the frame. A plurality of rows of rollers 159, with five rollers continuously mounted in each layer and each row at intervals and rotating clockwise for about 500 revolutions per minute, for scraping sugarcane leaves and peeling sugarcane peel and simultaneously conveying sugarcane stalks at intervals are arranged on both sides of the back frame of the sugarcane stalk upward pulling conveyor, wherein the first roller 160 at the sugarcane inlet rotates counterclockwise. One end of the transmission shaft with continuously mounted five rollers at intervals of 85 mm respectively behind the circular plates of the rollers is provided with a sprocket wheel and a transmission chain, two ends are provided with bearings and bearing seats, and both ends of the transmission shaft of the second roller at the sugarcane inlet are provided with sprocket wheels and a transmission chain. The roller has a diameter of 88 mm 161 and a length of 648 mm 162, both ends of the roller are provided with end blocking circular plates 163 with a diameter of 318 mm and a thickness of 1.5 mm, 10 rows of steel plates with upright transverse surfaces at intervals are arranged on the roller surface at intervals, steel plate surfaces have a width of 18 mm 164 and a height 115 mm, the roller surfaces with 6 intervals, each of which has a width of 87 mm 165, are sugarcane stalk conveying channels, the bottom ends of the steel plates of the roller surface with upright transverse surfaces at intervals are fixed on the roller surfaces by welding, one elastic rubber sheet with a thickness of 4.5 mm is respectively arranged on the steel plate surface of the roller surface with upright transverse surfaces at intervals and both sides, and the middle of the rubber sheet is fixed on the upright steel plate surface by bolts 166 through a clamping plate. A torsional spring is arranged outside the clamping plate to increase the elasticity of the rubber sheets on both sides for a long time through a torsional arm. The torsional spring is fixed outside the clamping plate by nuts. The steel plate surface of the roller surface with upright transverse surfaces at intervals and both sides are respectively provided with one elastic rubber sheet. The surface of the rubber sheet scraping toward the sugarcane stalks is drilled, and nuts are used to respectively fix external hexagonal bolt heads 167 with a bolt diameter of 5 mm. Ten rows of upright and longitudinally spaced steel plates 168 are also arranged on the roller surface at intervals, the steel plate surface has a width of 28 mm, the steel plate has a thickness of 6 mm and a height of 115 mm, the roller surfaces with six intervals, each of which has a width of 81 mm, are sugarcane stalk conveying channels, a circular pipe 169 with an upright diameter of 12 mm is welded on both sides of the roller surface with upright longitudinal steel plate surfaces, so that the outer ends of the fixed rubber sheets are tilted up, and the two opposite rubber sheets form inner-wide outer ends to be attached together closely. A torsional spring is arranged at the rear end of the upright steel plate to increase the elasticity of the rubber sheet for a long time through a torsional arm, the torsional spring is fixed at the rear end of the steel plate by a clamping hole, and the bottom end of the upright steel plate is fixed on the roller surface by welding. One end of one elastic rubber sheet with a thickness of 6 mm is respectively arranged on both sides of the roller surface with upright longitudinal steel plate surfaces at intervals. One end of the rubber sheet is fixed on the steel plate surface on both sides by bolts 170. One elastic rubber sheet is respectively arranged on both sides of the roller surface with upright longitudinal steel plate surfaces at intervals. The surface of the rubber sheet scraping toward the sugarcane stalks is drilled, and external hexagonal bolt heads 171 with a bolt diameter of 5 mm are respectively fixed by nuts. A circular plate ring is arranged at the upper end of the upright steel plate of the roller surface at the sugarcane inlet, and the circular plate ring is fixed on the upper end of the upright steel plate by bolts. A sprocket wheel shaft 172 and a sprocket wheel driving the roller at the sugarcane inlet to rotate counterclockwise through the sprocket wheel rotating clockwise of a second roller are arranged on one front side of the roller at the sugarcane inlet. A bottom supporting plate 173 is arranged on the bottom surface of the roller rotating counterclockwise at the sugarcane inlet. Bearing seats at both ends of the roller transmission shaft at the sugarcane inlet are fixed on the surfaces on both sides of the frame by bolts. Bearing seats, which are continuously mounted at intervals backward, at both ends of the second roller transmission shaft at the sugarcane inlet are fixed on the downward bottom surfaces on both sides of the frame by bolts. The lower frame of the tail of the harvester adopts bolts to fix the connector of a whole-stalk sugarcane conveyor and the circular hole 99 connected with a whole-stalk sugarcane bundling machine. The rear ends of both sides of a sugarcane supporting sliding plate 132 with two opposite inclined surfaces of the whole-stalk sugarcane bundling machine are also provided with sugarcane blocking plates 174 which can be extended backwards, and linear guide rails of the sugarcane blocking plates which can be extended backwards are fixed on the frame by bolts. Rectangular bottom frames 175 are also arranged on both outer sides of bottom surfaces of bottom supporting plates 146 on both sides of the bundling machine, circular holes 99 are arranged in the middle of both sides of the front end of the bottom frame, and gaps disposed in the bottom surfaces of the circular holes are sealed by steel plates and bolts. Walking wheels are arranged on both slightly back sides of the middle of the bottom frame. Sugarcane blocking plates are arranged on both inner sides of the walking wheels. A soft steel wire rope is respectively arranged on both sides of the rear end of the top surface of the whole-sugarcane bundling machine, the other end of the soft steel wire rope is connected to the lifting end of a lifting oil cylinder, and the bottom end of the oil cylinder is respectively arranged on both sides of the frame above the tail of the harvester.

Embodiment 3

The difference from Embodiment 1 and Embodiment 2 is: both outer sides of a lifting bar provided with the upper end of the transmission shaft at the disc central hole of the left and right sugarcane root grinders are further provided with a rotating shaft, the rotating shaft and the upper end of the central hole transmission shaft are respectively provided with a triangular pulley 176 rotating in the horizontal plane, the triangular pulley is arranged through both ends of a third roller transmission shaft behind the lower layer of the sugarcane inlet, and the triangular pulley rotating in the upright direction is driven at an angle through a direction change horizontal plane of a triangular belt. A transmission shaft, a bearing, a bearing seat and a bevel gear are arranged on the bottom surface of the central hole of one single disc 48, straight and transverse raising plates for fixing the disc are also arranged on the bottom surface of the disc 48, the bottom surfaces of the raising plates are respectively provided with a cover plate, the cover plates are fixed by bolts, the rear end of the straight raising plate is welded in the middle section of the transverse raising plate, the transmission shaft is respectively arranged in the raising plate, bevel gears are arranged at both ends of the transmission shaft, and both ends of the raising plates are fixed on both sides of the frame by bolts. The disc 48 is fixed on the raising plate surface at the upper end of the transmission shaft through a circular clamping plate. An upright transmission shaft is arranged at one end of the raising plate, a bevel gear is arranged at the lower end of the transmission shaft, and a triangular pulley is arranged at the upper end of the transmission shaft. The pulley drives a transverse transmission shaft above by a chain through one end of the transmission shaft of the roller for scraping sugarcane leaves and peeling sugarcane peel at the lower layer of a sugarcane inlet, and then the triangular pulley arranged on the transverse transmission shaft drives the disc to rotate left and right through crossing of a triangular belt. On both sides of the back frame of the left and right sugarcane root grinders, several rows of upper and lower two layers of rollers 177, with continuously mounted seven rollers in each layer at intervals and upper and lower double layers of each row, for scraping sugarcane leaves and peeling sugarcane peel and simultaneously conveying sugarcane stalks are arranged. The back surfaces of circular plates with continuously mounted seven rollers at intervals in each layer have an interval of 85 mm respectively. The top ends of several rows of rubber sheets for scraping sugarcane leaves and peeling sugarcane peels at intervals on the upper and lower roller surfaces are approximately inserted into the opposite roller surfaces at intervals. Bearings and bearing seats are respectively arranged at two ends of the transmission shaft with continuously mounted two layers of rollers at intervals, with seven rollers in each layer. Gears are respectively arranged at one end, the gear of the upper layer roller is driven to rotate counterclockwise by clockwise rotation of the gear of the lower layer roller, wherein a sprocket wheel and a transmission chain are respectively arranged at one end of the lower layer roller, and bearing sleeve joints 2 and triangular pulleys are respectively arranged at both ends of the transmission shaft of the third roller of the lower layer. The upper and lower layer rollers have a diameter of 113 mm, the upper layer roller has a length of 648 mm 178, the lower layer roller has a length of 658 mm 179, both ends of the lower layer roller are provided with end blocking circular plates 180 with a diameter of 285 mm and a thickness of 1.5 mm, the surfaces of the upper and lower layer rollers are respectively provided with 5 rows of steel plates with upright transverse surfaces at intervals, the steel plate surfaces have a width of 18 mm and a height of 86 mm, six sugarcane stalk conveying channels are formed at each interval of 87 mm wide, wherein the steel plates with upright transverse surfaces at both ends of the low layer roller have a width of 23 mm 181, the bottom end of the steel plate with upright transverse surfaces is fixed on the roller surface by welding, one elastic rubber sheet with a thickness of 4.5 mm is respectively arranged on the steel plate surface of the roller surface with upright transverse surfaces at intervals and both sides, and the middle of the rubber sheet is respectively fixed on the upright steel plate surface by bolts 182 through a clamping plate. Torsional springs are arranged outside the clamping plate to increase the elasticity of the rubber sheets on both sides for a long time through torsional arms. The torsional springs are fixed outside the clamping plate by nuts. The steel plate surface of the roller surface with upright transverse surfaces at intervals and both sides are respectively provided with one elastic rubber sheet 183. The surface of the rubber sheet scraping toward the sugarcane stalks is drilled, and external hexagonal bolt heads 184 with a bolt diameter of 5 mm are respectively fixed by nuts. A transverse bar parallel to the roller is respectively arranged on the upper and lower surfaces in front of the upper and lower layer rollers at the sugarcane inlet, and 5 bent upright bars 10 mm apart from the steel plate ends of the roller surface with upright transverse surfaces at intervals are respectively arranged on the lower surface of the upper layer transverse bar surface and the upper surface of the lower layer transverse bar surface at intervals. A sugarcane sectioning blade device 185 is arranged at the sugarcane outlet at the tail of the harvester. The blade device is provided with an outer blade holder 186 and an inner blade holder 187, a fixed blade 188 is arranged at the bottom ends of the blade holders on both sides behind the outer blade holder at intervals, two blade edges are arranged opposite to each other, upper and lower sugarcane supporting plates 189 are arranged behind the edges of the upper and lower blade edges, compression springs 190 are respectively arranged at intervals on both sides of the surface of the upper sugarcane supporting plate and the bottom surface of the lower sugarcane supporting plate, the top end of the outer blade holder is provided with the bottom end of a lifting oil cylinder, and one end of the lifting oil cylinder is arranged at the top end of the inner blade holder. One proximity sensor 191 is respectively arranged in the middle of one side and at the lower end of the outer blade holder, sliding blocks 192 are respectively arranged in the middle of both sides and at the lower end of the outer blade holder, an inner blade holder linear guide rail 193 is respectively arranged on both sides of the inner blade holder, the linear guide rail on both sides of the inner blade holder is sleeved in the sliding blocks on both sides of the outer blade holder, a double-edged sugarcane sectioning blade 194 is arranged at the lower end of the linear guide rail on both sides of the inner blade holder, both ends of the sugarcane sectioning blade are fixed on the linear guide rail on both sides by bolts, bearing shafts, bearings, bearing moving grooves 195 and tension torsional springs 196 are arranged on both sides of the bottom end of the outer blade holder, and the bearing moving grooves on both sides are fixed on both sides of the frame of the sugarcane outlet at the tail of the harvester by bolts. The inner blade holder of the sectioning blade device is also provided with double inner blade holders 197, the double inner blade holders are provided with double-edged sugarcane sectioning blades 198, and the top ends of the double inner blade holders are provided with the lifting end of a lifting oil cylinder. By disposing an automatic control unit, the lifting oil cylinder arranged at the inner blade holder of the above-mentioned sectioning blade device is controlled to rise and fall once every 1 second, 2 seconds, 3 seconds and 4 to 6 seconds to achieve the purpose of cutting sugarcane stalks into sections of 600, 800 and 1,000 mm or more in length. The automatic control unit is a closed-loop control system composed of power supply, control, signal collection, signal processing and driving. The functions of respective parts are subjected to electricity and oil automated control through control buttons and a touch screen PLC to achieve the purpose of automatic control of the device. 1. Power supply part: an on-board storage battery and a switch. 2. Control part: the on-board control device is controlled by operation of the control buttons and the touch screen. 3. Signal acquisition: signals are collected by different types of photoelectric sensors, proximity sensors and limit sensors. 4. Signal processing: the signals collected by respective sensors are centralized and processed by the PLC. 5. Driving control: the PLC controls and drives relay solenoid valves and oil cylinder solenoid valves. On the lower frame of the tail of the harvester, bolts are adopted to fix the connector of the whole-stalk sugarcane conveyor and connect the circular hole 99 of a sugarcane sectioning transverse sugarcane stalk conveyor, upright blocking plates are also arranged on the rear end edge 199, the right side edge 200 and the two side edges 201 of upper and lower movable walls on the disc frame surface of a sugarcane sectioning transverse sugarcane stalk 180-degree left and right steering conveyor, the upper and lower movable walls and the disc rack surface are set to have a width of 1,100 mm, and a conveying chain is arranged at the upper and lower movable walls and the disc frame surface on both sides at an interval of 200 mm wide. The lifting end 202 of a lifting oil cylinder is respectively arranged on both sides at the front surface of walking wheels of the bottom frame, and the bottom end of the oil cylinder is respectively arranged under the tail of the harvester. The two sides of the front end of the bottom frame of the sugarcane sectioning transverse sugarcane stalk 180-degree left and right steering conveyor are also fixed by bolts.

Embodiment 4

The difference from Embodiment 1, Embodiment 2 and Embodiment 3 is: hydraulic motor drives 203 are respectively arranged at the upper ends of the transmission shafts of the disc central holes of the left and right sugarcane root grinders. Sleeve shaft joints 204 are arranged at the rear ends of both sides of left and right disc frames. Sugarcane supporting sliding plates 205 are arranged behind the left and right discs to a sugarcane outlet of the tail of the harvester, and sugarcane supporting sliding plate grooves which suddenly narrow and have a width of 20 mm and a height of 20 mm are arranged on both sides of surfaces of the sugarcane supporting sliding plates at the sugarcane outlet. Two rows of upright sugarcane stalk conveying wall frames 206 are arranged at intervals above and behind the discs, sugarcane stalk conveying channels with wide front entrance and narrow back are arranged in the interval space in the two rows of wall frames, two rows of wall frame surfaces are provided with steel meshes or plates at intervals, front ends of two rows of wall frames are provided with sprocket wheel shafts 207, and sprocket wheels 208 and bearings are arranged in the sprocket wheels. Upright transmission shafts 209 are arranged on both sides of the middle section of two rows of wall frames, bearings, bearing seats, sprocket wheels and conveying chains 210 are arranged on the transmission shafts up and down at intervals, sugarcane pulling bars are arranged on the conveying chains, and pressing sprocket wheels 211 are arranged on the inner side of the middle section of the conveying chains. The lower ends of the transmission shafts on both sides of the middle section of two rows of wall frames are provided with sprocket wheel shafts that one transmission shaft drives another transmission shaft to rotate in an opposite direction, sprocket wheels 212 and transmission chains. A sprocket wheel 213 is respectively arranged at the lower ends of the upright transmission shafts on both sides of the middle section, a ball cage constant velocity universal joint is arranged in the sprocket wheel to connect independent sugarcane feeding chain discs on both sides above the front disc, a sprocket wheel is arranged at the front end of the chain disc, a pressing sprocket wheel and a conveying chain 214 are arranged at the inner side of the middle, the conveying chain is provided with a sugarcane pulling bar, and sliding plate grooves 215 for fixing the chain discs are arranged at both sides of the front. A space 216 for sugarcane conveying without passing by the conveying chain is arranged in the middle section of the sugarcane stalk conveying channels of the two rows of wall frames, so that the sugarcane stalks can move after being squeezed by the sugarcane stalks moved by the front conveying chain. An upright former transmission shaft 217 and an upright latter sprocket wheel shaft 218 are arranged behind the two rows of wall frames at intervals. Bearings, bearing seats, sprocket wheels, transmission chains and conveying chains are arranged on the former transmission shaft up and down at intervals, the conveying chains are provided with sugarcane pulling bars at intervals, and the bearing seats are fixed on the frame. The latter sprocket wheel shaft is provided with sprocket wheels up and down at intervals, bearings are arranged in the sprocket wheels, and the latter sprocket wheel shaft is fixed on the frame by bolts. The former transmission shaft 217 drives a transmission shaft in the middle section through a transmission chain 219 and the sprocket wheels at intervals of the latter sprocket wheel shaft 218 through a conveying chain 220, so that the transmission shaft in the middle section, the former transmission shaft 217 and the latter sprocket wheel shaft 218 rotate synchronously. Every time the former transmission shaft 217 drives the sugarcane pulling bars arranged on the conveying chain 220 of the latter sprocket wheel shaft 218 at intervals to rotate at the roller of a helical blade for a circle, the sugarcane pulling bars arranged on the conveying chain 220 at intervals move by an interval to the inlet of the helical blade of the roller. Behind the latter sprocket wheel shaft, a roller provided with seven continuous helical blades which overlap and rotate synchronously counterclockwise and rotate about 400 revolutions per minute for scraping sugarcane leaves and peeling sugarcane peel and simultaneously conveying sugarcane stalks is arranged, bearings and bearing seats are arranged at both ends of the roller transmission shaft, a bevel gear 221 is arranged at the rear end, the front ends of the roller transmission shafts on top and bottom surfaces are provided with bevel gears, and the bevel gears are respectively connected with bevel gears and sprocket wheels arranged at upper and lower front end transmission shafts 222. The roller with helical blades for scraping sugarcane leaves and peeling sugarcane peel and simultaneously conveying sugarcane stalks is set to have a diameter of 88 mm 223, the helical blades of the roller have a thickness of 1.5 mm and a diameter of 348 mm 224, the helical blades have a height of 130 mm 225 on the roller surface, each interval of the helical blades on the roller surface has a width of 100 mm 226, and there are 17 intervals in total. The length of the roller is 2271 mm 227, and two opposite helical blade surfaces of the roller surface are respectively welded with a steel plate 228 with upright transverse surfaces at intervals, the steel plate surface has a width of 16 mm and a height of 130 mm, the two opposite helical blade surfaces of the roller surface at intervals are welded with a steel plate with upright transverse surfaces at intervals, and one end of an elastic rubber sheet with a thickness of 4.5 mm is respectively fixed on the steel plate surface through a clamping plate and a bolt 229, so that the two opposite rubber sheets form a transverse blocking interval. A torsional spring is arranged outside the clamping plate to increase the elasticity of the rubber sheet for a long time through a torsional arm, and one side of the torsional spring is fixed on the clamping plate surface by a nut. Two opposite helical blades on the roller surface are respectively provided with an elastic rubber sheet 230 on the steel plate surface with upright transverse surfaces at intervals. The surface of the rubber sheet scraping toward the sugarcane stalks is drilled, and nuts are respectively adopted to fix hexagonal bolt heads 231 with a bolt diameter of 5 mm. An elastic rubber sheet with a thickness of 6 mm is also arranged at intervals on the two opposite helical blade surfaces on the roller surface at intervals, one end of the rubber sheet is fixed on the surfaces of the two opposite helical blades on the roller by bolts 232, and an upright circular pipe 233 with a diameter of 12 mm is welded on the helical blade surface at one end of the fixed rubber sheet, to enable the outer end of the rubber sheet to be tilted up, so that the two opposite rubber sheets form inner width and two outer ends 234 are closely attached together. A torsional spring is arranged at the fixed end of the helical blade surface of the rubber sheet to increase the elasticity of the rubber sheet for a long time through a torsional arm, the torsional spring is fixed through a clamping hole in the helical blade surface, and an elastic rubber sheet 235 is arranged on the two opposite helical blade surfaces of the roller surface at intervals. The surface of the rubber sheet scraping toward the sugarcane stalks is drilled, and nuts are adopted to fix external hexagonal bolt heads 236 with a bolt diameter of 5 mm respectively. A serrated edge 237 is arranged at the front end of the sugarcane stalk inlet of the helical blade of the roller. A sugarcane pressing cover plate 238 is respectively arranged on one side surface of the roller with the continuous helical blades for scraping the sugarcane leaves and peeling the sugarcane peel and simultaneously conveying the sugarcane stalks, and the upper and lower side edges 239 of the sugarcane pressing cover plate cover the two side edges, exceeding inwards 30 mm, of the widest surface outside the helical blade of the roller. Two ends and two sides of the sugarcane pressing cover plate are fixed on the frame by bolts. An upright transmission shaft 240 is arranged behind a plurality of rollers, and bevel gears 241, bearings and bearing seats are arranged at intervals at the upper and lower ends of the transmission shaft. Sprocket wheels 242 and transmission chains are arranged at the upper and lower ends, and the transmission chain of the lower end sprocket wheel is driven by an engine or a hydraulic motor. A sugarcane sliding bar 243 is respectively arranged on both sides of the upper end of the rear surface of the plurality of rollers, the upper end of the sugarcane sliding bar is respectively provided with a sleeve shaft joint, the upper end of a linear guide rail is respectively provided with a lifting end of a lifting oil cylinder, and the bottom end of the oil cylinder is arranged on the frame. Seven rollers overlap and rotate counterclockwise synchronously. Or the bevel gears on the transmission shaft 222 are mounted in opposite directions, and the rotating direction of the helical blades of the roller is changed to realize clockwise rotation of the seven rollers. At the frame under the tail of the harvester, the connector of a whole-stalk sugarcane conveyor is fixed by bolts. A joint circular shaft 97 is connected to the circular hole 99 of a scattered whole-stalk sugarcane 180-degree left and right steering conveyor. Square steel 8 is welded on one surface in the middle of upper and lower movable wall bearing sleeves, a rectangular hole is drilled in the other end of the square steel 8, then a compression spring is sleeved, and bolts are adopted for fixing in the lower end 125 of an upper movable wall supporting square steel tube and the lower end square steel tube 126 of a lower movable wall supporting square steel tube. Behind the 14-toothed sprocket wheel 122 at the upper end of the lower movable wall supporting square steel tube, double-sided bent plates supporting the chain or idler wheels 244 supporting the roller are respectively arranged, the idler wheels are provided with two bearings, a seam for supporting a sugarcane hook through the conveying chain is arranged between the bearings, top surfaces of the bearings at both sides support the double-sided bent plates or rollers at both sides of the conveying chain, and a sprocket wheel for positioning the conveying chain is respectively arranged above the idler wheels. The transmission shaft 14-toothed sprocket wheels at the upper and lower ends of the lower movable wall and the transmission shaft 14-toothed sprocket wheel at the upper end of the upper movable wall are connected and driven by the conveying chain.

Embodiment 5

The difference from Embodiment 1, Embodiment 2, Embodiment 3 and Embodiment 4 is: the whole-stalk sugarcane combine harvester with two rows of simultaneous harvesting is provided with a base frame 1 connected with bottom wheels for two-sugarcane row spanning operation. A sugarcane tail cutter is provided with a width for two sugarcane row-spanning for cutting. Double rows and single layer of continuously and respectively mounted seven rollers 245, with several rows of rubber bars, for scraping sugarcane leaves and peeling sugarcane peel and simultaneously conveying sugarcane stalks at intervals are arranged on both sides of the back frame of the two rows of left and right sugarcane root grinders. The rollers rotate clockwise at about 500 revolutions per minute, and the back surfaces of the circular plates with continuously double rows and single layer of respectively mounted seven rollers have an interval of 85 mm respectively. One end of the transmission shaft of the roller is provided with a sprocket wheel and a transmission chain, and the transmission shafts at two ends are provided with bearings and bearing seats, wherein two ends of the transmission shaft of the third roller are provided with a bearing sleeve joint 2 and a triangular pulley 246 respectively. The roller has a diameter of 42 mm 247 and a length of 639 mm 248, both ends of the roller are provided with end blocking circular plates 249 with a diameter of 362 mm and a thickness of 1.5 mm, ten rows of steel plates 250 with upright transverse surfaces are arranged on the roller surface at intervals, the steel plate surfaces have a height of 40 mm and a length of 639 mm respectively, and the bottoms of the steel plates are fixed on the roller surface by welding. Ten rows of steel plates with upright transverse surfaces are drilled at intervals of 35 mm, 45 mm, 50 mm, 55 mm, 65 mm and 75 mm wide respectively, an elastic rubber bar with an upright diameter of 12 mm and a height of 160 mm is arranged at intervals of 45 mm wide according to diameters of sugarcane stalks planted in various places, the roller surface has eleven intervals, eleven sugarcane stalk conveying channels are arranged at intervals of 45 mm wide, and the bottom end of the upright elastic rubber bar is fixed on the steel plate surface with the upright transverse surfaces through drilling by bolts 252 with a diameter of 5 mm at intervals of 45 mm wide. The steel plate surface of the roller surface with the upright transverse surface is provided with an elastic rubber bar with a diameter of 12 mm and a height of 160 mm at intervals of 45 mm wide. The surface of the rubber bar scraping toward both sides of the sugarcane stalks is drilled at intervals, and external hexagonal bolt heads 253 with a bolt diameter of 5 mm and nuts 254 are respectively fixed. On both sides of the back frame of the two rows of left and right sugarcane root grinders, double rows and upper and lower layers of rollers, with continuously and respectively mounted seven rollers in each layer at intervals and several rows of rubber bars, for scraping sugarcane leaves and peeling sugarcane peel and simultaneously conveying sugarcane stalks are arranged. The back surfaces of the circular plates with continuously mounted double rows and upper and lower two layers of rollers and seven rollers in each layer have an interval of 85 mm. The top ends of several rows of rubber bars on the upper and lower two layers of roller surfaces are all approximately inserted to the upper end of a steel plate with the upright transverse surfaces of the opposite roller surface at intervals. Bearings and bearing seats are respectively arranged at two ends of a transmission shaft with continuously mounted two rows and upper and lower two layers of rollers at intervals and seven rollers in each other, gears are respectively arranged at one end to drive the gear of the upper layer roller to rotate counterclockwise by clockwise rotation of the gear of the lower layer roller, and sprocket wheels and transmission chains are respectively arranged at one end of the lower layer roller. Bearing sleeve joints 2 and triangular pulleys 246 are respectively arranged at two ends of the transmission shaft of the lower layer third roller. The upper and lower layers of rollers have a diameter of 42 mm and a length of 639 mm, five rows of steel plates 255 with upright transverse surfaces are respectively arranged at intervals on the roller surface, the steel plate surfaces have a height of 40 mm and a length of 639 mm respectively, and the bottoms of the steel plates are fixed on the roller surface by welding. Five rows of steel plate surfaces with upright transverse surfaces are drilled at intervals of 35 mm, 45 mm, 50 mm, 55 mm, 65 mm and 75 mm wide respectively, an elastic rubber bar with an upright diameter of 12 mm and a height of 160 mm is arranged at intervals of 45 mm wide according to diameters of sugarcane stalks planted in various places, and both ends of the lower layer roller are provided with end blocking circular plates with a diameter of 362 mm and a thickness of 1.5 mm. The upper and lower two layers of roller surfaces have eleven intervals, each interval is 45 mm wide, there are eleven sugarcane stalk conveying channels, and the bottom ends of the upright elastic rubber bars are respectively fixed on the steel plate surface with the upright transverse surfaces at intervals of 45 mm through drilling by adopting bolts with a diameter of 5 mm. An elastic rubber bar with an upright diameter of 12 mm and a height of 160 mm is respectively arranged on the steel plate surface with the upright transverse surfaces of the roller surface at intervals of 45 mm. The surface of the rubber bar scraping toward both sides of the sugarcane stalks is drilled at intervals, and external hexagonal bolt heads with a bolt diameter of 5 mm and nuts are respectively fixed. The lower end of the bolt with a diameter of 5 mm is fixed in the rubber bar by casting the rubber bar, and the bolt head of the upper end of the rubber bar is respectively provided with circular steel, square steel and the like protruding 3 mm and having a diameter of 7 mm on both sides of the rubber bar. The connector of a whole-stalk sugarcane conveyor is fixed by bolts on the frame below the tail of the harvester. The joint circular shaft 97 is connected to a circular hole 99 of the scattered whole-stalk sugarcane 180-degree left and right steering conveyor. The scattered whole-stalk sugarcane 180-degree left and right steering conveyor is provided with sugarcane supporting sliding plates 132 with two opposite inclined arranged at the upper part of the whole-stalk sugarcane bundling machine on the surface of a bottom wheel two-sugarcane row-spanning walking and steering disc frame 109, and a set width is butted against sugarcane stalks of two rows of sugarcane outlets at the tail of the harvester. The whole-stalk sugarcane combine harvester with two rows of simultaneous harvesting is provided with a base frame 1 connected with bottom wheel two-sugarcane row spanning operation, and is also provided with a base frame with four-row simultaneous harvesting, one side of the front end of the front frame is provided with a liftable, walkable and steerable wheel at intervals of two rows of sugarcane, and the other side is provided with a liftable, walkable and steerable wheel at intervals of one row of sugarcane. Four rows and single layer of rollers 245, with continuously respectively mounted seven rollers at intervals and several rows of rubber bars, for scraping sugarcane leaves and peeling sugarcane peel and simultaneously conveying sugarcane stalks at intervals are arranged on both sides of the back frame of four rows of left and right sugarcane root grinders. The rollers rotate clock-wise at about 500 revolutions per minute, and the four continuous rows of circular plates provided with seven rollers at intervals have an interval of 85 mm respectively. At the frame below the tail of the harvester, the connector of the whole-stalk sugarcane conveyor is fixed with bolts. The joint circular shaft 97 is connected with a circular hole 99 of the scattered whole-stalk sugarcane left and right conveyor. The scattered whole-stalk sugarcane left and right conveyor is provided with bottom wheel two-sugarcane row spanning walking, and upright bars 258 for supporting left and right conveying frames are also arranged on the bottom frame surface. Upright bars are arranged on both sides of the rear end of the bottom frame at intervals, the front surface 259 of the upper end of the upright bar is respectively connected with one sugarcane supporting sliding plate 132 with two opposite inclined surfaces to butt against two sugarcane outlets of the tail of the harvester, wherein the upper ends 260 of the upright bars on both sides are respectively connected with a soft steel wire rope, the other end of the steel wire rope is respectively arranged at the lifting end of a lifting oil cylinder, and the bottom end of the oil cylinder is respectively arranged on both sides of the frame above the tail of the harvester. Left and right and upper and lower movable walls are arranged on both sides of the left and right conveying frames 261, the surface width of the upper and lower movable walls is 2,000 mm, and ordinary bicycle single-speed flywheels 262 are respectively arranged in sprocket wheels arranged on the lower end transmission shafts of conveying chains of the lower movable walls on both sides, so that when the lower end transmission shafts of the lower movable walls on both sides rotate clockwise, the inner flywheel arranged on the lower end transmission shaft of the right lower movable wall drives an outer chain gear to rotate, and the inner flywheel arranged on the lower end transmission shaft of the left lower movable wall stops driving the outer chain gear to rotate. When the transmission shafts on both sides rotate counterclockwise, the right inner flywheel stops driving the outer chain gear to rotate, and the left inner flywheel drives the outer chain gear to rotate. Sectioning blade devices 185 are also arranged at the sugarcane outlet of the tail of the harvester. The upper and lower movable wall surfaces on left and right sides and the left and right conveying frame surfaces are set with a width of 1,100 mm. A conveying chain is set with an interval of 200 mm between the left and right and upper and lower movable wall surfaces and the left and right conveying frame surfaces, and upright barrier plates 201 are respectively arranged at the upper rear end edge 199 of the left and right conveying frame surfaces and the two side edges of the upper and lower movable wall surfaces on left and right sides. At the front end of the bottom frame of the sugarcane sectioning left and right side transverse upper and lower movable wall conveyor, the frame under the sugarcane outlet at the tail of the harvester is fixed by bolts.

Apparently, the foregoing embodiments are only examples for clear explanation, instead of limiting the embodiments. For those ordinary skilled in the art, other changes or alterations in different forms can also be made on the basis of the above description. It is not necessary and impossible to exhaust all the embodiments here. However, the obvious changes or alterations derived therefrom are still within the scope of protection of the present invention.

What is claimed is:

1. A whole-stalk or sectioning type combined sugarcane harvester, comprising: a frame, at least one sugarcane root grinding cutter, a plurality of rollers for scraping sugarcane leaves, peeling sugarcane peels and conveying sugarcane stalks by using circular plates arranged at intervals, a plurality of rows of rollers arranged at intervals for scraping sugarcane leaves, peeling sugarcane peels and conveying sugarcane stalks or two layers of rollers arranged vertically, at least one roller for scraping sugarcane leaves, peeling sugarcane peels and conveying sugarcane stalks by using continuous helical blades, a plurality of rows of rollers for scraping sugarcane leaves, peeling sugarcane peels and conveying sugarcane stalks by using rubber bars arranged at intervals or two layers of rollers arranged vertically, sugarcane pressing cover plates, sugarcane leaf and peel blocking barriers, a plurality of sugarcane stalk guide plates, two rollover safety devices, a plurality of anti-rollover regulators, and a whole-stalk sugarcane bundling and 180-degree left and right steering conveyor, wherein the frame is a whole base frame connected to bottom wheels of the whole-stalk or sectioning type combined sugarcane harvester for operating across a single sugarcane row or two sugarcane rows;

the at least one sugarcane root grinding cutter is mounted at a front end of the frame in a traveling direction;

two rear sides of the frame are each provided with a respective one of the two rollover safety devices, and a top of the frame is provided with the plurality of anti-rollover regulators;

the plurality of rollers for scraping the sugarcane leaves, peeling the sugarcane peels and conveying the sugarcane stalks by using the circular plates arranged at intervals, the plurality of rows of rollers arranged at intervals for scraping the sugarcane leaves, peeling the sugarcane peels and conveying the sugarcane stalks or two layers of the rollers arranged vertically, the at least one roller for scraping the sugarcane leaves, peeling the sugarcane peels and conveying the sugarcane stalks by using the continuous helical blades, and the plurality of rows of rollers for scraping the sugarcane leaves, peeling the sugarcane peels and conveying the sugarcane stalks by using the rubber bars arranged at intervals or two layers of rollers arranged vertically for scraping the sugarcane leaves, peeling the sugarcane peels and conveying the sugarcane stalks by using rubber bars arranged at intervals are mounted on the frame, and the sugarcane pressing cover plates are mounted on the plurality of rollers;

the whole-stalk sugarcane bundling and 180-degree left and right steering conveyor is mounted at a rear end of the frame in the traveling direction;

the sugarcane leaf and peel blocking barriers are mounted behind the plurality of rollers for scraping the sugarcane leaves, peeling the sugarcane peels and conveying the sugarcane stalks by using the circular plates arranged at intervals, the plurality of rows of rollers arranged at intervals for scraping the sugarcane leaves, peeling the sugarcane peels and conveying the sugarcane stalks or two layers of the rollers-arranged vertically, and the plurality of rows of rollers for scraping the sugarcane leaves, peeling the sugarcane peels and conveying the sugarcane stalks by using the rubber bars arranged at intervals or two layers of rollers arranged vertically, respectively;

the plurality of sugarcane stalk guide plates are mounted behind the sugarcane leaf and peel blocking barriers;

the whole base frame comprises a front frame and a rear frame, wherein the front frame and the rear frame are connected through a bearing sleeve joint;

the bearing sleeve joint comprises a transmission shaft, a sprocket wheel, a bearing and a bearing sleeve;

two ends of the bearing sleeve are each provided with an outer sleeve;

each outer sleeve is provided with a steel plate which is provided with a through hole, and the two steel plates are clamped at a front end of the rear frame and are fixedly connected by a bolt;

a square steel is mounted on an outer side surface of the bearing sleeve, and is provided with a through hole, and the square steel and the rear end of the front frame are abutted and are fixedly connected by a bolt; and two sides of a rear end of the rear frame are each provided with one driving wheel, and two sides of a front end of the rear frame are each provided with one driving and steering wheel.

2. The whole-stalk or sectioning type combined sugarcane harvester according to claim 1, wherein two sides of a front end of the front frame are provided with two liftable, walkable and steerable wheels;

the each of the two liftable, walkable and steerable wheels comprises an upper walking wheel carrier and a lower walking wheel carrier;

the each upper walking wheel carrier comprises a walking wheel lifting shaft sleeve, a walking wheel lifting oil cylinder and a walking wheel steering oil cylinder;

an upper part and a lower part of a rear surface of the each upper walking wheel carrier are each provided with one vertical walking wheel steering sleeve shaft joint;

respective sleeves at two ends of each vertical walking wheel steering sleeve shaft joint are welded to the corresponding upper walking wheel carrier, and square steel tubes bent at an angle of 90 degrees are each welded to middle portions of an upper one and a lower one of the vertical walking wheel steering sleeve shaft joints, and are fixed to two ends of the frame;

the lower walking wheel carriers on two sides are provided with a respective one of the two liftable, walkable and steerable wheels and a wheel lifting shaft;

two sides of a lifting wheel frame are each provided with a soft steel wire rope;

the other ends of the soft steel wire ropes are connected to lifting ends of a pair of lifting oil cylinders, and bottom ends of the pair of lifting oil cylinders are arranged on two sides of a console frame;

two sides of a front surface of the front frame are provided with vertical lifting oil cylinder bottom ends for supporting a sugarcane tail cutter;

one end of each lifting oil cylinder is fixed to a bottom of a scissor blade rack of the sugarcane tail cutter by a bolt;

a row of scissor blades is arranged at intervals at a front end of the scissor blade rack;

rear ends of the row of scissor blades are arranged at intervals on a surface of a linear guide rail;

clamping strips are arranged at intervals on an upper surface and a lower surface of the row of scissor blades;

rear ends of the clamping strips are fixed to lower surfaces of the scissor blades;

two ends of the linear guide rail are provided with sliding blocks;

one end of the linear guide rail is provided with a hydraulic motor to drive a transmission shaft;

the transmission shaft is provided with a sprocket wheel and an eccentric shaft wheel;

the eccentric shaft wheel is connected to a reciprocating swinging bar;

the swinging bar is connected to one end of the linear guide rail;

a surface of the scissor blade rack is provided with tail leaf supporting plates arranged at intervals;

two sides of each tail leaf supporting plate are provided with transmission shafts, one of which is driven by a hydraulic motor;

the transmission shafts on the two sides are provided with sprocket wheels arranged at intervals, and a left and right steering conveying chain is provided with a tail leaf pulling bar;

a tail leaf pulling blade rotator is arranged above a front of the row of scissor blades; the tail leaf pulling blade rotator is provided with a transmission shaft and a tail leaf pulling blade;

one end of the transmission shaft of the tail leaf pulling blade rotator is provided with a sprocket wheel, and a transmission chain is connected to the hydraulic motor to drive the sprocket wheel of the transmission shaft;

fallen tail leaf sliding plate grooves are arranged below the transmission shafts on the two sides of the scissor blade rack;

a plurality of sleeve shaft joints are arranged at upper ends of the fallen tail leaf sliding plate grooves on the two sides, and are fixed to the frame below the transmission shafts on the two sides;

back-fall tail leaf baffles are arranged at front ends of outlets of the fallen tail leaf sliding plate grooves on the two sides; and respective lifting ends of the pair of lifting oil cylinders are arranged on a bottom surface of each of the fallen tail leaf sliding plate grooves on the two sides.

3. The whole-stalk or sectioning type combined sugarcane harvester according to claim 1, wherein the at least one sugarcane root grinding cutter comprises two sugarcane root grinding cutters that are arranged on two sides of a front of the front frame;

each of the sugarcane root grinding cutters is a circular disc, an outer circumferential notch is formed on an outer circumference of the disc, and impurity removing seams arranged at intervals are formed along a circumferential surface of the outer circumferential notch of the disc;

a top surface of the outer circumferential notch of the disc is a conical surface, and a bottom surface thereof is a flat surface;

an area surface of the outer circumferential notch of the disc is coated with metal sand particles, the metal sand particles comprising alloy steel sand particles, emery particles, diamond sand particles or iron sand particles;

the alloy steel sand particles are all higher than upper and lower corner edge surfaces of sagittate triangles of the notch of the disc;

a transmission structure of the discs is that:

transmission shafts are arranged on upper surfaces of central holes of the discs, bearings and bearing seats are arranged at upper and lower ends of each transmission shaft, respectively, the upper and lower bearing seats are both fixed to the frame by bolts, the discs are fixed to lower end tips of the transmission shafts through circular clamping plates, and V-belt pulleys are arranged at upper end tips of the transmission shafts, respectively; each V-belt pulley drives, by chains at one ends of the transmission shafts of a roller for scraping sugarcane leaves and peeling sugarcane peels at a sugarcane inlet, the transverse transmission shafts arranged above the chains, and then the V-belt pulley arranged on the transverse transmission shafts alternatively drive the discs to rotate left and right by V-type belts;

or a transmission shaft, a bearing, a bearing seat, a bevel gear, a sprocket wheel, and a transverse raising plate for fixing the disc are arranged on a bottom surface of a central hole of the disc, a cover plate is arranged on a bottom surface of the transverse raising plate, and is fixed by a bolt, a transmission chain and a transmission shaft are arranged in the raising plate, bevel gears are arranged at two ends of the transmission shaft, two ends of the raising plate are fixed to the two sides of the frame by bolts; the disc is fixed to a surface of the raising plate at an upper end of the transmission shaft by the circular clamping plate, a vertical transmission shaft is arranged at one end of the raising plate, a bevel gear and a sprocket wheel are arranged at a lower end of the transmission shaft, a V-belt pulley is arranged at an upper end of the transmission shaft, and elastic rubber sheet baffle plates are arranged on two sides of a front end of the single disc;

or vertical and transverse raising plates for fixing the disc are arranged on a bottom surface of the disc, cover plates are arranged on bottom surfaces of the vertical and transverse raising plates, respectively, and are fixed by bolts, a rear end tip of the vertical raising plate is welded to a middle of the transverse raising plate, a transmission shaft is arranged in each raising plate, and bevel gears are arranged at two ends of the transmission shaft;

or a transmission shaft is arranged on an upper surface of a central hole of a single disc, and raising bars for fixing the transmission shaft are respectively arranged in a vertical direction of a rear surface of the disc at the lower end of the transmission shaft and in a horizontal direction below the rear surface of the disc;

transmission shafts are arranged in the center holes of the discs;

the upper ends of the transmission shafts are respectively provided with raising bars arranged at intervals for fixing the transmission shafts;

the upper ends of the transmission shafts are respectively provided with bevel gears;

each disc is provided with a transmission shaft;

one end of the transmission shaft of the disc is provided with a bevel gear, and two outer sides thereof are provided with sprocket wheels;

the two sides of the frame behind the sugarcane root grinding cutters are each provided with a single layer and a single row of continuously spaced rollers rotating clockwise for scraping sugarcane leaves, peeling sugarcane peels and conveying sugarcane stalks by using a plurality of circular plates arranged at intervals;

each of the plurality of continuously spaced rollers rotating clockwise is provided with a transmission shaft, two ends of the transmission shaft are mounted on the frame by respective bearing seats, and one end of the transmission shaft is provided with a sprocket wheel and a transmission chain;

two ends of a transmission shaft of a first roller at the sugarcane inlet are provided with sprocket wheels and transmission chains;

bearing sleeve joints are arranged at two ends of a transmission shaft of the third roller;

a plurality of circular plates is arranged at intervals on surfaces of the plurality of rollers for scraping sugarcane leaves, peeling sugarcane peels and conveying sugarcane stalks by using the circular plates arranged at intervals;

vertical steel plates facing transversely are welded at intervals on two sides of each of the circular plates arranged at intervals on each of the rollers; a torsional spring is arranged outside a clamping plate to increase elasticity of a rubber sheet for a long time by a torsion arm;

surfaces of the vertical steel plates facing transversely arranged at intervals on two sides of each of the circular plates arranged at intervals on the roller are provided with elastic rubber sheets (68), respectively;

surfaces of the rollers are provided with elastic rubber sheets arranged at intervals, respectively, and surfaces scraping sugarcane stalks are provided with raised end objects, respectively;

surfaces of two sides of each of the circular plates arranged at intervals on surfaces of the rollers are provided with elastic rubber sheets, respectively;

one ends of the rubber sheets are fixed to surfaces of two sides of the circular plates arranged at intervals by bolts, respectively;

vertical circular tubes are welded on surfaces of one ends of the circular plates for fixing the rubber sheets, respectively, so that outer ends of the rubber sheets are warped, and outer ends of two opposite rubber sheets cling together while inner ends thereof separate from each other;

bearing seats at the two ends of each of a plurality of roller transmission shafts which are arranged in a single row or a double row in a single layer at intervals and disposed behind the sugarcane root grinding cutters are fixed to downward bottom surfaces of two sides of the frame by bolts;

a plurality of circular saw blades capable of lifting vertically are arranged at intervals above a front of the first roller at the sugarcane inlet;

vertical linear guide rails are arranged on two sides in front of the first roller, and sliding blocks are arranged on the linear guide rails on the two sides;

the sliding blocks on the two sides are provided with transmission shafts of disc saw blades, and bearing seats are arranged at two ends of the transmission shaft;

the transmission shaft of the disc saw blade is lifted by a lifting oil cylinder; and the transmission shaft is driven by a hydraulic motor.

4. The whole-stalk or sectioning type combined sugarcane harvester according to claim 1, wherein the sugarcane leaf and peel blocking barriers are respectively arranged behind the plurality of rollers, the plurality of rows of rollers, and the plurality of rows of rollers;

the sugarcane leaf and peel blocking barriers are mounted on a square steel, a row of run-through circular holes is formed at intervals in an upper surface and a lower surface of the square steel;

each run-through circular hole formed in the upper surface and the lower surface is provided with an upper end head of a steel wire rope;

a row of run-through holes butted to the upper and lower surfaces is formed at intervals in a side surface of the square steel;

each butted run-through hole is fixed to one end of a steel wire rope by a bolt;

two ends of the square steel are fixed to two sides of the frame by bolts;

a respective one of the plurality of sugarcane stalk guide plates is arranged behind each of the sugarcane leaf and peel blocking barriers;

each of the plurality of sugarcane stalk guide plates has a triangular shape with a narrow front and a wide back;

the plurality of triangular sugarcane stalk guide plates is welded at intervals on a bottom surface of a rectangular steel plate;

a narrow surface of each triangular sugarcane stalk guide plate is arranged in front of the harvester;

a sugarcane leaf stop plate is arranged below each of the plurality of sugarcane stalk guide plates to prevent sugarcane leaves rotating by the plurality of rollers, the plurality of rows of rollers, or the plurality of rows of rollers from being conveyed backwards; and two ends of the rectangular steel plate of the sugarcane stalk guide plates are fixed to two sides of the frame by bolts.

5. The whole-stalk or sectioning type combined sugarcane harvester according to claim 3, wherein a top surface of a respective one of the circular plates on each roller is provided with a sugarcane pressing cover plate;

the sugarcane pressing cover plate is rectangular and semi-circular, and front and rear edges thereof are warped;

two ends of the sugarcane pressing cover plate are fixed to two sides of the frame by bolts;

two ends of each roller are provided with respective bearing sleeve joints, and sleeve shaft joints are arranged at the two ends behind the sugarcane pressing cover plate on the surface of the circular plate of the roller;

two front ends of the sugarcane pressing cover plate are provided with tension spring bars and tension springs, and the two sides of the frame are provided with cover supporting bars for supporting and preventing the sugarcane pressing cover plate from covering downward, and top cover bars for supporting and upwards opening the sugarcane pressing cover plate.

6. The whole-stalk or sectioning type combined sugarcane harvester according to claim 1, wherein lifting racks for the two left and right rollover safety devices are arranged below two sides of the harvester;

sleeve shaft joints are arranged at inner ends of the lifting racks on the two sides;

angle steels are arranged at outer ends of the lifting racks on the two sides;

steel wire ropes are arranged at two opposite corners in the lifting racks on the two sides;

each steel wire rope is provided with a movable joint at one end of the frame;

one end of each angle steel is provided with a bolt to adjust the tightness;

lifting oil cylinders are arranged such that one end of each lifting oil cylinder is arranged on the upper surface of a respective one of the lifting racks on the two sides, and a bottom end of each lifting oil cylinder is arranged on the frame above the two sides of the harvester;

vertically-supported lifting oil cylinders for the plurality of anti-rollover regulators are arranged above the two sides of the harvester;

respective one ends of the lifting oil cylinders on the two sides are arranged on a regulator moving rack;

the moving rack is provided with a toothed bar;

two sides of the toothed bar are provided with linear guide rails;

sliding blocks are arranged at intervals on the linear guide rails on the two sides;

a plurality of iron plates is fixed onto surfaces of the sliding blocks by bolts;

a square notch is arranged in a middle of each of the plurality of iron plates, and a hydraulic motor is arranged in the square notch;

gear teeth of the transmission shaft of the hydraulic motor roll on a surface of the toothed bar to drive the plurality of iron plates to move, and the hydraulic motor is fixed to the first iron plate on a surface of the sliding block by a bolt;

the moving rack is arranged into three sections, namely, a middle section and one section on each of the two sides;

hinge joints are arranged on the toothed bar at the middle section and at bottom surfaces of two ends of the linear guide rails to connect portions of the toothed bar on the two sides and the linear guide rails;

a lifting end of each lifting oil cylinder is arranged on the bottom surface of the toothed bar on the two sides, and the bottom end of each lifting oil cylinder is arranged below the middle section; and respective ends of the linear guide rails on the two sides are provided with compression springs.

7. The whole-stalk or sectioning type combined sugarcane harvester according to claim 1, wherein a portion of the frame under a tail part of the harvester is fixed by a bolt to a connector of the whole-stalk sugarcane bundling and 180-degree left and right steering conveyor;

the connector is provided with a rectangular lower supporting plate;

a triangular steel plate is provided on a surface of the lower supporting plate, and a pair of connector circular shafts are provided on both sides of the back of the triangular steel plate;

a rectangular cover plate is arranged on a surface of the triangular steel plate; and a center of the front of the lower supporting plate, the triangular steel plate, and the rectangular cover plate is provided with a steering circular axis hole that is bolted with a round pin bolt, and an electromagnet is provided on the lower supporting plate behind the steering circular axis hole.

8. The whole-stalk or sectioning type combined sugarcane harvester according to claim 1, wherein the whole-stalk sugarcane bundling and 180-degree left and right steering conveyor is provided with a bottom frame having bottom wheels walking across a single sugarcane row;

circular holes are formed in the middle of front ends on both sides of the bottom frame, and a gap on the bottom surface of each of the circular holes is sealed by a steel plate and bolts;

each of the circular holes is connected to a respective connector circular shaft provided at a connector of the whole-stalk sugarcane conveyor;

walking wheels are provided on both sides of a rear part of the middle of the bottom frame;

movable racks which are extendable backwards are provided on both sides of the rear end of the bottom frame, and the movable racks are fixed to respective linear guide rails by bolts;

sugarcane baffles are provided above both sides of each movable rack;

a touch electric switch is provided on one side of the front of the bottom frame;

an electric remote-control lock is provided on the other side of the bottom frame;

a steering disc of the bottom frame is provided with sleeve shaft joints on the left and right sides of a part at 400 mm in front of the center of the steering disc;

the sleeve shaft joints are respectively connected to respective round steel bars, and the other ends of the round steel bars are respectively connected to first ends of soft steel wire ropes;

the other ends of the soft steel wire ropes are respectively arranged on lifting ends of lifting oil cylinders, and bottom ends of the oil cylinders are respectively arranged on both sides of the frame above the tail part of the harvester;

a 360-degree left and right rotating disc is provided at the rear part of the middle of the bottom frame, and an outer circumference of the rotating disc is fixed on the bottom frame;

an upper end of an inner disc of the rotating disc is provided with a steering disc rack;

an outer circumference of the steering disc in a bottom surface of the steering disc rack is provided with steering teeth;

the steering teeth are engaged with gear teeth of a transmission shaft of a hydraulic motor to drive the steering disc to rotate;

the hydraulic motor is provided on the bottom frame;

a center of the steering disc is provided with a 360-degree left and right rotating hydraulic-electric transmission connector;

steel plates are arranged at intervals on a surface of the steering disc rack;

two vertical support bars are arranged in the middle of one outer side of the steering disc rack;

sleeve shaft joints are provided at the upper and lower ends of the support bars;

the sleeve shaft joint at the upper end of each support bar is arranged on an upper end of a balance bar;

several iron plates are provided at a lower end of the balance bar;

the upper and lower ends of each support bar are provided with lifting oil cylinders;

one end of each lifting oil cylinder is respectively arranged on the lower end of the support bar and the upper end of the balance bar;

the bottom end of each oil cylinder is arranged outside the upper and lower ends of the support bar;

a transmission shaft is arranged on said one outer side of the steering disc rack;

bearings, bearing seats, 14-tooth sprocket wheels, and conveying chains are arranged at intervals on the transmission shaft;

each conveying chain is provided with sugarcane pulling bars at intervals; and the transmission shaft is driven by a hydraulic motor.

9. The whole-stalk or sectioning type combined sugarcane harvester according to claim 8, wherein the other outer side of the steering disc rack is provided with upper and lower movable walls of the whole-stalk sugarcane bundling and 180-degree left and right steering conveyor;

surfaces of the upper and lower movable walls are provided with steel meshes or steel plates at intervals;

the upper and lower movable walls are provided with a plurality of upper and lower movable wall support square steel tubes arranged at intervals;

an upper end of the upper movable wall support square steel tube and upper and lower ends of the lower movable wall support square steel tube are each provided with a transmission shaft;

the transmission shaft at the upper end of the upper movable wall is provided with 14-tooth sprocket wheels and conveying chains at intervals;

sugarcane supporting hooks are arranged at intervals on each conveying chain;

the transmission shaft at the upper end of the lower movable wall is provided with 14-tooth sprocket wheels at intervals and sprocket wheels larger than the 14-tooth sprocket wheels at intervals;

the transmission shaft at the lower end of the lower movable wall is provided with 14-tooth sprocket wheels and conveying chains at intervals;

sugarcane supporting hooks are arranged at intervals on each conveying chain;

the transmission shaft at the lower end of the lower movable wall is provided with a plurality of bearing sleeve joints at intervals;

each of the bearing sleeve joints is provided with a transmission shaft, a bearing, and a bearing sleeve;

two ends of the bearing sleeve are provided with outer sleeves; outer surfaces of the outer sleeves at two ends of the bearing sleeve are respectively connected to two steel plates, the steel plates are drilled on surfaces thereof and are fixed by bolts to the upper end of the lower movable wall support square steel tube and an end of a lower inner disc rack square steel tube, respectively;

a middle surface of the bearing sleeve is welded with a square steel, the square steel is drilled and is fixed by bolts to the lower end of the upper movable wall support square steel tube and to a lower square steel tube of the lower movable wall support square steel tube, respectively;

additional bearing sleeves are respectively arranged at the upper end of the upper movable wall support square steel tube;

the 14-tooth sprocket wheels of the transmission shaft at said one outer side of the steering disc rack and the 14-tooth sprocket wheel of the transmission shaft at the lower end of the lower movable wall are connected by a conveying chain;

the 14-tooth sprocket wheels of the transmission shafts at the upper and lower ends of the lower movable wall are connected by a conveying chain;

the 14-tooth sprocket wheels of the transmission shaft at the upper end of the upper movable wall and the sprocket wheels larger than the 14-tooth sprocket wheels of the transmission shaft at the upper end of the lower movable wall are connected by a conveying chain;

the conveying chains of the upper and lower movable walls and a drum in the conveying chain of the steering disc rack are all higher than bottom surfaces of chain pieces on both sides;

the conveying chains, the sugarcane supporting hooks, and the sugarcane pulling bars are respectively provided with a bottom supporting sliding plate;

the lower end of the upper movable wall and the lower end of the lower movable wall are respectively provided at both sides with lifting ends of lifting oil cylinders at intervals; and the bottom ends of the lifting oil cylinders are arranged outside the upper end of the lower movable wall and the bottom of the lower movable wall.

10. The whole-stalk or sectioning type combined sugarcane harvester according to claim 9, wherein vertical inner and outer frames of a whole-stalk sugarcane bundling machine, including an outer frame, are provided on a surface of the steering disc rack, and the inner and outer frames on one side are connected to the steering disc rack on a lower side;

the inner and outer frames on one side of the upper and lower movable walls are elevated until the lower end of a bottom supporting plate bracket of the bundling machine is overhead;

two opposite inclined sugarcane supporting sliding plates are arranged on both inner sides of an upper part of the outer frame;

sleeve shaft joints are respectively arranged at both ends of the outer frame inside the sugarcane supporting sliding plates;

steel plates for adjusting the inclination of the sugarcane supporting sliding plates are respectively arranged at both ends of the outer frame outside the sugarcane supporting sliding plates;

a steel plate seam is provided in the middle of the steel plate which is fixed to the outer frame by bolts through the steel plate seam;

four high-temperature-resistant and non-toxic plastic sheet reels are provided respectively at intervals on two outer sides of the sugarcane supporting sliding plates;

sugarcane supporting plates are arranged on both sides of the bottom surface of the sugarcane supporting sliding plates;

linear guide rails are arranged at intervals on the sugarcane supporting plates on both sides;

the linear guide rails are provided with sliding blocks at intervals, and the bottom surfaces of the sliding blocks are respectively fixed on a surface of a rectangular steel plate;

an outer end of the steel plate is respectively provided with sleeve shaft joints which are fixed on the outer frame;

a bottom surface of an inner end of the steel plate is respectively provided with top supporting bars;

a groove is formed in an inner end of one of the sugarcane supporting plates on one side;

a protruding serrated blade is provided at the middle of an inner end of the other one of the sugarcane supporting plates on the other side;

hanging and supporting bars are provided at both inner ends of the sugarcane supporting plates on both sides;

a weighing sensor is arranged on the middle of a bottom surface of one of the sugarcane supporting plates;

two proximity sensors are respectively arranged at intervals on bottom surfaces of one ends of the sugarcane supporting plates on both sides;

lifting oil cylinders are provided on bottom surfaces of both ends of the sugarcane supporting plates on both sides;

one end of each lifting oil cylinder is arranged on an inner side of a respective sugarcane supporting plate, and the bottom end of each oil cylinder is arranged on the outer frame;

compression plastic frames are arranged on both sides of the bottom surface of the sugarcane supporting plates;

two proximity sensors are respectively arranged at intervals on the bottom surface of one ends of the compression plastic frames on both sides;

linear guide rails are provided at intervals on the compression plastic frames on both sides;

inner ends of the linear guide rails on both sides are respectively provided with compression plastic sheet assemblies;

each compression plastic sheet assembly is provided with a hollow pressing plate, an electric heating tube, a temperature sensor, a compression spring, and bolts;

grooves are formed in a surface of the hollow pressing plate of the compression plastic sheet assemblies on both sides;

a serrated blade is provided in the middle of the groove in the surface of the hollow pressing plate of one of the assemblies on one side;

the linear guide rails on both sides are provided with sliding blocks at intervals, and bottom surfaces of the sliding blocks are fixed on the outer frame;

lifting oil cylinders are arranged in the middle of bottom surfaces of the compression plastic frames on both sides;

one end of each lifting oil cylinder is provided on an inner side of the respective compression plastic frame, and the bottom end of the oil cylinder is provided on the outer frame;

sugarcane pressing frames are arranged on both sides of the bottom of the compression plastic frames;

two proximity sensors are respectively arranged on bottom surfaces of one ends of the sugarcane pressing frames on both sides;

the sugarcane pressing frames on both sides are provided with linear guide rails at intervals;

a Y-shaped fork is arranged at an inner end of each linear guide rail;

lifting oil cylinders are arranged in the middle of bottom surfaces of the sugarcane pressing frame frames on both sides;

one end of each lifting oil cylinder is provided on an inner side of the sugarcane pressing frame, and the bottom end of the oil cylinder is provided on the outer frame;

bottom supporting plates are provided on both sides of the bottom of the sugarcane pressing frame;

two proximity sensors are respectively arranged on bottom surfaces of one ends of the bottom supporting plates on both sides;

the bottom supporting plates on both sides are provided with linear guide rails at intervals;

lifting oil cylinders are arranged in the middle of bottom surfaces of the bottom supporting plates on both sides;

one end of each lifting oil cylinder is provided on an inner side of the bottom supporting plate, and the bottom end of the oil cylinder is provided on the outer frame;

sugarcane stalks slide from the two opposite inclined sugarcane supporting sliding plates arranged above the whole-stalk sugarcane bundling machine to the lower sugarcane supporting plates on both sides; the weighing sensor arranged on said one of the sugarcane supporting plates weighs the sugarcane stalks until a specified weight is reached;

the sugarcane supporting plates on both sides are opened so that the sugarcane stalks fall to the bottom supporting plates while the sugarcane supporting plates are closed;

plastic sheets in the plastic sheet reels on both sides of the sugarcane supporting sliding plates have been connected to the sugarcane supporting plates in advance and are pressed by the falling sugarcane stalks onto a surface and both sides of the bottom supporting plates;

the Y-shaped fork of the sugarcane pressing frames on both sides is closed to press the sugarcane stalks into a circle bundle;

the compression plastic sheet assemblies-provided on the compression plastic frames on both sides are closed, so that the plastic sheets on both sides are held together and adhered to form an adhered part with a height of 20 mm, and the serrated blade in the groove divides the adhered part in the middle, then the compression plastic frames are opened while the sugarcane pressing frames are opened, and the bottom supporting plates are opened and then closed;

such bundled sugarcane stalks fall to the surface of the steering disc rack and are transported to the lower end of the upper and lower movable walls by the conveying chains on the surface of the steering disc rack; and the bundled sugarcane stalks are then transported by conveying chains of the upper and lower movable walls to a carriage of a sugarcane transporting truck parallel to a side of the harvester.

11. The whole-stalk or sectioning type combined sugarcane harvester according to claim 1, wherein the harvester further comprises an automatic control unit, the automatic control unit being a closed-loop control system comprising a power supply part, a control part, a signal acquisition part, a signal processing part and a drive part, and wherein a programmable logic controller (PLC) with control buttons and a touch screen is used to perform electric oil automation control on functions of each of the power supply part, the control part, the signal acquisition part, the signal processing part and the drive part, wherein the power supply part is composed of an on-board battery, an inverter, a switch and a transformer; the control part comprises an on-board control device controlled through control buttons and touch screen operation; the signal acquisition part performs collection by different types of photoelectric sensors, proximity sensors, position-limiting sensors, temperature sensors, weighing sensors and AC conversion; the signal processing part processes signals collected by respective sensors by the PLC using centralized processing; and the drive part controls the PLC and drives relay solenoid valves and oil cylinder solenoid valves.

12. The whole-stalk or sectioning type combined sugarcane harvester according to claim 1, wherein bottom ends of a plurality of vertical support bars are arranged on both sides of the frame in front of at least one of the sugarcane root grinding cutters; planar bars are arranged on both sides in front of respective upper ends of the vertical support bars;

a plurality of sugarcane supporting bars are mounted to the planar bars on both sides at intervals that are wide in a front and narrow in a rear;

a torsional spring is provided at a respective inner end of each sugarcane supporting bar;

an outer end of each sugarcane supporting bar is provided with a sleeve shaft joint;

the each sugarcane supporting bar is reset by a torsion arm of the torsional spring;

a sugarcane pulling bar is arranged at an upper end of a transmission shaft at a center hole of a disc of each sugarcane root grinding cutter;

a bottom of each disc is provided with bevel gears, and raising plates are fixed on left and right sides of the bottom of each disc;

a sugarcane stalk conveyor for hooking upward is arranged behind the sugarcane root grinding cutters;

a front transmission shaft is arranged in front of the sugarcane root grinding cutters;

bearings, bearing seats, sprocket wheels, and conveying chains are arranged at both ends of the front transmission shaft;

upper and lower surfaces on both sides of each conveying chain are provided with double-sided bending plates at intervals;

square steel tubes are arranged at intervals on surfaces of the conveying chains on both sides;

two ends of the each square steel tube are bolted to the double-sided bending plates on the surface of a respective conveying chain;

a surface of one square steel tube of every several square steel tubes is provided with several sets of spaced steel nails;

each steel nail is fixed on the surface of the corresponding square steel tube by welding;

in a space between the square steel tubes, sugarcane supporting plates are provided on bottom surfaces of the conveying chains on both sides from above to below the square steel tubes and are fixed on surfaces of the double-sided bending plates with bolts;

a rear transmission shaft is arranged at the back;

both ends of the rear transmission shaft are provided with bearing sleeve joints;

bearing seats arranged on both sides of the front transmission shaft are fixed on both sides of the frame;

the two sides of the frame behind the sugarcane stalk conveyor for hooking upward are each provided with a single layer and a single row of continuously spaced rollers in rows at intervals rotating clockwise for scraping sugarcane leaves, peeling sugarcane peels and conveying sugarcane stalks;

the first roller at the sugarcane inlet rotates counterclockwise;

sprocket wheels and transmission chains are provided at both ends of a transmission shaft of a second roller at the sugarcane inlet;

two ends of each of the rollers arranged in rows at intervals for scraping sugarcane leaves, peeling sugarcane peels and conveying sugarcane stalks are provided with end circular blocking plates;

vertical steel plates facing transversely and spaced apart are arranged at intervals on a surface of each roller;

the bottom ends of the vertical steel plates facing transversely and spaced apart and arranged on the surface of each roller at intervals are fixed on the surface of the respective roller by welding;

elastic rubber sheets are respectively provided on a surface and two sides of the vertical steel plates facing transversely and arranged on each roller at intervals, or one ends of elastic rubber sheets are respectively provided at two sides of a surface of vertical steel plates arranged longitudinally on each roller at intervals;

the middle of each rubber sheet is fixed on the surface of the vertical steel plates facing transversely and arranged on each roller at intervals through clamping plates and bolts;

vertical steel plates that are longitudinally spaced apart are further arranged at intervals on a surface of each roller;

vertical circular tubes are respectively welded on two sides of the surface of vertical steel plates arranged longitudinally on each roller at intervals, so that outer ends of the fixed rubber sheets are warped, and outer ends of two opposite rubber sheets cling together while inner ends thereof separate from each other;

the bottom ends of the vertical steel plates arranged longitudinally are fixed on the surface of each roller by welding;

an upper end of the vertical steel plate arranged at intervals on the surface of a first roller at the sugarcane inlet is provided with a circular plate ring;

the circular plate ring is fixed on the upper end of the vertical steel plate by bolts;

a sprocket wheel shaft and a sprocket wheel that are driven by a sprocket wheel rotating clockwise of the second roller at the sugarcane inlet to rotate the first roller at the sugarcane inlet counterclockwise are provided on a front side of the first roller at the sugarcane inlet;

bottom supporting plates are provided on a bottom surface of the roller first roller that rotates counterclockwise at the sugarcane inlet;

sugarcane blocking plates extendable backwards are further arranged at rear ends of both sides of the sugarcane supporting sliding plates on the two opposite inclined surfaces of the whole-stalk sugarcane bundling and 180-degree left and right steering conveyor; linear guide rails of the sugarcane blocking plates extendable backwards are fixed on the frame by bolts;

a rectangular bottom frame is further arranged on two outer sides of bottom surfaces of the bottom supporting plates on both sides of the whole-stalk sugarcane bundling and 180-degree left and right steering conveyor;

walking wheels are arranged on both sides of a rear end of the bottom frame;

soft steel wire ropes are respectively arranged at first ends thereof on both sides of a rear end of a top surface of the whole-stalk sugarcane bundling and 180-degree left and right steering conveyor;

the other ends of the soft steel wire ropes are connected to lifting ends of lifting oil cylinders, and bottom ends of the oil cylinders are respectively arranged on both sides of the frame above the tail part of the harvester;

the two sides of the frame behind the sugarcane root grinding cutters are each provided with a double layer, a single row and upper and lower layers of continuously spaced rollers in rows at interval in each layer for scraping sugarcane leaves, peeling sugarcane peels and conveying sugarcane stalks, and two ends of the transmission shaft of each roller are respectively provided with bearings and bearing seats;

top ends of the rubber sheets for scraping sugarcane leaves and peeling sugarcane peels arranged in rows at intervals on surfaces of the continuously spaced upper and lower rollers are closely inserted into a surface of an opposite roller at intervals;

gears are respectively provided at one ends of the two layers of rollers, and the gears of the lower layer of rollers-rotate clockwise to drive the gears of the upper layer of rollers to rotate counterclockwise;

in the two layers of rollers, one ends of the lower layer of rollers are respectively provided with sprocket wheels and transmission chains;

in the two layers of rollers, both ends of a transmission shaft of the third roller in the lower layer of rollers are provided with bearing sleeve joints;

upper and lower sides of the front of rollers at the sugarcane inlet in the upper and lower layers of rollers are respectively provided with a horizontal bar parallel to the roller; and semicircle curved vertical bars away from ends of the vertical steel plates facing transversely arranged at intervals on surfaces of the rollers are provided below a surface of the upper horizontal bar and above a surface of the lower horizontal bar respectively.

13. The whole-stalk or sectioning type combined sugarcane harvester according to claim 1, wherein a sugarcane sectioning blade device is provided at the sugarcane outlet at the tail part of the harvester, and the blade device comprises an outer blade holder and an inner blade holder;

two fixed blades are arranged respectively at intervals up and down of blade holder bottom ends on both sides of the rear of the outer blade holder, and edges of the two blades are opposite to each other;

upper and lower sugarcane supporting plates are arranged behind the edges of the upper and lower blades;

compression springs are respectively arranged at intervals on a surface of the upper sugarcane supporting plate and both sides of a bottom surface of the lower sugarcane supporting plate;

a top end of the outer blade holder is provided with a bottom end of a lifting oil cylinder; one end of the lifting oil cylinder is arranged at a top end of the inner blade holder;

proximity sensors are respectively arranged at the middle and lower end of one side of the outer blade holder;

sliding blocks are respectively provided at the middle and lower ends of two sides of the outer blade holder;

linear guide rails for the inner blade holder are provided on both sides of the inner blade holder, and the linear guide rails on both sides of the inner blade holder are inserted into the sliding blocks on both sides of the outer blade holder;

a sugarcane sectioning blade with two blade edges is arranged at the lower end of the linear guide rails on both sides of the inner blade holder;

two ends of the sugarcane sectioning blade are fixed on the linear guide rails on both sides by bolts;

bearing shafts, bearings, bearing moving grooves and a torsional spring are provided on both sides of the bottom end of the outer blade holder;

the bearing moving grooves on both sides are fixed on both sides of the frame at the sugarcane outlet of the tail part of the harvester by bolts;

the inner blade holder of the sectioning blade device is optionally provided as double inner blade holders;

both the double inner blade holders are provided with a sugarcane sectioning blade with two blade edges;

both top ends of the double inner blade holders are provided with lifting ends of lifting oil cylinders; the lifting oil cylinder provided in the inner blade holder of the sectioning blade device is controlled by an automatic control unit to go up and down once to cut sugarcane stalks into sections;

vertical baffle plates are further arranged at a rear end edge and a right edge on a surface of a disc rack of a sugarcane sections and transverse sugarcane stalks 180-degree left and right steering conveyor and at two side edges of the upper and lower movable walls;

the upper and lower movable walls and surfaces of the disc rack on both sides are provided with conveying chains at intervals;

lifting ends of the lifting oil cylinders are respectively provided on two sides in front of walking wheels of the bottom frame;

bottom ends of the oil cylinders are respectively arranged under the tail part of the harvester; and bolts are further used to fix both sides of the front end of the bottom frame of the sugarcane sections and transverse sugarcane stalks 180-degree left and right steering conveyor.

14. The whole-stalk or sectioning type combined sugarcane harvester according to claim 1, wherein a disc rack of a sugarcane sections and transverse sugarcane stalks 180-degree left and right steering conveyor is provided at a tail part of the harvester, and sleeve shaft joints are arranged at rear ends of both sides of the disc rack;

a sugarcane supporting sliding plate is provided behind a front disc mounted on the disc rack and extends to the sugarcane outlet at the tail part of the harvester;

a sugarcane supporting sliding plate groove is provided from the sugarcane outlet to two sides of a surface of the sugarcane supporting sliding plate;

two rows of vertical sugarcane stalk conveying ledges are arranged at intervals above and behind the front disc;

a space between the two rows of ledges is configured as a channel for conveying sugarcane stalks with a wide front inlet and a narrow rear;

surfaces of the two rows of ledges are provided with steel meshes or steel plates at intervals;

front ends of the two rows of ledges are provided with sprocket wheel shafts and sprocket wheels;

bearings are arranged in the sprocket wheels;

vertical transmission shafts are arranged on two sides of middle sections of the two rows of ledges;

bearings, bearing seats, sprocket wheels, and conveying chains are arranged at intervals above and below the transmission shafts;

sugarcane pulling bars are arranged on each conveying chain;

pressing sprocket wheels are arranged inside a middle section of each conveying chain;

lower ends of the transmission shafts on two sides of the middle sections of the two rows of ledges are provided with sprocket wheel shafts, sprocket wheels, and transmission chains for driving, by one transmission shaft, the other transmission shaft to rotate in an opposite direction;

sprocket wheels are respectively arranged at lower ends of vertical transmission shafts on both sides of the middle section;

a ball cage is arranged in each sprocket wheel for connecting independent sugarcane conveying chain discs on two sides above the front disc;

a front end of each chain disc is provided with a sprocket wheel, an inner side of the middle of each chain disc is provided with a pressing sprocket wheel and a conveying chain, and each conveying chain is provided with sugarcane pulling bars;

sliding plate grooves for fixing the respective chain discs are arranged on both sides of the front of the disc rack;

a middle section of the sugarcane stalk conveying channel of the two rows of ledges is provided with space where sugarcane stalks are conveyed without any conveying chain;

a sugarcane stalk moves only when being pressed by sugarcane stalks moved by a front conveying chain;

a front vertical transmission shaft and a rear vertical sprocket wheel shaft are arranged at intervals behind the two rows of ledges;

the front vertical transmission shaft is provided with bearings, bearing seats, sprocket wheels, transmission chains, and conveying chains at intervals above and below a middle section thereof, the conveying chains are provided with sugarcane pulling bars at intervals, and the bearing seats are fixed on the frame;

the rear sprocket wheel shaft is provided with sprocket wheels at intervals up and down, and the sprocket wheels are provided with bearings;

the rear sprocket wheel shaft is fixed on the frame with bolts;

the front vertical transmission shaft drives a transmission shaft in the middle section through the transmission chain and drives sprocket wheels spaced apart on the rear sprocket wheel shaft through a conveying chain, so as to make the transmission shaft in the middle section and the front vertical transmission shaft and the rear sprocket wheel shaft rotate synchronously;

once the sugarcane pulling bars provided at intervals on each conveying chain, which conveying chain is used by the front vertical transmission shaft to drive the rear sprocket wheel shaft, rotate for one turn on one of the rollers for scraping the sugarcane leaves, peeling the sugarcane peels and conveying the sugarcane stalks by using continuous helical blades, the sugarcane pulling bars provided at intervals on the conveying chains move an interval of sugarcane pulling bar into an inlet of the helical blades of said one roller.

15. The whole-stalk or sectioning type combined sugarcane harvester according to claim 14, wherein the at least one roller comprises a plurality of rollers overlapping at intervals and synchronously rotating for scraping the sugarcane leaves, peeling the sugarcane peels and conveying the sugarcane stalks by using the continuous helical blades are provided behind the rear sprocket wheel shaft;

two ends of respective transmission shafts of the plurality of rollers for scraping the sugarcane leaves, peeling the sugarcane peels and conveying the sugarcane stalks by using the continuous helical blades are each provided with bearings and bearing seats, and bevel gears are arranged at rear ends of the transmission shafts;

bevel gears are arranged at front ends of the transmission shafts of upper and lower ones of the plurality of rollers;

the bevel gears arranged at front ends of the transmission shafts of the upper and lower ones of the plurality of rollers are respectively connected to bevel gears and sprocket wheels provided in respective upper and lower front transmission shafts;

vertical steel plates facing transversely are respectively welded at intervals on surfaces of the continuous helical blades on two opposite sides of each of the plurality of rollers.

16. The whole-stalk or sectioning type combined sugarcane harvester according to claim 15, wherein surfaces of the vertical steel plates facing transversely arranged at intervals on the continuous helical blades of two opposite surfaces of the rollers are respectively provided with elastic rubber sheets;

elastic rubber sheets are further arranged respectively at intervals on surfaces of the continuous helical blades of two opposite surfaces of the rollers;

respective first ends of the elastic rubber sheets are fixed on surfaces of two opposite continuous helical blades by bolts;

vertical circular tubes are respectively welded to respective surfaces of the continuous helical blades on which one end of the rubber sheet is fixed;

a serrated edge is provided at a front end of the sugarcane stalk inlet of the continuous helical blades of the roller;

sugarcane pressing cover plates are respectively provided on one side surface of the rollers for scraping the sugarcane leaves, peeling the sugarcane peels and conveying the sugarcane stalks by using the continuous helical blades;

two ends and two sides of each sugarcane pressing cover plate are fixed on the frame by bolts;

a vertical transmission shaft is arranged behind the plurality of rollers with continuous helical blades;

a bevel gear, a bearing, and a bearing seat are arranged at intervals at upper and lower ends of the transmission shaft;

sprocket wheels and transmission chains are provided at the upper and lower ends of the vertical transmission shaft, and the transmission chain of the sprocket wheel at the lower end is driven by a hydraulic motor;

sugarcane sliding bars are respectively arranged on both sides of rear upper ends of the plurality of rollers;

upper ends of the sugarcane sliding bars are respectively provided with sleeve shaft joints; linear guide rails are provided on the frame behind the plurality of rollers, upper ends of the linear guide rails are respectively provided with lifting ends of lifting oil cylinders, and lower ends of the oil cylinders are provided on the frame;

the plurality of rollers comprises seven rollers that overlap and rotate counterclockwise synchronously, or bevel gears on the transmission shafts are mounted in an opposite direction such that a rotation direction of the continuous helical blades of the rollers is changed to realize clockwise rotation of the seven rollers;

the harvester further comprises upper and lower movable walls of a conveyor, wherein one end of a square steel is welded on a surface in the middle of a bearing sleeve of each of the upper and lower movable walls, a rectangular hole is formed at another end of each square steel in which a compression spring is inserted, and each square steel is fixed by bolts to a lower end of a supporting square steel tube of the upper movable wall and into a square steel tube at a lower end of a supporting square steel tube of the lower movable wall;

rolling wheels for supporting chain ears or supporting drums are respectively arranged behind respective 14-tooth sprocket wheels at upper ends of the supporting square steel tubes of the lower movable wall, each rolling wheel is provided with two bearings, and a seam for passing a sugarcane supporting hook of a conveying chain is provided in the middle of each rolling wheel;

sprocket wheels for positioning conveying chains are respectively arranged above double-sided bending plates or drums and rolling wheels for supporting the conveying chains on top surfaces of bearings on both sides; and 14-tooth sprocket wheels of transmission shafts at upper and lower ends of the lower movable wall and 14-tooth sprocket wheels of a transmission shaft at an upper end of the upper movable wall are connected and driven by a conveying chain.

17. The whole-stalk or sectioning type combined sugarcane harvester according to claim 1, wherein the whole-stalk type combined sugarcane harvester for harvesting in two rows simultaneously is provided with the base frame connected to bottom wheels for operating across two sugarcane rows, and a sugarcane tail cutter having a width for cutting across two sugarcane rows;

the two sides of the frame behind a plurality of sugarcane root grinding cutters are each provided with two rows and a single layer of continuously spaced rollers rotating clockwise for scraping sugarcane leaves, peeling sugarcane peels and conveying sugarcane stalks by using a plurality of rows of rubber bars arranged at intervals;

one end of a transmission shaft of each of the continuously spaced rollers is provided with a sprocket wheel and a transmission chain, and a bearing and a bearing seat are provided on the transmission shaft at two ends thereof;

two ends of the transmission shaft of a third roller in the continuously spaced rollers are respectively provided with bearing sleeve joints;

two ends of each of the continuously spaced rollers are provided with end circular blocking plates;

vertical steel plates facing transversely are arranged at intervals on surfaces of the continuously spaced rollers;

surfaces of the vertical steel plates facing transversely and arranged at intervals on the surfaces of the continuously spaced rollers are respectively drilled at intervals;

bottom ends of a plurality of vertical elastic rubber bars are respectively fixed at intervals on surfaces of the vertical steel plates facing transversely by drilling and by bolts;

surfaces of the continuously spaced rollers are provided with the vertical elastic rubber bars arranged at intervals, respectively, and surfaces scraping two sides of sugarcane stalks are provided with raised end objects, respectively;

the two sides of the frame behind two rows of left and right sugarcane root grinding cutters are each provided with two rows and upper and lower layers of continuously spaced rollers, each layer having several rollers, for scraping sugarcane leaves, peeling sugarcane peels and conveying sugarcane stalks by using a plurality of rows of rubber bars arranged at intervals;

top ends of the plurality of rows of rubber bars arranged at intervals of the two rows and upper and lower layers of continuously spaced rollers are closely inserted at intervals into upper ends of the vertical steel plates facing transversely on a surface of an opposite roller;

a scattered whole-stalk sugarcane 180-degree left and right steering conveyor comprises a steering disc rack having bottom wheels for walking across two sugarcane rows, a surface of the steering disc rack is provided with two opposite inclined sugarcane supporting sliding plates having a width adapted to sugarcane stalks discharged from two rows of sugarcane outlets at the tail part of the harvester;

the whole-stalk type combined sugarcane harvester for harvesting in two rows simultaneously provided with the base frame connected to bottom wheels for operating across two sugarcane rows is further provided with a base frame configured for harvesting in four rows simultaneously;

two sides of a front end of the front frame are provided with liftable, walkable and steerable wheels and liftable and walkable wheels, such that the liftable and walkable wheels are arranged at an interval of two sugarcane rows on one side and the liftable, walkable and steerable wheels are arranged at an interval of one sugarcane row on the other side;

the two sides of the frame behind four rows of the sugarcane root grinding cutters are each provided with four rows and a single layer of continuously spaced rollers-rotating clockwise for scraping sugarcane leaves, peeling sugarcane peels and conveying sugarcane stalks by using a plurality of rubber bars arranged rows of at intervals; the scattered whole-stalk sugarcane left and right conveyor comprises a bottom frame having bottom wheels for walking across two sugarcane rows, and a surface of the bottom frame is further provided with vertical bars for supporting a left and right conveying frame;

the vertical bars are arranged at intervals on both sides of the rear end of the bottom frame, and the fronts of upper ends of the vertical bars are respectively connected to two opposite inclined sugarcane supporting sliding plates which abut two sugarcane outlets at the tail part of the harvester;

upper ends of the vertical bars on both sides are respectively connected to one ends of soft steel wire ropes;

the other ends of the steel wire ropes are respectively arranged on lifting ends of lifting oil cylinders;

bottom ends of the oil cylinders are respectively arranged on both sides of the frame above the tail part of the harvester;

two sides of the left and right conveying frame are provided with left and right upper and lower movable walls;

ordinary bicycle single-speed flywheels are further provided respectively in sprocket wheels arranged on transmission shafts at lower ends of conveying chains of the lower movable walls on both sides;

when the transmission shafts, provided with the ordinary bicycle single-speed flywheels, at lower ends of the lower movable walls on both sides rotate clockwise, an inner flywheel provided on a transmission shaft at the lower end of the right lower movable wall drives an outer chain gear to rotate, and an inner flywheel provided on a transmission shaft at the lower end of the left lower movable wall stops driving the outer chain gear to rotate;

when the transmission shafts on both sides rotate counterclockwise, the inner flywheel on the right side stops driving the outer chain gear to rotate, and the inner flywheel on the left side drives the outer chain gear to rotate;

sugarcane sectioning blade devices are respectively arranged at four rows of sugarcane outlets of the tail part of the harvester;

conveying chains are respectively arranged at intervals on surfaces of the left and right upper and lower movable walls and a surface of the left and right conveying frame;

two side edges of the surfaces of the upper and lower movable walls on the left and right sides and rear end edges on the surface of the left and right conveying frame are respectively provided with vertical baffle plates; and a front end of the bottom frame of horizontal sugarcane sections conveyors on the upper and lower movable walls on the left and right sides is fixed by bolts to the frame below the sugarcane outlet at the tail part of the harvester.

\* \* \* \* \*